(12) United States Patent
Pannell et al.

(10) Patent No.: US 7,683,140 B2
(45) Date of Patent: Mar. 23, 2010

(54) METHOD FOR DETERMINING TEMPERATURE VALUE INDICATIVE OF RESIN STICKINESS FROM DATA GENERATED BY POLYMERIZATION REACTION MONITORING

(75) Inventors: Richard B. Pannell, Kingwood, TX (US); Robert O. Hagerty, LaPorte, TX (US); Eric J. Markel, Kingwood, TX (US)

(73) Assignee: Univation Technologies, LLC, Houston, TX (US)

( * ) Notice: Subject to any disclaimer, the term of this patent is extended or adjusted under 35 U.S.C. 154(b) by 623 days.

(21) Appl. No.: 11/599,122

(22) Filed: Nov. 14, 2006

(65) Prior Publication Data

US 2007/0073010 A1    Mar. 29, 2007

Related U.S. Application Data

(63) Continuation-in-part of application No. 11/515,525, filed on Sep. 5, 2006, now Pat. No. 7,300,987, which is a continuation of application No. 11/132,863, filed on May 19, 2005, now Pat. No. 7,122,607.

(60) Provisional application No. 60/572,876, filed on May 20, 2004, provisional application No. 60/572,786, filed on May 20, 2004, provisional application No. 60/581,463, filed on Jun. 21, 2004, provisional application No. 60/842,719, filed on Sep. 7, 2006, provisional application No. 60/842,747, filed on Sep. 7, 2006.

(51) Int. Cl.
*C08F 2/00* (2006.01)
*C08F 10/14* (2006.01)

(52) U.S. Cl. ............................ 526/61; 526/59; 526/60; 526/348.5

(58) Field of Classification Search ............. 526/59–61, 526/348.5
See application file for complete search history.

(56) References Cited

U.S. PATENT DOCUMENTS 3,056,771 A    10/1962    Aldridge et al. ............ 260/94.9

(Continued)

FOREIGN PATENT DOCUMENTS

EP    0 089 691    9/1983

(Continued)

OTHER PUBLICATIONS

"Agglomeration Detection By Acoustic Emission," *Process Analysis & Automation Ltd.* (2000), Application note: 2002/111.

(Continued)

*Primary Examiner*—David Wu
*Assistant Examiner*—Elizabeth Eng
(74) *Attorney, Agent, or Firm*—Leandro Arechederra, III

(57) ABSTRACT

In some embodiments, a method including the steps of monitoring a polymerization reaction which produces a polymer resin in a fluid bed reactor, where a dry melt reference temperature is characteristic of melting behavior of a dry version of the resin, and in response to data indicative of at least one monitored parameter of the reaction, determining a reduced melt reference temperature that is at least substantially equal to the difference between the dry melt reference temperature and a temperature by which the dry melt reference temperature is depressed by the presence of condensable diluent gas with the resin in the reactor. Optionally, the method also includes the step of controlling the reaction in response to the reduced melt reference temperature or a stickiness parameter determined from the reduced melt reference temperature.

24 Claims, 5 Drawing Sheets

U.S. PATENT DOCUMENTS

| | | | |
|---|---|---|---|
| 3,082,198 A | 3/1963 | Klein | 260/94.9 |
| 3,470,143 A | 9/1969 | Schrage et al. | 260/82.5 |
| 3,919,185 A | 11/1975 | Takebe et al. | 260/93.7 |
| 4,012,574 A | 3/1977 | Jones et al. | 526/74 |
| 4,194,073 A | 3/1980 | McDaniel | 526/98 |
| 4,232,140 A | 11/1980 | Ort | 526/129 |
| 4,302,566 A | 11/1981 | Karol et al. | 526/124 |
| 4,405,495 A | 9/1983 | Lee et al. | 502/104 |
| 4,543,399 A | 9/1985 | Jenkins et al. | 526/70 |
| 4,588,790 A | 5/1986 | Jenkins et al. | 526/70 |
| 4,593,010 A | 6/1986 | Malpass | 502/115 |
| 4,704,491 A | 11/1987 | Tsutsui et al. | 585/10 |
| 4,792,592 A | 12/1988 | Fulks et al. | 526/62 |
| 4,803,251 A | 2/1989 | Goode et al. | 526/59 |
| 4,855,370 A | 8/1989 | Chirillo et al. | 526/74 |
| 5,026,795 A | 6/1991 | Hogan | 526/74 |
| 5,037,905 A | 8/1991 | Cummings et al. | 526/74 |
| 5,066,736 A | 11/1991 | Dumain et al. | 526/82 |
| 5,084,534 A | 1/1992 | Welborn, Jr. et al. | 526/160 |
| 5,086,134 A | 2/1992 | Antberg et al. | 526/124 |
| 5,194,526 A | 3/1993 | Hussein et al. | 526/74 |
| 5,218,071 A | 6/1993 | Tsutsui et al. | 526/348 |
| 5,258,475 A | 11/1993 | Kissin | 526/129 |
| 5,281,679 A | 1/1994 | Jejelowo et al. | 526/114 |
| 5,290,745 A | 3/1994 | Jorgensen et al. | 502/109 |
| 5,324,800 A | 6/1994 | Welborn, Jr. et al. | 526/160 |
| 5,342,907 A | 8/1994 | Cann et al. | 526/129 |
| 5,352,749 A | 10/1994 | DeChellis et al. | 526/68 |
| 5,376,439 A | 12/1994 | Hodgson et al. | 428/220 |
| 5,387,660 A | 2/1995 | Doyle et al. | 526/69 |
| 5,391,657 A * | 2/1995 | Song et al. | 526/74 |
| 5,405,922 A | 4/1995 | DeChellis et al. | 526/68 |
| 5,410,002 A | 4/1995 | Govoni et al. | 526/88 |
| 5,436,304 A | 7/1995 | Griffin et al. | 526/68 |
| 5,453,471 A | 9/1995 | Bernier et al. | 526/68 |
| 5,462,999 A | 10/1995 | Griffin et al. | 526/68 |
| 5,510,433 A * | 4/1996 | Baker et al. | 526/74 |
| 5,523,435 A | 6/1996 | Lisowsky | 556/11 |
| 5,525,689 A | 6/1996 | Tsutsui et al. | 526/160 |
| 5,541,272 A | 7/1996 | Schmid et al. | 526/160 |
| 5,550,094 A | 8/1996 | Ali et al. | 502/115 |
| 5,616,661 A | 4/1997 | Eisinger et al. | 526/88 |
| 5,624,878 A | 4/1997 | Devore et al. | 502/152 |
| 5,674,795 A | 10/1997 | Wasserman et al. | 502/9 |
| 5,767,208 A | 6/1998 | Turner et al. | 526/160 |
| 5,990,251 A | 11/1999 | Gelus | 526/125.7 |
| 6,124,229 A | 9/2000 | Becker et al. | 502/102 |
| 6,147,172 A | 11/2000 | Brown et al. | 526/126 |
| 6,234,950 B1 | 5/2001 | von Haken Spence et al. | 502/155 |
| 6,235,671 B1 | 5/2001 | McKay et al. | 502/110 |
| 6,235,672 B1 | 5/2001 | McKay et al. | 502/155 |
| 6,239,061 B1 | 5/2001 | Wang et al. | 502/162 |
| 6,239,238 B1 | 5/2001 | Brown et al. | 526/161 |
| 6,248,845 B1 | 6/2001 | Loveday et al. | 526/113 |
| 6,281,306 B1 | 8/2001 | Oskam et al. | 526/161 |
| 6,313,236 B1 | 11/2001 | Ford et al. | 526/74 |
| 6,355,744 B1 | 3/2002 | von Haken Spence et al. | 526/127 |
| 6,417,298 B1 | 7/2002 | Ford et al. | 526/89 |
| 6,455,638 B2 | 9/2002 | Laughner et al. | 525/191 |
| 6,486,273 B1 | 11/2002 | McKay et al. | 526/113 |
| 6,534,613 B2 | 3/2003 | Ford et al. | 526/352 |
| 6,579,998 B2 | 6/2003 | Sita et al. | 556/53 |
| 6,649,558 B2 | 11/2003 | Brown et al. | 502/155 |
| 6,656,866 B2 | 12/2003 | Wenzel et al. | 502/117 |
| 6,656,868 B2 | 12/2003 | Oskam et al. | 502/155 |
| 6,660,815 B2 | 12/2003 | Agapiou et al. | 526/130 |
| 7,122,607 B2 | 10/2006 | Hagerty et al. | 526/73 |
| 7,300,987 B2 | 11/2007 | Hagerty et al. | 526/73 |
| 7,459,510 B2 | 12/2008 | Lin et al. | 526/135 |
| 7,507,780 B2 | 3/2009 | Hagerty et al. | 526/73 |
| 2001/0044505 A1 | 11/2001 | Ford et al. | 526/62 |
| 2002/0198335 A1 | 12/2002 | Bernier et al. | 526/88 |
| 2003/0100688 A1 | 5/2003 | Farrer et al. | 526/110 |
| 2003/0121330 A1* | 7/2003 | Muhle et al. | 73/600 |
| 2003/0171512 A1 | 9/2003 | Mawson et al. | 526/129 |
| 2004/0063871 A1 | 4/2004 | Parrish et al. | 526/61 |
| 2005/0267269 A1 | 12/2005 | Hagerty et al. | 526/68 |
| 2007/0043174 A1 | 2/2007 | Parrish et al. | 526/59 |
| 2007/0060721 A1 | 3/2007 | Muhle et al. | 526/59 |
| 2007/0073010 A1 | 3/2007 | Pannell et al. | 526/73 |
| 2008/0065360 A1 | 3/2008 | Pannell et al. | 703/2 |

FOREIGN PATENT DOCUMENTS

| | | |
|---|---|---|
| EP | 0366823 | 5/1990 |
| EP | 0413326 | 2/1991 |
| EP | 0443686 | 8/1991 |
| EP | 0 453 116 | 10/1991 |
| EP | 0481480 | 4/1992 |
| EP | 0495099 | 7/1992 |
| EP | 0 549 252 | 6/1993 |
| EP | 0596553 | 5/1994 |
| EP | 0612768 | 8/1994 |
| EP | 0284707 | 8/1995 |
| EP | 0668296 | 8/1995 |
| EP | 0669346 | 8/1995 |
| EP | 0 722 955 | 7/1996 |
| EP | 0 754 708 | 1/1997 |
| EP | 0773239 | 5/1997 |
| EP | 0781789 | 7/1997 |
| EP | 0 794 200 | 9/1997 |
| EP | 1 323 746 | 7/2003 |
| JP | 09-176400 | 7/1997 |
| WO | WO 94/003509 | 2/1994 |
| WO | 97/14721 | 4/1997 |
| WO | WO 97/022635 | 6/1997 |
| WO | WO 98/002470 | 1/1998 |
| WO | WO 99/061486 | 12/1999 |
| WO | WO 02/046250 | 6/2002 |
| WO | 03/010211 | 2/2003 |
| WO | 03/051929 | 6/2003 |
| WO | 2004/058825 | 7/2004 |
| WO | 2004/058827 | 7/2004 |
| WO | 2004/058828 | 7/2004 |
| WO | WO 2005/049663 | 6/2005 |
| WO | 2005/113615 | 12/2005 |
| WO | WO 2005/113610 | 12/2005 |
| WO | WO 2006/009980 | 1/2006 |
| WO | WO 2008/030313 | 3/2008 |

OTHER PUBLICATIONS

"Acoustic Emission Technology—A New Sensing Technique for Optimising Polyolefin Production," *Process Analysis & Automation Ltd.* (2000).

Ardell et al. *Process Control: Optimization Simulation: Model Prediction for Reactor Control* CEP (Jun. 1983) pp. 77-83.

Heiland Kirstin and Kaminsky Walter "*Comparison of zirconocene and hafnocene catalysts for the polymerization of ethylene and 1-butene*" Makromol. Chem. vol. 193 pp. 601-610 (1992).

Tian Jun and Huang Baotong "*Ethylene polymerization with catalyst systems based on metallocenes with varying steric hindrance and methylaluminoxane*" Macromol. Rapid Commun. 15 923-928 (1994).

Usami Takao et al. "*Generation Mechanism of Short-Chain Branching Distribution in Linear Low-Density Polyethylenes*" Macromolecules vol. 19 pp. 2722-2726 (1986).

\* cited by examiner

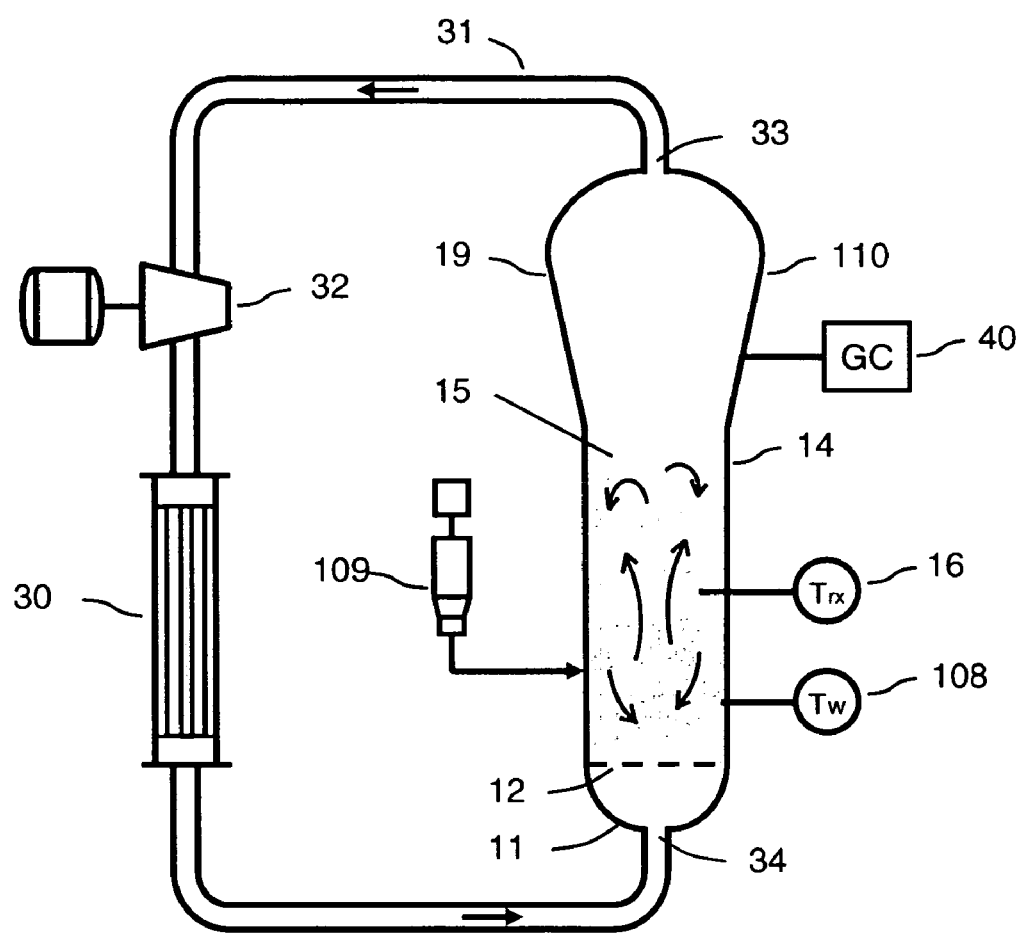
Figure 3 – Fluidized Bed Reaction System

Figure 4 – Process For Monitoring And Control of Reactor Stickiness
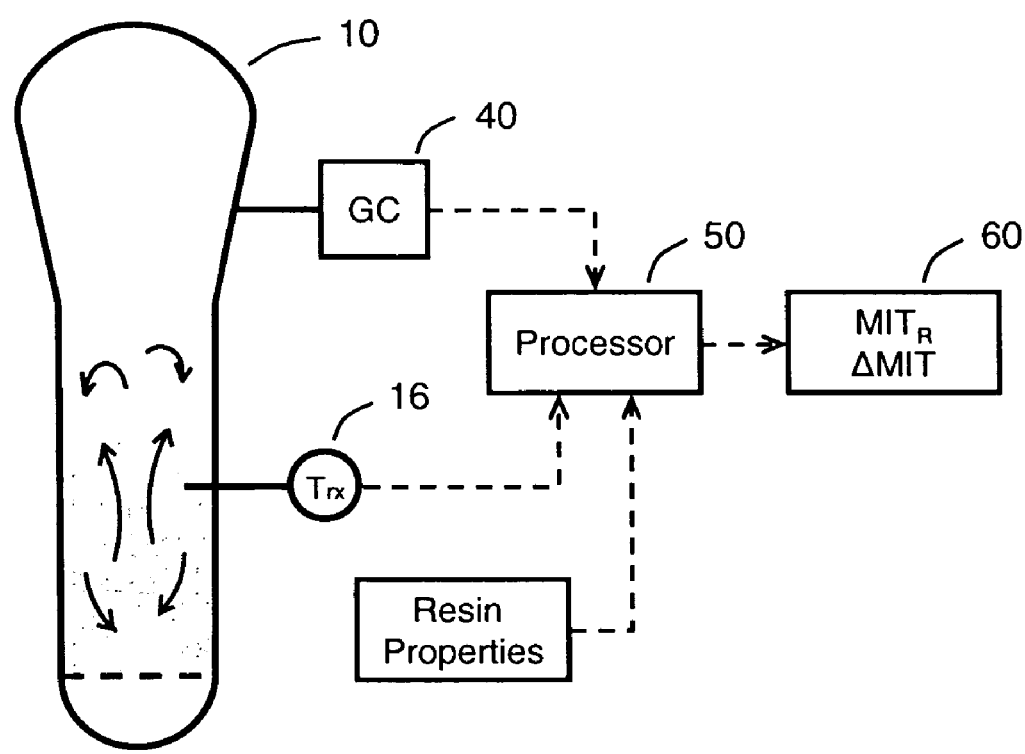

Figure 5 – First Melt DSC Curve
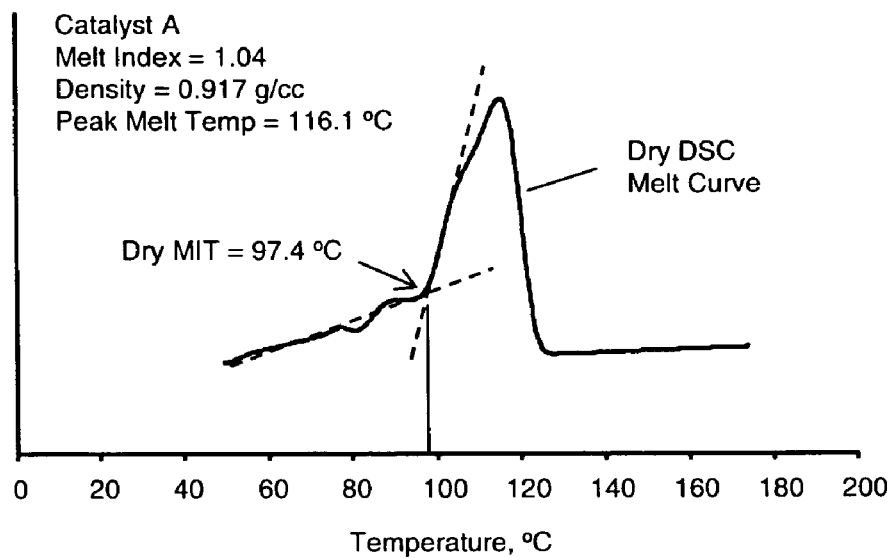
Figure 6 – Displaced MIT ($MIT_R$)
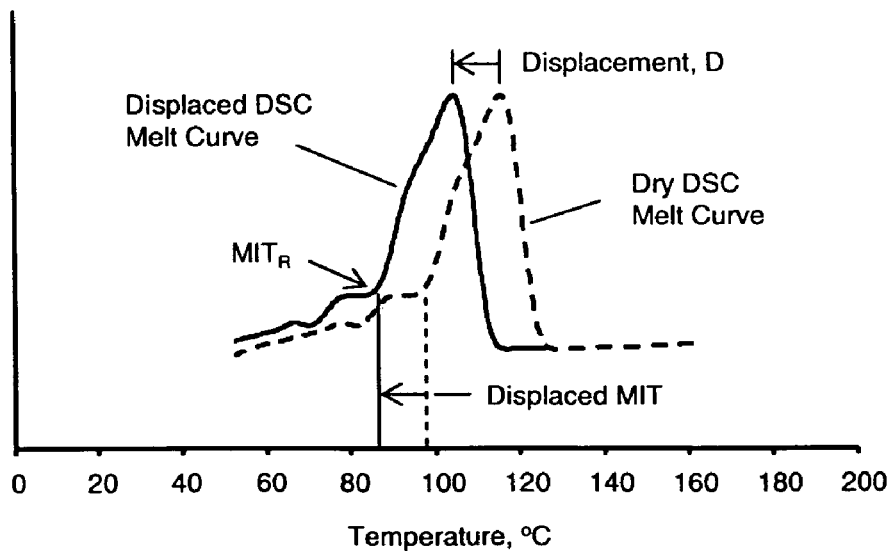

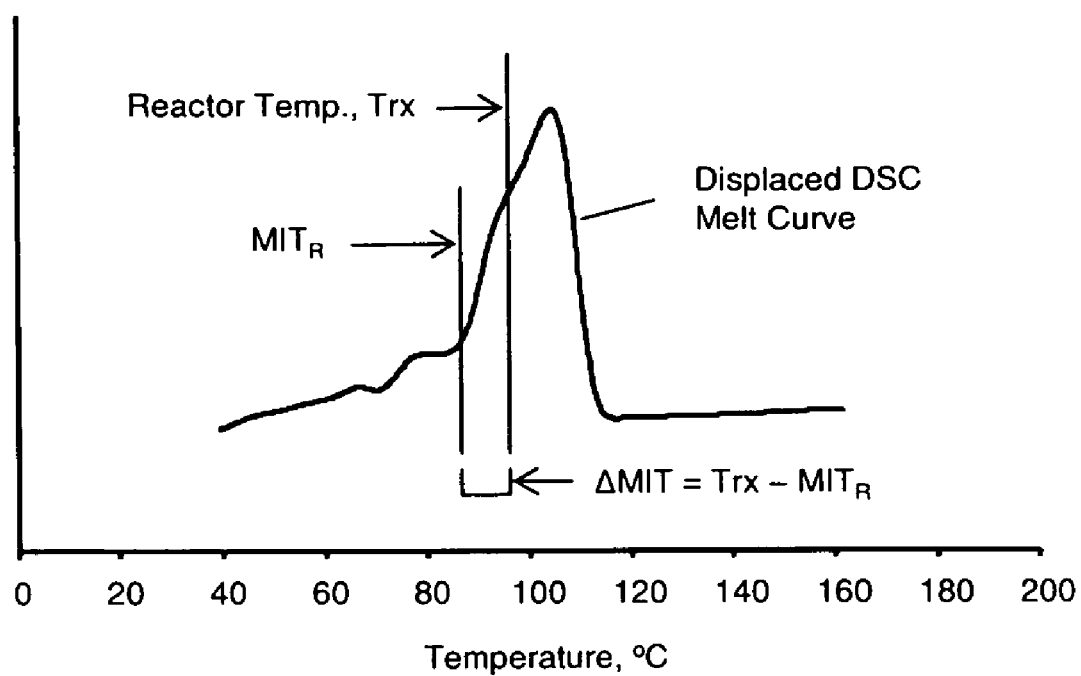

METHOD FOR DETERMINING TEMPERATURE VALUE INDICATIVE OF RESIN STICKINESS FROM DATA GENERATED BY POLYMERIZATION REACTION MONITORING

CROSS-REFERENCE TO RELATED APPLICATIONS

This application:

claims the benefit of application Ser. No. 60/842,719, filed Sep. 7, 2006 and application Ser. No. 60/842,747, filed Sep. 7, 2006; and is a continuation-in-part of Ser. No. 11/515,525, filed Sep. 5, 2006, now U.S. Pat. No. 7,300,987 which is a continuation of Ser. No. 11/132,863, filed May 19, 2005, issued as U.S. Pat. No. 7,122,607, which claims the benefit of Provisional Application No. 60/572,876, filed May 20, 2004; Provisional Application No. 60/572,786, filed May 20, 2004; and Provisional Application No. 60/581,463, filed Jun. 21, 2004, the disclosures of which are incorporated by reference in their entirety.

FIELD OF THE INVENTION

The invention pertains to methods for monitoring a polymerization reaction which produces a polymer resin in a fluid bed reactor (e.g., an olefin polymerization reaction in a gas phase reactor), generating data indicative of a reference temperature (indicative of a degree of stickiness of the resin in the reactor), and optionally also controlling the reaction in response to the reference temperature (or a temperature value related thereto).

BACKGROUND OF THE INVENTION

The expression "on-line generation" of data during a reaction is used herein to denote generation of the data sufficiently rapidly that the data is available essentially instantaneously for use during the reaction. The expression generation of data "in on-line fashion" during a reaction is used synonymously with the expression "on-line generation" of data during a reaction. Generation of data from at least one laboratory test (on at least one substance employed or generated in the reaction) is not considered "on-line generation" of data during the reaction if the laboratory test consumes so much time that parameters of the reaction may change significantly during the test. It is contemplated that on-line generation of data can include the use of a previously generated database that may have been generated in any of a variety of ways including time-consuming laboratory tests.

Advances in polymerization and catalysis have resulted in the capability to produce many new polymers having improved physical and chemical properties useful in a wide variety of superior products and applications. With the development of new catalysts, the choice of polymerization-type (solution, slurry, high pressure or gas phase) for producing a particular polymer has been greatly expanded. Also, advances in polymerization technology have provided more efficient, highly productive and economically enhanced processes. Regardless of these technological advances in the polyolefin industry, common problems, as well as new challenges still exist. For example, the tendency for a gas phase process to foul and/or sheet remains a challenge, which can particularly be dependent on the polymer being produced and the catalyst system employed.

Fouling, sheeting and/or static generation in a continuous gas phase process, in for example heat exchangers, distributor plates, and probes, can lead to the ineffective operation of various reactor systems. In a typical continuous gas phase process, a recycle system is employed for many reasons including the removal of heat generated in the process by the polymerization reaction, and recycle processes offer many opportunities for fouling.

Evidence of, and solutions to, various process operability problems, including fouling, sheeting, chunking, agglomerating and static build up, have been addressed by many in the art. For example, U.S. Pat. Nos. 4,792,592, 4,803,251, 4,855, 370 and 5,391,657 all discuss techniques for reducing static generation in a polymerization process by introducing to the process for example, water, alcohols, ketones, and/or inorganic chemical additives; PCT publication WO 97/14721 published Apr. 24, 1997 discusses the suppression of fines that can cause sheeting by adding an inert hydrocarbon to the reactor; U.S. Pat. No. 5,066,736 and EP-A1 0 549 252 discuss the introduction of an activity retarder to the reactor to reduce agglomerates; EP-A1 0 453 116 discusses the introduction of antistatic agents to the reactor for reducing the amount of sheets and agglomerates; U.S. Pat. No. 4,012,574 discusses the addition of a surface-active compound, a perfluorocarbon group, to the reactor to reduce fouling; U.S. Pat. No. 5,026, 795 discusses the addition of an antistatic agent with a liquid carrier to the polymerization zone in the reactor; U.S. Pat. No. 5,410,002 discusses using a conventional Ziegler-Natta titanium/magnesium supported catalyst system where a selection of antistatic agents are added directly to the reactor to reduce fouling; U.S. Pat. No. 3,470,143 describes a reduction in fouling in mostly slurry processes for producing primarily elastomers using a fluorinated organic carbon compound.

Likewise, further evidence of, and solutions to, various process operability problems have been addressed by many in the art. For example, U.S. Pat. No. 3,082,198 discusses introducing an amount of a carboxylic acid dependent on the quantity of water in a process for polymerizing ethylene using a titanium/aluminum organometallic catalysts in a hydrocarbon liquid medium; U.S. Pat. No. 3,919,185 describes a slurry process using a nonpolar hydrocarbon diluent with a conventional Ziegler-Natta-type or Phillips-type catalyst and a polyvalent metal salt of an organic acid having a molecular weight of at least 300; U.S. Pat. No. 5,990,251 relates to increasing catalyst activity of a Ziegler-Natta-type catalyst by using very small quantities of a halogenated hydrocarbon, specifically a molar ratio between 0.001 and 0.15 of the halogenated hydrocarbon, particularly chloroform, to the metal of the catalyst, specifically titanium; U.S. Pat. No. 6,455,638 is directed to a polymer blend having components with different ethylene content, and U.S. Pat. No. 5,624,878 relates primarily to the use in polymerization of catalytic derivatives of titanium (II) and zirconium (II) metallocene-type complexes; both U.S. Pat. Nos. 6,455,638 and 5,624,878 mention generally, in passing, using in polymerization various solvents such as straight-chain hydrocarbons, cyclic and alicyclic hydrocarbons, perfluorinated hydrocarbons, aromatic and alkyl-substituted aromatic compounds, and mixtures thereof. U.S. Pat. No. 6,534,613 describes using a Ziegler-Natta-type catalyst in combination with a halogenated hydrocarbon, particularly chloroform, and an electron donor to produce polymers useful for making better quality films. EP 1 323 746 shows loading of biscyclopentadienyl catalyst onto a silica support in perfluorooctane and thereafter the prepolymerization of ethylene at room temperature. U.S. Pat. No. 3,056,771 discloses polymerization of ethylene using $TiCl_4/(Et)_3Al$ in a mixture of heptane and perfluoromethylcyclohexane, presumably at room temperature.

U.S. Pat. No. 5,352,749, to DeChellis et al, teaches that there are limits to the concentrations of condensable gases, whether ICA materials, comonomers or combinations thereof, that can be tolerated in the reaction system. Above certain limiting concentrations, the condensable gases can cause a sudden loss of fluidization in the reactor, and a consequent loss in ability to control the temperature in the fluid bed. The above-cited U.S. Pat. No. 5,352,749, and U.S. Pat. Nos. 5,405,922 and 5,436,304, disclose upper limits of ICA in the reactor are discussed, depending on the type of polymer being produced. U.S. Pat. No. 5,352,749 discloses that a limiting concentration of ICA (isopentane) exists, beyond which the reactor contents suddenly loose fluidization. The authors characterized this limit by tracking the ratio of fluidized bulk density to settled bulk density. As the concentration of isopentane was increased, they found that the bulk density ratio steadily decreased. When the concentration of isopentane was sufficiently high, corresponding to a bulk density ratio of 0.59, they found that fluidization in the reactor was lost. They therefore determined that this ratio (0.59) was a point of no return, below which the reactor will cease functioning due to loss of fluidization.

As described herein, attempts to operate polymerization reactors with excessive ICA concentrations cause polymer particles suspended in the fluid bed to become cohesive or "sticky," and in some cases cause the fluid bed to solidify in the form of a large chunk. This stickiness problem is characterized by undesirable changes in fluidization and mixing in the fluid bed, which if left unchecked, may develop into a reactor discontinuity event, such as sheeting in the straight sided reaction section, sheeting in the dome of such a reactor or chunking, any of which can lead to reactor shut-downs, which in large scale reactors are expensive. These solid masses (sheets or chunks) of polymer eventually become dislodged from the walls and fall into the reaction section and settle on the distributor plate, where they interfere with fluidization, block the product discharge port, and usually force a reactor shut-down for cleaning. The term "discontinuity event" is used to describe a disruption in the continuous operation of a polymerization reactor caused by sheeting, chunking or distributor plate fouling. The terms "sheeting and/or chunking" while used synonymously herein, may describe different manifestations of problems caused by excessive polymer stickiness in the fluid bed. In either manifestation (sheeting or chucking) the excessive polymer stickiness can lead directly to a reactor discontinuity event with the associated loss production.

Others have addressed stickiness prevention in gas phase reactors including U.S. Pat. Nos. 5,510,433, 5,342,907, 5,194,526 and 5,037,905. These patents disclose that very low density, sticky materials can be produced in gas phase reactors by adding 10-20 wt % of inert, "refractory" material to the fluid bed. Suitable refractory materials are micro-fine silica and carbon black. However, application of the technology is expensive and requires substantial investment in powder handling equipment in the production plant.

Stable operation of fluidized bed reactors used in the production of polymers requires the avoidance of conditions that lead to sticky polymer. Sticky, or cohesive polymer causes a range of problems in the gas phase reactor systems. For example, sticky polymer can reduce the quality of fluidization that occurs within the reactor, and can reduce the degree of internal mixing below the minimum levels required to disperse the catalyst and maintain stable temperature control. In addition, stickiness of the polymer can lead to the deposition of polymer product on the walls of the reactor expanded section, which often leads to the formation of dome sheets (solid masses of polymer material deposited on the walls of the "dome", or expanded section of the reactor) In many cases, these dome sheets are large and massive, containing as much as 100 kg of agglomerated polymer. These dome sheets eventually fall from the dome and become lodged on the distributor plate, where they interfere with fluidization. In some cases, the dome sheets block the product discharge port, and force a reactor shut-down for cleaning. For these reasons it is desirable to have means of preventing excessive stickiness of the polymer product.

Polymer stickiness is thought to be a function of several process and product variables within the reactor. The relevant process variables include the reaction temperature and the concentrations (or partial pressures) of condensable components such as 1-hexene and isopentane in the reactor gas phase. In general, stickiness of the polymer is promoted by higher reaction temperature and higher condensable concentrations. Important product properties include the resin density, molecular weight (or melt index), and the molecular weight distribution (MWD). In general, stickiness of the polymer is promoted by lower resin density, lower molecular weight (higher melt index), and broader molecular weight distribution (Mw/Mn=MWD).

Fluid bed reactors used to produce polyethylene resin are normally operated with a relatively high reaction temperature. For example, in the production of a typical low density film resin (0.917 g/cc density, 1 dg/min melt index) produced with metallocene or Ziegler-Natta catalyst, the reaction temperature is typically operated at 85° C. A relatively high reactor temperature provides for a relatively high temperature differential over the cooling water temperature (which typically operates at 30 to 35° C.). This, in conventional practice, is thought to provide for maximum heat removal capability for maximum production rates.

It would be desirable to have a polymer production process that is free of polymer agglomeration or stickiness. It would also be desirable to have a process that allows higher concentrations of condensables and/or higher dew point temperatures in the reactors for higher production rates.

Our findings indicate that, in many cases, the operating temperatures are too high relative to the polymer sticking temperature. Although it appears counterintuitive, we found that it is possible to reduce operating temperatures and actually increase maximum production rates, while avoiding problems of resin stickiness.

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property herein denotes the value of the property of the product that exits the reactor at time T.

Throughout this disclosure, the expression "diluent" (or "condensable diluent" or "condensable diluent gas") denotes condensable gas (or a mixture of condensable gases) present in a polymerization reactor with polymer resin being produced. The diluent is condensable at the temperatures encountered in the process heat exchanger. Examples of diluents include induced condensing agents (ICAs), comonomers, isomers of comonomers, and combinations thereof.

The expression "dry polymer resin" (or "dry version" of polymer resin) is used herein to denote polymer resin that does not contain substantial amounts of dissolved gas. An example of dry polymer resin is polymer that had been previously produced in a polymerization reactor and then purged to eliminate all (or substantially all) unreacted comonomers and ICAs that had been dissolved in the polymer at the time of production. As will be discussed herein, a dry version of polymer resin has significantly different melting behavior than would the same polymer resin if it were in the presence of a significant amount of condensable diluent gas and comonomer.

The expression polyethylene denotes a polymer of ethylene and optionally one or more C3-C10 α-olefins while the expression polyolefin denotes a polymer of one or more C2-C10 α-olefins.

Throughout this disclosure, the abbreviation "MI" denotes melt index.

One commonly used method for producing polymers is gas phase polymerization. A conventional gas phase fluidized bed reactor, during operation to produce polyolefins by polymerization, contains a fluidized dense-phase bed including a mixture of reaction gas, polymer (resin) particles, catalyst, and (optionally) catalyst modifiers. Typically, any of several process control variables can be controlled to cause the reaction product to have desired characteristics.

Generally in a gas-phase fluidized bed process for producing polymers from monomers, a gaseous stream containing one or more monomers is continuously passed through a fluidized bed under reactive conditions in the presence of a catalyst. This gaseous stream is withdrawn from the fluidized bed and recycled back into the reactor. Simultaneously, polymer product is withdrawn from the reactor and new monomer is added to replace the polymerized monomer. The recycled gas stream is heated in the reactor by the heat of polymerization. This heat is removed in another part of the cycle by a cooling system external to the reactor.

It is important to remove heat generated by the reaction in order to maintain the temperature of the resin and gaseous stream inside the reactor at a temperature below the polymer melting point and/or catalyst deactivation temperature. Further, heat removal is important to prevent excessive stickiness of polymer particles that if left unchecked, may result in loss of fluidization or agglomeration of the sticky particles which may lead to formation of chunks or sheets of polymer that cannot be removed as product. Further, such chunks or sheets may fall onto the distributor plate causing impaired fluidization, and in many cases forcing a reactor shutdown. Prevention of such stickiness has been accomplished by controlling the temperature of the fluid bed to a temperature below the fusion or sintering temperature of the polymer particles. Above this fusion or sintering temperature, empirical evidence suggests that such fusion or sintering leads to agglomeration or stickiness, which in turn can, if left unchecked, may lead to the above conditions.

It is understood that the amount of polymer produced in a fluidized bed polymerization process is directly related to the amount of heat that can be withdrawn from the fluidized bed reaction zone. Since the exothermic heat generated by the reaction is directly proportional to the rate of polymer production. In steady state operation of the reaction process, the rate of heat removal from the fluidized bed must equal the rate of rate of heat generation, such that the bed temperature remains constant. Conventionally, heat has been removed from the fluidized bed by cooling the gas recycle stream in a heat exchanger external to the reactor.

A requirement of a fluidized bed process is that the velocity of the gaseous recycle stream be sufficient to maintain the reaction zone in a fluidized state. In a conventional fluidized bed polymerization process, the amount of fluid circulated to remove the heat of polymerization is greater than the amount of fluid required for support of the fluidized bed and for adequate mixing of the solids in the fluidized bed. The excess velocity provides additional gas flow to (and through) the fluid bed for additional cooling capacity and more intensive mixing of the reactor bed. However, to prevent excessive entrainment of solids in a gaseous stream withdrawn from the fluidized bed, the velocity of the gaseous stream must be regulated.

For a time, it was thought that the temperature of the gaseous stream external to the reactor, otherwise known as the recycle stream temperature, could not be decreased below the dew point of the recycle stream without causing problems of polymer agglomeration or plugging of the reactor system. The dew point of the recycle stream is that temperature at which liquid condensate first begins to form in the gaseous recycle stream. The dew point can be calculated knowing the gas composition and is thermodynamically defined using an equation of state.

Contrary to this belief, as suggested by Jenkins, et al. in U.S. Pat. No. 4,543,399 and related U.S. Pat. No. 4,588,790, a recycle stream can be cooled to a temperature below the dew point in a fluidized bed polymerization process resulting in condensing a portion of the recycle gas stream. The resulting stream containing entrained liquid is then returned to the reactor without causing the aforementioned agglomeration and/or plugging phenomena (which had been expected prior to Jenkins). The process of purposefully condensing a portion of the recycle stream is known in the industry as "condensed mode" operation in a gas phase polymerization process.

The above-cited U.S. patents to Jenkins et al. suggest that when a recycle stream temperature is lowered to a point below its dew point in "condensed mode" operation, an increase in polymer production is possible, as compared to production in a non-condensing mode because of increased cooling capacity. Consequently, a substantial increase in space-time yield, the amount of polymer production in a given reactor volume, can be achieved by condensed mode operation with little or no change in product properties.

Cooling of the recycle stream to a temperature below the gas dew point temperature produces a two-phase gas/liquid mixture with solids contained in both of these phases. The liquid phase of this two-phase gas/liquid mixture in "condensed mode" operation remains entrained or suspended in the gas phase of the mixture. Vaporization of the liquid occurs only when heat is added or pressure is reduced. In the process described by Jenkins, et al., vaporization occurs when the two-phase mixture enters the fluidized bed, with the (warmer) resin providing the required heat of vaporization. The vaporization thus provides an additional means of extracting heat of reaction from the fluidized bed. The heat removal capacity is further enhanced in condensed mode operation by the lower gas temperatures of the gas stream entering the fluidized bed. Both of these factors increase the overall heat removal capability of the system and thereby enable higher space-time yields (higher reactor production rates per unit volume of the fluidized bed).

Jenkins, et al. illustrate the difficulty and complexity of such reactor control in general, and of trying to extend the stable operating zone to optimize the space time yield in a gas phase reactor, especially when operating in condensed mode.

The cooling capacity of recycle gas can be increased further while at a given reaction temperature and a given temperature of the cooling heat transfer medium. One option described is to add non-polymerizing, non-reactive materials to the reactor, which are condensable at the temperatures encountered in the process heat exchanger. Such non-reactive, condensable materials are collectively known as induced condensing agents (ICAs). Increasing concentrations of ICA in the reactor causes corresponding increases in the dew point temperature of the reactor gas, which promotes higher levels of condensing for higher (heat transfer limited) production rates from the reactor. Suitable ICA materials are selected based on their specific heat and boiling point properties. In particular, an ICA compound is selected such that a relatively high portion of the material is condensed at the cooling water temperatures available in polymer production plants, which are typically 20-40° C. ICA materials include hexane, isohexane, pentane, isopentane, butane, isobutane and other hydrocarbon compounds that are similarly non-reactive in the polymerization process.

Two articles by Process Analysis & Automation Limited (PAA), entitled "Agglomeration Detection by Acoustic Emission," PAA Application note: 2002/111 (©2000) and "Acoustic Emission Technology—a New Sensing Technique for Optimising Polyolefin Production" (©2000), suggest process control in fluidized bed production of polyolefins utilizing acoustic emission sensors located at various positions on the reactor and recycle piping.

PCT Application Publication Number WO 03/051929 describes the use of mathematical chaos theory to detect the onset and presence of sheeting in a fluid bed reactor. Signals from a range of instruments, including acoustic emission sensors, differential pressure sensors, static sensors, and wall temperature sensors are filtered by certain specified methods to construct a "time-series" of data, which is then processed by methods of non-linear dynamics herein referred to as chaos theory and compared to data from a control reactor running without sheeting. The onset of sheeting is indicated by an increase in mean "cycle time" (relative to a baseline, control reactor), usually with a concurrent decrease in the "mean deviation" of the time-series. Alternatively, the onset of sheeting is indicated by a decrease in the mathematical "entropy" of the time-series data, as compared to a similar reactor running without sheeting. (The terms "time-series", "cycle time", "mean deviation", and "entropy" here refer to calculated parameters defined by chaos theory.)

Adding to the complexity of control of stickiness while using ICAs, different polymer products vary widely in their ability to tolerate ICA materials, some having a relatively high tolerance (expressed in partial pressure of the ICA in the reactor), e.g. 50 psia, while other polymers may tolerate as little as 5 psia. In these latter polymers, the heat transfer limited production rates under similar conditions are substantially lower. Polymers which possess a more uniform comonomer composition distribution are known to have a higher tolerance to the partial pressure of the ICA in the reactor. Metallocene catalyst produced polymers are a good example of polymers with such a more uniform comonomer composition. However, at some point even these metallocene produced polymers reach a limiting ICA concentration that induces stickiness. The limiting ICA concentration depends on several factors in addition to the polymer type, including reactor temperature, comonomer type and concentration. Further, with the effect of temperature, ICA level and comonomer levels all affecting on the onset of stickiness, determining the point at which sticking begins to occur has heretofore been difficult.

Even within the constraints of conventional, safe operation, control of such reactors is complex adding further to the difficulty and uncertainty of experimentation if one wishes to find new and improved operating conditions that might result in higher production rates. Large-scale gas phase plants are expensive and highly productive. Risks associated with experimentation in such plants are high because downtime is costly. Therefore it is difficult to explore design and operating boundaries experimentally in view of the costs and risks.

It would be desirable to provide a method of determining a stable operating condition for gas fluidized bed polymerization, especially if operating in condensed mode, to facilitate optimum design of the plant and the determination of desirable process conditions for optimum or maximum production rates in a given plant design.

It would also be desirable to have a mechanism in commercial gas-phase reactors to detect the onset of stickiness that is a better or earlier indicator of the onset of stickiness than are conventional techniques (e.g., monitoring the fluidized bulk density as described in U.S. Pat. No. 5,352,749). Such a mechanism would allow the operators to determine when conditions of limiting stickiness are being approached, and enable them to take corrective action before discontinuity events (such as sheeting and chunking) occur, while keeping the reactors at or near conditions of maximum ICA concentration, permitting higher production rates with substantially less risk.

U.S. patent application Ser. No. 11/227,710, entitled Method for Operating a Gas-Phase Reactor at or Near Maximum Production Rates While Controlling Polymer Stickiness, filed by Michael E. Muhle and Robert O. Hagerty on Sep. 14, 2005, discloses monitoring (during operation of a polymerization reactor) of resin stickiness by generating a time series of readings of acoustic emissions of the contents of the reactor using acoustic emission sensors. Acoustic emission measurements are generated during steady state operation of a reactor (producing the relevant polymer). Additional acoustic emission measurements (generated during operation of the reactor) are then processed to determine whether they deviate from acoustic emissions indicative of steady state reactor operation. Such deviation is treated as an indication of onset of excessive stickiness of polymer particles in the reactor. Corrective action can be taken (e.g., ICA and/or monomer levels and/or reactor temperature can be adjusted) when the acoustic emission measurements are determined to deviate from those of a steady state reactor.

SUMMARY OF THE INVENTION

In a class of embodiments, the invention is a method including the steps of:

monitoring a polymerization reaction which produces a polymer resin in a fluid bed reactor, wherein the polymer resin has a dry melt reference temperature (a temperature, sometimes referred to herein as a "dry MRT," characteristic of melting behavior of a dry version of the polymer resin); and in response to data indicative of at least one monitored parameter of the reaction, determining a reduced melt reference temperature (sometimes referred to herein as "$MRT_R$") characteristic of the melting behavior of the polymer resin as it exists in the reactor.

The reduced melt reference temperature ("$MRT_R$") is a temperature characteristic of melting behavior of the polymer resin the presence of diluent (e.g., condensable diluent gas or gases) with the resin in the reactor, and is at least substantially equal to the difference between the dry MRT and a melt reference temperature depression value, "D," where D is a temperature by which the dry MRT is depressed by the presence of diluent (e.g., condensable diluent gas or gases) with the resin in the reactor. In some embodiments, the method also includes the step of determining a stickiness control parameter from the reduced melt reference temperature. Typically, the stickiness control parameter is a temperature (sometimes referred to herein as a "$\Delta MRT$" value) at least substantially equal to $MRT_R-Trx$ (or $Trx-MRT_R$), where Trx is current reactor temperature.

Optionally, the method also includes the step of controlling the reaction in response to the reduced melt reference temperature or stickiness control parameter (e.g., in response to a $\Delta MRT$ value), for example by maintaining bed temperature in a predetermined relation with (e.g., below) the reduced melt reference temperature or a temperature (or temperature range) related to the reduced melt reference temperature.

The dry MRT is a distinct and measurable temperature that is characteristic of melting behavior of a dry version of the polymer resin, and can be defined or determined in any of a variety of different ways.

In typical embodiments, reference temperature data (indicative of the reduced melt reference temperature) are generated in accordance with the invention by processing data indicative of a combination of process variables measured during the reaction (e.g., current values of bed temperature, density and melt index of the polymer resin, and concentration (e.g., partial pressure) of ICA, comonomer, and isomer gas, and optionally also at least one other diluent present in the reactor) in accordance with a predetermined model. In some embodiments the reference temperature data are generated in on-line fashion. In other embodiments the reference temperature data are generated other than in online fashion. The processing can be performed in any of a variety of ways, including by accessing at least one database or look-up table prepared in accordance with the model. Typically, a dry melt reference temperature is determined from the measured process data (e.g., using a predetermined correlation with melt index and/or density of the resin), and appropriate correlations (provided by the model) are employed to estimate a degree of reduction of the dry melt reference temperature due to the effects of diluent components present in the reactor with the polymer resin during the reaction.

In typical embodiments, to implement a model of the type mentioned in the previous paragraph, data indicative of a dry melt reference temperature of each of a representative set of different types or grades of polymer resin that may be produced in the reactor are measured. Preferably, the density and melt index of the polymers in the set span a full range of polymer density and melt index values that may be produced using each catalyst type that may be used in the process. The measured data are typically then analyzed (and regressed) to provide a mathematical correlation of dry melt reference temperature as a function of polymer density and melt index, and also catalyst type (if required). Measured data indicative of the density and melt index of the polymer being produced, and also data indicative of the type of catalyst being used to produce the polymer (if required), can then be processed (e.g., in on-line fashion) using the correlation to determine a dry melt reference temperature for the polymer resin. Alternatively, dry melt reference temperature data, provided in the form of a predetermined database (a "Melt Reference Database") or look-up table, are accessed to identify a dry melt reference temperature for the polymer resin being produced. The database or look-up table would preferably contain dry melt reference temperature data for each grade of polymer to be produced in the reactor, so that the data can be conveniently accessed (e.g., in on-line fashion) by specifying density and melt index of the polymer being produced (and the catalyst being used in the polymerization reaction if required).

Typically, a model of the type mentioned in the two previous paragraphs predicts the amount by which the dry melt reference temperature (of a dry version of the polymer resin being produced in the reactor) is reduced by the presence with the resin of condensable diluent gas (e.g., ICA, comonomer, and isomer(s) of at least one comonomer) used in the reaction. At least one parameter monitored in step (a) is processed in accordance with the model to generate reference temperature data, which in turn determine the reduced melt reference temperature.

Reference temperature data generated (e.g., in on-line fashion) in accordance with the invention can be provided to and processed by (i.e., integrated with) a plant process control system to monitor the approach to at least one condition of undesirable resin stickiness in the reactor. Such monitoring can provide a quantitative basis for control of process conditions to avoid continuity problems that would otherwise occur due to excessive stickiness of resin in the reactor, and can allow a plant operator to operate the process safely at conditions closer to the stickiness limits for higher reactor heat transfer capabilities and higher production rates.

During reaction transitions, conditions in fluid bed reactor are adjusted (e.g., to cause production of polymer of a different grade, such as polymer of different density and/or melt index). In most cases, the adjustments in process conditions can be made fairly quickly, but some time is needed for the fluid bed to change over to the new resin properties. The time required to effect a complete transition is typically three or four bed turnovers. During a reaction transition, the bed-averaged properties (e.g., resin density and melt index) are not equal to the properties of the resin currently being produced (the "instantaneous production"). Therefore, it is possible for reference temperature data generated in accordance with the invention to be indicative of two different stickiness control parameters: one calculated with properties of bed-averaged resin, and one calculated with instantaneous values of the properties of the instantaneous production. In some embodiments, the reference temperature data are indicative of two stickiness control parameters: a "$\Delta MRT_{ave}$" temperature indicative of the difference between the current reactor temperature and a reference temperature above which resin having bed-averaged resin properties in the reactor is predicted to become sticky; and a "$\Delta MRT_{inst}$" temperature indicative of the difference between the current reactor temperature and a reference temperature above which the resin currently being produced in the reactor is predicted to become sticky. For reliable operation (without excessive resin stickiness) the reaction is preferably controlled (at least during the transition) so that neither the "$\Delta MRT_{ave}$" temperature nor the "$\Delta MRT_{inst}$" temperature exceeds a predetermined limit or leaves a predetermined range. The predetermined limit or range for $\Delta MRT_{ave}$ may differ from that for $\Delta MRT_{inst}$.

Preferred embodiments determine stickiness control parameters based on bed-averaged parameters of steady-state polymerization reactions and use them to characterize and preferably also control the steady-state reactions. During transitions of such reactions, preferred embodiments of the invention determine stickiness control parameters based on instantaneous reaction parameters and use them to characterize and preferably also control the reactions during the transitions. For example, a steady-state reaction can be controlled to proceed with an stickiness control parameter relatively close to a critical (or limiting) $\Delta MRT$ value (e.g., a critical $\Delta MRT$ value at least substantially equal to $Trx-MRT_R$, where Trx is the current reactor temperature and $MRT_R$ is at least substantially equal to MRT−D, where MRT is dry melt reference temperature for a dry version of the polymer resin being produced, and D is an estimated temperature (determined in accordance with the invention) by which MRT is depressed by the presence of condensable diluent gas with the resin during the reaction, so that $MRT_R$ is limiting temperature value beyond which resin stickiness is likely to occur). However, during a transition in such a reaction, the reaction should typically be controlled to proceed with a stickiness control parameter relatively far from the critical ΔMRT value determined in accordance with the invention. For increased safety and more reliable operation without resin stickiness, the reaction should be controlled such that neither a "$\Delta MRT_{ave}$" temperature (indicative of the difference between current reactor temperature and a reference temperature above which resin having bed-averaged resin properties in the reactor is predicted to become sticky) nor a "$\Delta MRT_{inst}$" temperature (indicative of the difference between current reactor temperature and a reference temperature above which the resin currently being produced in the reactor is predicted to become sticky) exceeds a predetermined limit or leaves a predetermined range. The predetermined limit or range for $\Delta MRT_{ave}$ may differ from that for $\Delta MRT_{inst}$.

When controlling a reaction to prevent a stickiness control parameter (generated in accordance with the invention) from exceeding a critical ΔMRT value (or leaving a critical ΔMRT range) the reactor temperature or ICA concentration may be adjusted (typically lowered) to bring the stickiness control parameter back into an acceptable range. Adjustments in the reactor temperature Trx are generally preferred because of the relatively quick response times involved. If, for example the calculated value of the stickiness control parameter were too high by 1° C., a reduction in reaction temperature of 1° C. would bring the stickiness control parameter back within range within a few minutes. Alternatively, an excessively high stickiness control parameter may be corrected by lowering the concentration (or partial pressure) of ICA in the reactor. This may be done, for example, by reducing the rate of ICA feed to the reactor, or by increasing the rate of venting from the reactor. In either case, the rate of change in ICA concentration (or partial pressure) is relatively slow, normally requiring several hours to effect the intended change. For this reason, adjustments in the reactor temperature are generally preferred.

BRIEF DESCRIPTION OF THE FIGURES

In FIG. 1, catalyst 3 and monomer feed 1 enter gas phase reactor 7 and are swept above distributor plate 2 into fluidized bed mixing zone 8 (provided with at least one temperature monitoring probe 10) where the monomer is polymerized into polymer that is then withdrawn via discharge apparatus 6, while recycle stream 9 is withdrawn from reactor 7 and passed to compressor 4, from compressor 4 to heat exchanger 5, and thereafter back into the reactor along with monomer feed 1.

FIG. 3 is a simplified cross-sectional view of a reaction system including a fluidized bed reactor (110), whose operation can be monitored and optionally also controlled in accordance with the invention.

FIG. 4 is a block diagram of some elements of the FIG. 3 system and additional elements for implementing a process for calculating control variables $MRT_R$ and ΔMRT. These parameters can be calculated using on-line data from the reaction system and can be used to provide a real-time estimate of the degree of resin stickiness in the fluidized bed.

FIG. 5 is a first melt DSC curve generated from measured data for the polymer and catalyst listed in Row 6 of Table 1. A dry MIT value of 97.4° C. was determined from the initial inflection point of the DSC curve as shown in the figure.

FIG. 6 is the DSC curve of FIG. 5 and another first melt DSC curve that shows the effect of dissolved hydrocarbons in displacing (or "depressing") the DSC curve of FIG. 3 to lower values of temperature. The dissolved hydrocarbons also produce a reduction of the MIT to a lower value, denoted as $MIT_R$ as shown. The shift (or displacement) of MIT values (D) is computed using the Flory equation.

FIG. 7 is a first melt DSC curve with indications that illustrate a calculation of the control variable ΔMIT as the difference between the reactor temperature (Trx) and the shifted value of the melt initiation temperature $MIT_R$.

DETAILED DESCRIPTION OF THE INVENTION

Figure 1:
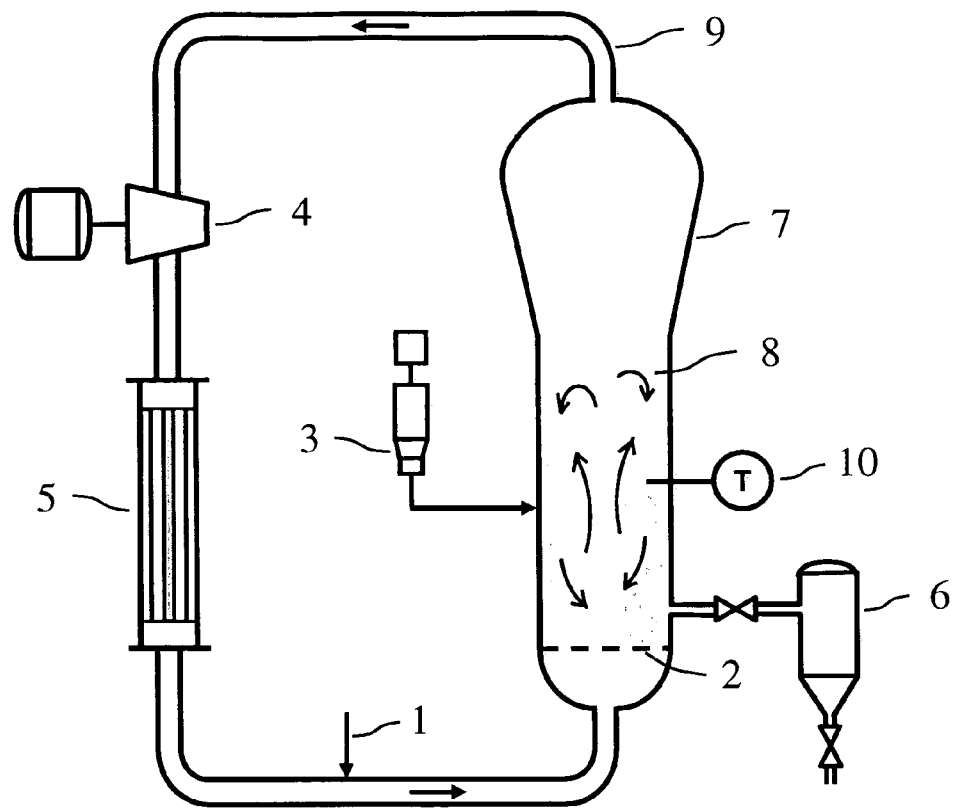
FIG. 1 is a simplified cross-sectional view of a gas phase reactor system employing a recycle stream.

Embodiments of the invention pertain to polymerization processes, particularly gas phase processes for polymerizing one or more monomer(s) in the presence of a catalyst system, and polymerization processes having improved operability and product capabilities. It has been surprisingly discovered that operating at a specific set of conditions rather than the usual commercial conditions in a gas phase polymerization process (e.g. below a "Critical Temperature" defined herein) provides for a substantially improved polymerization process and the production of polymers at commercially acceptable production rates.

We have found that problems associated with polymer stickiness induced by condensables in the reactor can be significantly reduced or eliminated by a process involving: 1) determining the dry sticking temperature of the polymer to be produced, 2) determining the melting point depression of the polymer that occurs when a sample of the polymer to be produced is immersed in a liquid (or liquid mixture) of the condensables to be used in the process (ICA and comonomer), 3) operating the gas phase reactor process with a bed temperature below a Critical Temperature, defined as the dry sticking temperature minus melting point depression. With the bed temperature below the Critical Temperature, stickiness in the resin due to high condensables concentrations is reduced or eliminated altogether. Hence, the condensable concentrations in the reactor can then be raised to obtain higher dew point temperatures, higher condensing levels, and higher production rates.

When practicing typical embodiments of the invention, the condensable concentration in the reactor is not significantly limited by stickiness, so the dew point temperature can be raised to the allowable dew point limit, which we define as $T_{DP}$ (max). In general, the maximum allowable dew point temperature will be a function of the bed temperature as well as the temperature of the reactor walls. (The walls of the reactor normally operate somewhat lower than the bed temperature.) The highest allowable dew point temperatures are obtained with wall temperatures equal to the bed temperature, which is operated at or slightly below the critical temperature. For this reason, the use of reactors with external insulation is preferred in some embodiments. The external insulation may be used in combination with heating means (electrical or steam tracing with an associated temperature control system)

to maintain the reactor wall temperatures approximately equal to the bed temperature (e.g. within 2° C. of the bed temperature or less, preferably 1° C. or less).

Stickiness can be induced in polymers by two means: raising the temperature of the material, or by increasing the concentration of dissolved components within the polymer. In the gas phase process, the dissolved components include the higher molecular weight (higher boiling) components in the reactor gas such as, comonomers (e.g. 1-butene or 1-hexene) and induced condensing agents (ICA's). ICA's are inert condensable fluids (typically C5 or C6 saturated hydrocarbons) that are added to the reactor to increase the cooling capacity of the reactor system for increased production rates. Use of ICA's is further described in U.S. Pat. Nos. 5,342,749 and 5,436,304 both of which are herein fully incorporated by reference. Lower molecular weight components such as ethylene, nitrogen and hydrogen typically have only minimal solubility in the polymer, and therefore do not tend to induce stickiness in the polymer.

Figure 2:
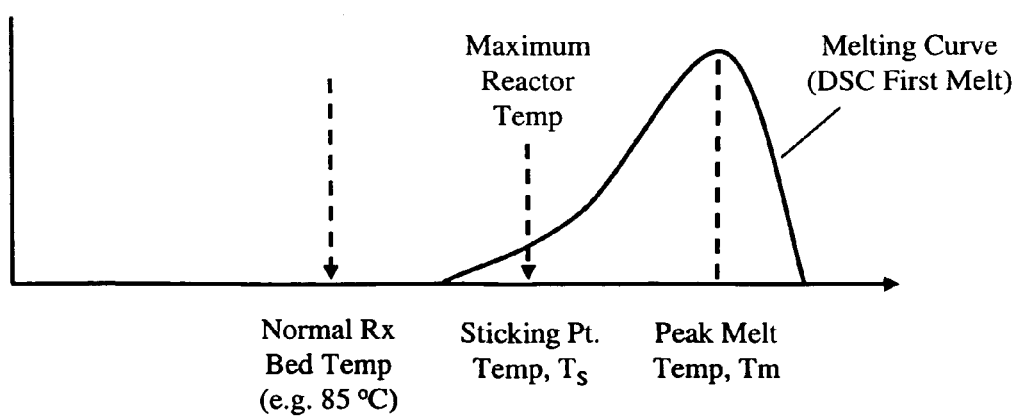
FIG. 2 is an approximation of a typical DSC melting curve of a polymer illustrating a typical reactor temperature and the limiting resin sticking temperature (Ts) relative to the DSC melting curve.

FIG. 2 is an approximation of a typical DSC melting curve of a polymer. The melting temperature "Tm" is taken as the peak of the melting curve. The reactor bed temperature is normally operated considerably below the melting temperature as shown. For a typical LLDPE film resin (0.917 g/cc density, melt index of 1 dg/min) the melting temperature of the polymer is in the range of 119 to 127° C. (as measured dry, without dissolved components). For these grades the bed temperature would normally be set at 84 to 87° C. Stickiness in the polymer would be induced if the reactor bed temperature were increased to the point at which it would begin to overlap the polymer melting curve as shown in the figure. For Ziegler-Natta catalyzed resins, stickiness occurs when approximately 15% overlap occurs (i.e. 15% of the crystalline fraction of the polymer melted). For metallocene catalyzed resins, a higher degree of overlap is required to induce stickiness. While the exact number is not known for metallocene, it is believed to be in the range of 30 to 40%.

Stickiness can also be induced in the polymer product by increasing the concentration of condensables in the reactor gas phase. The condensables become dissolved in the polymer and act to depress the polymer melt curve. Stickiness in the polymer results when the melting curve is depressed to the point at which it overlaps the reactor operating temperature (the bed temperature).

Thus determination of the sticking temperature for each polymer to be made is very useful to reactor operations. The dry sticking temperature must be determined in a fluid bed of the polymer to be tested operating at substantially the same conditions as the production process, but with no condensable gases in the system and with no catalyst (i.e. no reaction). The dry sticking temperature is determined in a reactor operating at equivalent pressure and gas velocity, but with the normal gas components replaced with substantially pure nitrogen. The vessel for the testing has a differential pressure sensor for monitoring the pressure difference between the bottom and the top of the fluid bed (bed DP), and DP sensors for monitoring the degree of fouling (if any) on the reactor heat exchanger, and distributor plate. The fluid bed is initially operated at a bed temperature $T_B$ of at least 40° C. below the peak melting temperature Tm of the polymer to be produced. The bed temperature is then slowly increased at a rate of 2° C. per hour. The dry sticking temperature is taken as the temperature at which agglomerations or fouling on any surface of the vessel begins to occur (as evidenced by an increase in heat exchanger or plate DP) or the temperature at which there is at least a 50% drop in bandwidth of the bed DP reading, which ever is the lesser temperature.

Once the dry sticking temperature of the system is determined then the melting point depression of the polymer in question is determined. The melting point depression of the polymer ($\Delta$Tm) is determined by first measuring the melting temperature of a polymer by DSC, and then comparing this to a similar measurement on a sample of the same polymer that has been soaked with the condensable fluid or condensable fluid mixture for a period of four hours. In general, the melting temperature of the soaked polymer will be lower than that of the dry polymer. The difference in these measurements is taken as the melting point depression ($\Delta$Tm). Higher concentrations of dissolved materials in the polymer cause larger depressions in the polymer melting temperature (i.e. higher values of $\Delta$Tm). A suitable DSC technique for determining the melting point depression is described by, P. V. Hemmingsen, "Phase Equilibria in Polyethylene Systems", Ph.D Thesis, Norwegian University of Science and Technology, March 2000 (a preferred set of conditions for conducting the tests are summarized on page 112 of this reference). The polymer melting temperature is first measured with dry polymer, and then repeated with the polymer immersed in liquid (the condensable fluid or condensable fluid mixture to be evaluated) where the polymer has been immersed for four hours. As described in the reference cited above, it is important to ensure that the second part of the test, conducted in the presence of the liquid, is done in a sealed container so that the liquid is not flashed during the test, which could introduce experimental error. In conventional DSC work, it is common to measure the "second melt" curve. This involves steps melting the polymer in a first scan through the DSC, cooling it back to ambient temperature, and slowly reheating the material for the final DSC test. This second melt method provides improved reproducibility, but is not the preferred method for the present work. To determine the Critical Temperature for gas phase operation, it is preferred to use only a single pass (or scan) in the DSC. This "first melt" data is believed to more accurately reflect the true melt curve of the resin as it exists in the reactor.

The actual depression of the polymer melting curve that will occur a gas phase reactor will be variable depending on the concentrations of condensable components in the system. Lower concentrations of condensables will produce smaller depressions, and higher concentrations will produce larger depressions. In all cases, the actual depression will be less than or equal to the melting point depression measured in a liquid immersed sample. For hydrocarbons, we found the maximum depression to typically about 19 to 22° C. depending on which hydrocarbons are used.

The Critical Temperature is defined as the dry sticking temperature minus the melting point depression (i.e. Tc=Ts (dry)−$\Delta$Tm).

If the reactor bed temperature is reduced so that it is equal to or less than the critical temperature, it is theoretically difficult, if not impossible, to induce stickiness in the resin by partial melting of the polymer, regardless of the concentration of condensable components in the reactor system. It is therefore possible to increase the ICA concentration to the point at which the dew point temperature of the reactor gas is equal to the bed temperature. This would produce saturation of the reactor gas with the ICA, but will not induce stickiness in the fluid bed.

However, with non-insulated reactor walls, it is not easy to operate with a dew point temperature equal to the bed temperature. The walls of the reactor (i.e. the metal reactor vessel) normally operate at temperatures somewhat cooler than the fluid bed. For example, the walls of the reactor straight section are typically 3 to 4° C. lower than the bed temperature, and the walls of the expanded section (above the fluid bed) are typically 5 to 6° C. lower than the bed temperature. In the past, to avoid condensation on the walls of the reactor and expanded section, it was typical to limit the dew point temperature (and corresponding ICA concentration) to a value approximately 10-12° C. less than the bed temperature. Now however, we can define a maximum allowable dew point temperature as $T_{DP}$ (max). It is the lowest of the following three temperatures; the reactor wall temperature (the metal temperature in the reaction section), the reactor dome temperature, or the reactor bed temperature. Thus, the highest allowable dew point limits (and consequently the highest allowable production rates) will be obtained for reactors with wall and dome temperatures approximately equal to the bed temperature. For this reason, insulated reactors are extremely useful when practicing typical embodiments of the present invention. The external insulation may be used in combination with heating means (electrical or steam tracing with an associated temperature control system) to maintain the reactor wall temperatures approximately equal to the bed temperature (e.g. within 2° C. of the bed temperature, preferably 1° C. or less). In a preferred embodiment, if the reactor were provided with effective external insulation on both the straight section and the expanded section (dome), the allowable dew point temperature could be raised to approximately the bed temperature. This would provide a substantial increase in dew point temperature and corresponding increases in maximum condensed mode production rates compared to processes of the prior art.

Suitable insulation materials include ceramic fiber, fiberglass, and calcium silicate. The thickness of the insulation would preferably be 1 to 15 cm, and more preferably 5 to 8 cm. The insulation would preferably be weather-proofed to prevent water incursion. Suitable weather-proofing material would be metal cladding panels with sealant (or caulking) applied at the panel junctions.

Suitable instruments for measuring the reactor wall and dome temperatures include conventional wall temperature probes. These "wall TC" probes are typically mounted in stainless steel sheaths (3-6 mm in diameter) with a rounded tip that contains the thermocouple sensing element. These probes are typically inserted through the reactor wall using an appropriate pressure sealing (or feedthrough) device. Suitable feedthrough devices include those manufactured by Conax Buffalo Corp. The probes are inserted through the sealing device such that the tip of each probe is approximately flush with the interior wall, or extend slightly (1-5 mm) past the wall into the reactor. Reactors are preferably equipped with a number of wall TC probes to monitor wall temperatures at various positions in the reactor section and dome.

In a preferred embodiment any of the polymerization process described herein are a continuous process. By continuous is meant a system that operates (or is intended to operate) without interruption or cessation. For example a continuous process to produce a polymer would be one in which the reactants are continuously introduced into one or more reactors and polymer product is continually withdrawn.

Some embodiments of the invention provide a continuous gas phase process for polymerizing one or more hydrocarbon monomer(s) in the presence of a conventional-type transition metal catalyst or catalyst system and a condensable fluid, preferably a C3 to C10 hydrocarbon, a fluorinated hydrocarbon or a mixture thereof, wherein, the conventional-type transition metal catalyst or catalyst system comprises a transition metal, wherein the molar ratio of the condensable fluid to the transition metal is greater than 500:1, preferably the molar ratio is in the range of from 900:1 to 10,000:1, preferably 1500:1 to 20,000:1, and the reactor temperature is below the Critical Temperature, optionally for more than 24 hours.

Some embodiments of the invention are directed to a continuous gas phase process for polymerizing one or more hydrocarbon olefin(s), preferably at least one of which is ethylene or propylene, in the presence of a polymerization catalyst, in a fluidized bed reactor, the process operating in a condensed mode in which a liquid and a gas are introduced to the fluidized bed reactor having a fluidizing medium, wherein the level of condensable fluid, preferably a C3 to C10 hydrocarbon, a fluorinated hydrocarbon or a mixture thereof, is greater than 1 weight percent, preferably greater than 2 weight percent, more preferably greater than 10 weight percent, even more preferably greater than 15 weight percent, still even more preferably greater than 25 weight percent, and most preferably greater than 30 weight percent up to 60 weight percent or more, preferably 35 weight percent or more, based on the total weight of the liquid and gas entering the reactor, and where the reactor temperature is below the Critical Temperature, preferably for a period of more than 24 hours.

In another embodiment, the polymerization catalyst comprises a metal, and the molar ratio of the condensable fluid, to the metal is greater than 500:1, preferably in the range of from 900:1 to 10,000:1, preferably 1500:1 to 20,000:1.

In another embodiment, the process is further operated wherein the level of condensable liquid is greater than 1 weight percent, preferably greater than 2 weight percent, more preferably greater than 10 weight percent, even more preferably greater than 15 weight percent, still even more preferably greater than 25 weight percent, and most preferably greater than 30 weight percent up to 60 weight percent or more, preferably 35 weight percent or more, based on the total weight of the liquid and gas entering the reactor. In a further preferred embodiment, the conventional-type transition metal catalyst or catalyst system comprises a transition metal, wherein the molar ratio of the condensable fluid, preferably the fluorinated hydrocarbon, to the transition metal is greater than 500:1, preferably the molar ratio is greater than 900:1, and most preferably the molar ratio is greater than 1000:1.

In an embodiment, the invention is directed to a process (e.g., a continuous process) for polymerizing monomer(s) in a reactor, said process comprising the steps of: (a) introducing a recycle stream into the reactor, the recycle stream comprising one or more monomer(s); (b) introducing a polymerization catalyst or catalyst system and a condensable fluid into the reactor where the reactor operates at a temperature below the Critical Temperature, preferably for a period of more than 24 hours; (c) withdrawing the recycle stream from the reactor; (d) cooling the recycle stream to form a gas phase and a liquid phase; (e) reintroducing the gas phase and the liquid phase, separately, and/or in combination, into the reactor; (f) introducing into the reactor additional monomer(s) to replace the monomer(s) polymerized; and (g) withdrawing a polymer product from the reactor. In a preferred embodiment, the condensable fluid is introduced in a concentration greater than 0.5 mole percent, preferably greater than 1 mole percent, more preferably greater than 2 mole percent, still more preferably greater than 3 mole percent, even more preferably greater than 4 mole percent, still even more preferably greater than 5 mole percent, still even more preferably greater than 7 mole percent, still even more preferably greater than 10 mole percent, still even more preferably greater than 15 mole percent, still even more preferably greater than 20 mole percent, and most preferably greater than 25 mole percent, based on the total moles of gas in the reactor.

In many of the described embodiments of the invention, a preferred catalyst system or polymerization catalyst is a conventional-type transition metal catalyst such as a Ziegler-Natta-type catalyst and a Phillips-type catalyst, or a bulky ligand metallocene-type catalyst.

Herein (including in the claims) the expression "bed temperature" is used to mean the temperature of a fluidized bed measured at an elevation at least one-half of the reactor diameter above the distributor plate and at a radial distance at least 0.1 times the reactor diameter from the wall of the reactor.

Many of the described embodiments of the invention are preferably operated (preferably continuously) with a bed temperature below the Critical Temperature and with a dew point temperature within 25° C. of the bed temperature (preferably within 20° C. of the bed temperature, preferably within 15° C. of the bed temperature, preferably within 10° C. of the bed temperature, preferably within 5° C. of the bed temperature, preferably within 4° C. of the bed temperature, preferably within 3° C. of the bed temperature, preferably within 2° C. of the bed temperature, preferably within 1° C. of the bed temperature.

Many of the described embodiments of the invention are preferably continuously operated below the Critical Temperature for at least 12 hours, preferably at least 24 hours, preferably at least 36 hours, preferably at least 48 hours, preferably at least 72 hours, preferably at least 7 days, preferably at least 14 days, preferably at least 21 days, preferably at least 30 days.

In many of the described embodiments of the invention the reactor temperature is preferably within 10° C. below the Critical Temperature, preferably within 5° C. below the Critical Temperature.

In another embodiment, the invention is directed to a continuous process for polymerizing one or more hydrocarbon monomer(s), preferably a gas phase process, preferably operating in condensed mode, preferably operating with a fluidized bed, for polymerizing one or more olefin(s) in the presence of catalyst system or polymerization catalyst and a condensable fluid, preferably a condensable fluid comprising a C3 to C10 hydrocarbon, a fluorinated hydrocarbon or a combination thereof at a temperature less than the Z Temperature (where the Z Temperature is the heat seal initiation temperature of the polymer to be made minus the melting point depression of the polymer to be made) for a period of at least 12 hours preferably 24 hours. Melting point depression is measured as described above.

To determine heat seal initiation temperature, 100 kilograms of the polymer in question are melt homogenized on a Werner Pfleiderer Model ZSK-57 twin screw extruder and pelletized. The polymer is then converted into a film having a thickness of 1.5 to 2.0 mils (37.5 to 50 microns) using a 1 inch Killion Mini Cast Line, Model KLB 100. Heat seals are made from the films on a laboratory scale Theller Model EB heat sealer. A dwell time of about one second and a sealing pressure of 50 N/cm$^2$ are used for making the seals. The seals on the films are made in the transverse direction and the heat sealing anvils are insulated from the heat sealing film by a Mylar® film. The Mylar® film is very stable at normal heat sealing temperatures and is easily removed from the heat sealing polymer after the seal has been made. The seals are tested within 1 minute of sealing. For the strength test, the sealed samples are cut into 0.5 inch (1.27 cm) wide pieces and then strength tested using an Instron instrument at a crosshead speed of 20 inches/min (508 mm/min) and a 2 inch (5.08 cm) jaw separation. The free ends of the samples are fixed in the jaws, and then the jaws are separated at the strain rate until the seal fails. The peak load at the seal break is measured and the seal strength is calculated by diving the peak load by the sample width. The heat seal initiation temperature is determined by measuring the seal strengths of each sample sealed at various temperatures beginning at 50° C. below the polymer melting point (Tm) and then increasing at 2° C. intervals and then extrapolating from a plot of seal strength versus temperature to find the lowest temperature at which at least 0.5 N/cm seal strength is present. The heat seal initiation temperature is the lowest temperature at which at least 0.5 N/cm seal strength is present.

In an alternate embodiment, in any of the embodiments described herein the process is operated below the Z Temperature. In an alternate embodiment of any of the embodiments described herein the process is operated below the Z Temperature instead of below the Critical Temperature.

In another embodiment, the invention is directed to a continuous process for polymerizing one or more hydrocarbon monomer(s), preferably a gas phase process, preferably operating in condensed mode, preferably operating with a fluidized bed, for polymerizing one or more olefin(s) in the presence of catalyst system or polymerization catalyst and a condensable fluid, preferably a condensable fluid comprising a C3 to C10 hydrocarbon, a fluorinated hydrocarbon or a combination thereof at a temperature less than the Q Temperature (where the Q Temperature is the hot tack initiation temperature of the polymer to be made minus the melting point depression of the polymer to be made) for a period of at least 12 hours preferably 24 hours. Melting point depression is measured as described above.

Hot tack strength is measured in accordance with the following procedure. The hot tack samples are 15 mm wide specimens cut from cast films produced according to the procedure for heat seal initiation measurement above. The samples are back-taped (laminated) with 2 mil (approx. 50 microns) polyethylene terephthalate film to avoid rupture at the transition of the seal and elongation or sticking to the seal bars. A Hot Tack Tester 3000, from J&B (J & B Instruments BV, Heerlen, The Netherlands or J& B instruments USA, Inc., Spartanburg, S.C.), was employed to make the seal, using a seal bar pressure of 0.5 MPa, and a seal time of 0.5 sec. The hot tack force is then determined, after a cooling time of 0.4 seconds and at a peel speed of 200 mm/sec. The force at the seal break is measured and the hot tack strength is calculated by diving the hot tack force by the sample width. Hot tack initiation temperature is determined by measuring the hot tack strengths of each sample sealed at various temperatures beginning at 50° C. below the polymer melting point (Tm) and then increasing at 2° C. intervals and then extrapolating from a plot of hot tack strength versus temperature to find the lowest temperature at which at least 0.06 N/cm hot tack strength is present. The hot tack initiation temperature is the lowest temperature where an at least 0.06 N/cm hot tack strength is present.

In an alternate embodiment, in any of the embodiments described herein the process is operated below the Q Temperature. In an alternate embodiment of any of the embodiments described herein the process is operated below the Q Temperature instead of below the Critical Temperature.

Catalyst Components and Catalyst Systems

All polymerization catalysts including conventional-type transition metal catalysts are suitable for use in various embodiments of the inventive polymerization process. The following is a non-limiting discussion of the various polymerization catalysts that may be so useful. All numbers and references to the Periodic Table of Elements are based on the new notation as set out in Chemical and Engineering News, 63(5), 27 (1985). In the description herein the transition metal compound may be described as a catalyst precursor, a transition metal catalyst, a polymerization catalyst, or a catalyst compound, and these terms are used interchangeably. The term activator is used interchangeably with the term co-catalyst. A catalyst system is combination of a catalyst compound and an activator.

Conventional-Type Transition Metal Catalysts

Conventional-type transition metal catalysts are those traditional Ziegler-Natta-type catalysts and Phillips-type chromium catalysts well known in the art. Examples of conventional-type transition metal catalysts are discussed in U.S. Pat. Nos. 4,115,639, 4,077,904, 4,482,687, 4,564,605, 4,721, 763, 4,879,359 and 4,960,741, all of which are herein fully incorporated by reference. The conventional-type transition metal catalyst compounds that may be used in the present invention include transition metal compounds from Groups 3 to 10, preferably 4 to 6 of the Periodic Table of Elements.

These conventional-type transition metal catalysts may be represented by the formula:

$$MR_x \qquad (I)$$

where M is a metal from Groups 3 to 10, preferably Group 4, more preferably titanium; R is a halogen or a hydrocarbyloxy group; and x is the valence of the metal M, preferably x is 1, 2, 3 or 4, more preferably x is 4. Non-limiting examples of R include alkoxy, phenoxy, bromide, chloride and fluoride. Non-limiting examples of conventional-type transition metal catalysts where M is titanium include $TiCl_3$, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that may be useful to implement embodiments of the invention are described in, for example, U.S. Pat. Nos. 4,302,565 and 4,302,566, which are herein fully incorporate by reference. The $MgTiCl_6$ (ethyl acetate)$_4$ derivative is particularly preferred. British Patent Application 2,105,355, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu is butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$, to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, may be suitable for use in implementing the present invention include $CrO_3$, chromocene, silyl chromate, chromyl chloride ($CrO_2Cl_2$), chromium-2-ethyl-hexanoate, chromium acetylacetonate (Cr(A-cAc)$_3$), and the like. Non-limiting examples are disclosed in U.S. Pat. Nos. 2,285,721, 3,242,099 and 3,231,550, which are herein fully incorporated by reference.

Still other conventional-type transition metal catalyst compounds and catalyst systems that may be suitable for use in implementing the present invention are disclosed in U.S. Pat. Nos. 4,124,532, 4,302,565, 4,302,566 and 5,763,723 and published EP-A2 0 416 815 A2 and EP-A1 0 420 436, which are all herein incorporated by reference.

Conventional-type transition metal catalysts useful in implementing the invention may have the general formula:

$$M'_tM''X_{2t}Y_uE \qquad (II)$$

where M' is Mg, Mn and/or Ca; t is a number from 0.5 to 2; M" is a transition metal such as Ti, V and/or Zr; X is a halogen, preferably Cl, Br or I; Y may be the same or different and is halogen, alone or in combination with oxygen, —$NR_2$, —OR, —SR, —COOR, or —OSOOR, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: $MgTiCl_5.2CH_3COOC_2H_5$, $Mg_3Ti_2Cl_{12}.7CH_3COOC_2H_5$, $MgTiCl_5.6C_2H_5OH$, $MgTiCl_5.100CH_3OH$, $MgTiCl_5$.tetrahydrofuran, $MgTi_2Cl_{12}.7C_6H_5CN$, $Mg_3Ti_2Cl_{12}.6C_6H_5COOC_2H_5$, $MgTiCl_6.2CH_3COOC_2H_5$, $MgTiCl_6.6C_5H_5N$, $MnTiCl_5.4C_2H_5OH$, $MgTiCl_5(OCH_3).2CH_3COOC_2H_5$, $MgTiCl_5N(C_6H_5)_2.3CH_3COOC_2H_5$, $MgTiBr_2Cl_4.2(C_2H_5)_2O$, $Mg_3V_2Cl_{12}.7CH_3—COOC_2H_5$, $MgZrCl_6.4$ tetrahydrofuran. Other catalysts may include cationic catalysts such as $AlCl_3$, and other cobalt and iron catalysts well known in the art.

Typically, these conventional-type transition metal catalyst compounds (excluding some conventional-type chromium catalyst compounds) are activated with one or more of the conventional-type cocatalysts described below.

Conventional-Type Cocatalysts

Conventional-type cocatalyst compounds for the above conventional-type transition metal catalyst compounds may be represented by the formula:

$$M^3M^4_vX^2_cR^3_{b-c} \qquad (III)$$

wherein $M^3$ is a metal from Group 1, 2, 12 and 13 of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1.

Other conventional-type organometallic cocatalyst compounds for the above conventional-type transition metal catalysts have the formula:

$$M^3R^3_k \qquad (IV)$$

where $M^3$ is a Group 1, 2, 12 or 13 metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical Non-limiting examples of conventional-type organometallic cocatalyst compounds of Groups 1, 2, 12 and 13 useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art, and a more complete discussion of these compounds may be found in U.S. Pat. Nos. 3,221,002 and 5,093,415, which are herein fully incorporated by reference.

For purposes of this patent specification and appended claims conventional-type transition metal catalyst compounds exclude those bulky ligand metallocene-type catalyst compounds discussed below. For purposes of this patent specification and the appended claims the term "cocatalyst" refers to conventional-type cocatalysts or conventional-type organometallic cocatalyst compounds.

In some embodiment, however, it is preferred that the catalyst system not comprise titanium tetrachloride, particularly not the combination of $TiCl_4$ and aluminum alkyl (such as triethylaluminum), particularly when the FC is a perfluorocarbon. In situations where the catalyst is titanium tetrachloride, particularly the combination of $TiCl_4$ and aluminum alkyl (such as triethylaluminum) the FC is preferably a hydrofluorocarbon. In another embodiment, the catalyst is not a free radical initiator, such as peroxide.

Bulky Ligand Metallocene-Type Catalyst Compounds

Typically, polymerization catalysts useful in the invention include one or more bulky ligand metallocene compounds (also referred to herein as metallocenes). Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements; preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as, but not limited to, those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

Exemplary of these bulky ligand metallocene-type catalyst compounds and catalyst systems are described in for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664 all of which are herein fully incorporated by reference. Also, the disclosures of European publications EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144 are all herein fully incorporated by reference for purposes of describing typical bulky ligand metallocene-type catalyst compounds and catalyst systems.

In one embodiment, the polymerization catalyst useful in the process of the invention includes one or more bulky ligand metallocene catalyst compounds represented by the formula:

$$L^A L^B M Q_n \quad\quad\quad (V)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula V only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula V above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the polymerization catalysts useful in the process of the invention may include one or more bulky ligand metallocene catalyst compounds where $L^A$ and $L^B$ of Formula V are bridged to each other by at least one bridging group, A, as represented by:

$$L^A A L^B M Q_n \qquad (VI)$$

wherein $L^A$, $L^B$, M, Q and n are as defined above. These compounds of Formula VI are known as bridged, bulky ligand metallocene catalyst compounds. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si R'_2Si$, $R'_2Ge$, $R'P$, where $R'$ is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula VI have two or more bridging groups A (EP-B1-0 664 301, which is incorporated herein by reference).

In another embodiment, the bulky ligand metallocene catalyst compounds are those where the R substituents on the bulky ligands $L^A$ and $L^B$ of Formulas V and VI are substituted with the same or different number of substituents on each of the bulky ligands. In another embodiment, the bulky ligands $L^A$ and $L^B$ of Formulas V and VI are different from each other.

Other bulky ligand metallocene catalyst compounds and catalyst systems that may be useful in embodiments of the invention include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547, 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions of the invention may include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198, 401, 5,227,440 and 5,264,405 and European publication EP-A-0 420 436, all of which are herein fully incorporated by reference.

In another embodiment, the polymerization catalyst useful in the process of the invention includes one or more bulky ligand metallocene catalyst compounds represented by Formula VII:

$$L^C A J M Q_n \qquad (VII)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to J and $L^C$; J is a heteroatom ancillary ligand; and A is a bridging group; Q is a univalent anionic ligand; and n is the integer 0,1 or 2. In Formula VII above, $L^C$, A and J form a fused ring system.

In Formula VII, J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred. In a preferred embodiment, when the catalyst system comprises compounds represented by Formula VII, the fluorocarbon preferably is a hydrofluorocarbon. Preferably, when the catalyst system comprises compounds represented by Formula VII, the fluorocarbon is not a perfluorocarbon.

In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in PCT Publication Nos. WO 96/33202, WO 96/34021, WO 97/17379 and WO 98/22486 and EP-A1-0 874 005 and U.S. Pat. Nos. 5,233,049, 5,539,124, 5,554,775, 5,637,660, 5,744,417, 5,756,611 and 5,856,258 all of which are herein incorporated by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B 1-0 735 057, all of which are herein fully incorporated by reference.

In another embodiment, the polymerization catalysts useful in the process of the invention includes one or more bulky ligand metallocene catalyst compounds represented by Formula VIII:

$$L^D MQ_2(YZ)X_n \qquad (VIII)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a unicharged polydentate ligand; or Q is a univalent anionic ligand also bonded to M; X is a univalent anionic group when n is 2 or X is a divalent anionic group when n is 1; n is 1 or 2.

In Formula VIII, L and M are as defined above for Formula V. Q is as defined above for Formula V, preferably Q is selected from the group consisting of —O—, —NR—, —CR2— and —S—; Y is either C or S; Z is selected from the group consisting of —OR, —NR2, —CR3, —SR, —SiR3, —PR2, —H, and substituted or unsubstituted aryl groups, with the proviso that when Q is —NR— then Z is selected from one of the group consisting of —OR, —NR2, —SR, —SiR3, —PR2 and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

Still other useful polymerization catalysts include those multinuclear metallocene catalysts as described in PCT Publication No. WO 99/20665 and U.S. Pat. No. 6,010,794, and transition metal metaaracyle structures described in EP-A2-0 969 101, which are herein incorporated herein by reference. Other metallocene catalysts include those described in EP-A1-0 950 667, double cross-linked metallocene catalysts (EP-A1-0 970 074), tethered metallocenes (EP-A2-0 970 963) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference), chiral, achiral, and mixtures thereof.

In another embodiment, the bulky ligand type metallocene-type catalyst compound is a complex of a transition metal, a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In one embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT Publications Nos. WO 96/33202, WO 99/01481 and WO 98/42664, and U.S. Pat. No. 5,637,660, which are fully incorporated herein by reference.

In one embodiment, these catalyst compounds are represented by the formula:

$$((Z)XA_t(YJ))_q MQ_n \qquad (IX)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional.

In another embodiment, where X is nitrogen or phosphorous then Z is present. In an embodiment, Z is preferably an aryl group, more preferably a substituted aryl group.

In another embodiment of the invention the bulky ligand metallocene-type catalyst compounds are those nitrogen containing heterocyclic ligand complexes, also known as transition metal catalysts based on bidentate ligands containing pyridine or quinoline moieties, such as those described in WO 96/33202, WO 99/01481 and WO 98/42664 and U.S. Pat. No. 5,637,660, which are herein all incorporated by reference.

Polymerization catalysts useful in some embodiments of the inventive process include complexes of $Ni^{2+}$ and $Pd^{2+}$ described in the articles Johnson, et al., "New Pd(II)- and Ni(II)-Based Catalysts for Polymerization of Ethylene and a-Olefins", *J. Am. Chem. Soc.* 1995, 117, 6414-6415 and Johnson, et al., "Copolymerization of Ethylene and Propylene with Functionalized Vinyl Monomers by Palladium(II) Catalysts", *J. Am. Chem. Soc.,* 1996, 118, 267-268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by activators described below.

Also included as bulky ligand metallocene-type catalyst compounds useful herein are those diimine based ligands for Group 8 to 10 metal compounds disclosed in PCT publications WO 96/23010 and WO 97/48735 and Gibson, et. al., Chem. Comm., pp. 849-850 (1998), all of which are herein incorporated by reference.

Other bulky ligand metallocene-type catalysts useful herein are those Group 5 and 6 metal imido complexes described in EP-A2-0 816 384 and U.S. Pat. No. 5,851,945, which is incorporated herein by reference. In addition, bulky ligand metallocene-type catalysts useful herein include bridged bis(arylamido) Group 4 compounds described by D. H. McConville, et al., in Organometallics 1195, 14, 5478-5480, which is herein incorporated by reference. Other bulky ligand metallocene-type catalysts useful herein are described as bis(hydroxy aromatic nitrogen ligands) in U.S. Pat. No. 5,852,146, which is incorporated herein by reference. Other metallocene-type catalysts containing one or more Group 15 atoms useful herein include those described in WO 98/46651, which is herein incorporated herein by reference. Still another metallocene-type bulky ligand metallocene-type catalysts useful herein include those multinuclear bulky ligand metallocene-type catalysts as described in WO 99/20665, which is incorporated herein by reference. In addition, useful Group 6 bulky ligand metallocene catalyst systems are described in U.S. Pat. No. 5,942,462, which is incorporated herein by reference.

It is contemplated in some embodiments, that the bulky ligands of the metallocene-type catalyst compounds used in some embodiments of the invention described above may be asymmetrically substituted in terms of additional substituents or types of substituents, and/or unbalanced in terms of the number of additional substituents on the bulky ligands or the bulky ligands themselves are different.

Mixed Catalysts

In some embodiments, the above-described bulky ligand metallocene-type catalyst compounds can be combined with one or more of the conventional-type transition metal catalysts compounds with one or more co-catalysts or activators or activation methods described above. For example, see U.S. Pat. Nos. 4,937,299, 4,935,474, 5,281,679, 5,359,015, 5,470,811, and 5,719,241, all of which are fully incorporated herein by reference.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090, all of which are herein incorporated by reference.

Activator and Activation Methods

The above described polymerization catalysts, particularly bulky ligand metallocene-type catalyst, are typically activated in various ways to yield polymerization catalysts having a vacant coordination site that will coordinate, insert, and polymerize olefin(s).

The term "activator" is used herein to denote any compound which can activate any one of the polymerization catalyst compounds described herein by converting the neutral polymerization catalyst compound to a catalytically active catalyst cation compound. Non-limiting activators, for example, include alumoxanes, aluminum alkyls, ionizing activators, which may be neutral or ionic, and conventional-type cocatalysts.

Alumoxanes

In some embodiments, at least one alumoxane activator is utilized as an activator with at least one polymerization catalyst. Alumoxanes are generally oligomeric compounds containing —Al(R)—O— subunits, where R is an alkyl group. Non-limiting examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. Another alumoxane is a modified methyl alumoxane (MMAO) cocatalyst type 3A (commercially available from Akzo Chemicals, Inc. under the trade name Modified Methylalumoxane type 3A; see U.S. Pat. No. 5,041,584). Aluminum alkyl or organoaluminum compounds which may be utilized as activators include trimethylaluminum, triethylaluminum, triisobutylaluminum, tri-n-hexylaluminum, tri-n-octylaluminum and the like.

Ionizing Activators

Some embodiments of the invention use an ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. Some embodiments of the invention use neutral or ionic activators alone or in combination with alumoxane or modified alumoxane activators.

Non-limiting examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds for the polymerization catalysts described above may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198, 401, 5,066,741, 5,206,197, 5,241,025, 5,384,299 and 5,502, 124 and U.S. patent application Ser. No. 08/285,380, filed Aug. 3, 1994, all of which are herein fully incorporated by reference.

In a preferred embodiment, the stoichiometric activators include a cation and an anion component, and may be represented by the following formula:

$$(L-H)_d^+ \cdot (A^{d-}) \qquad (X)$$

wherein: L is a neutral Lewis base; H is hydrogen; $(L-H)^+$ is a Bronsted acid; $A^{d-}$ is a non-coordinating anion having the charge d−; and d is an integer from 1 to 3. The cation component, $(L-H)_d^+$ may include Bronsted acids such as protons or protonated Lewis bases or reducible catalysts capable of protonating or abstracting a moiety, such as an akyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^-$ includes those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic stoichiometric activator $(L-H)_d^+ \cdot (A^{d-})$ is N,N-dimethylanilinium tetra(perfluorophenyl)borate or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

Additional Activators

Other activators include those described in PCT Publication No. WO 98/07515 such as tris(2, 2', 2"-nonafluorobiphenyl)fluoroaluminate, which publication is fully incorporated herein by reference. Combinations of activators are also contemplated for use in some embodiments of the invention, for example, alumoxanes and ionizing activators in combinations, see for example, EP-B1 0 573 120, PCT Publications Nos. WO 94/07928 and WO 95/14044 and U.S. Pat. Nos. 5,153,157 and 5,453,410, all of which are herein fully incorporated by reference.

Other activators that may be suitable are disclosed in PCT Publication No. WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium(2,2'-bisphenyl-ditrimethylsilicate)•4THF as an activator for a bulky ligand metallocene catalyst compound. PCT Publication No. WO 99/18135, incorporated herein by reference, describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins.

Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis (tris(pentafluorophenyl)borane)benzimidazolide), which are herein incorporated by reference.

Another suitable ion forming, activating cocatalyst comprises a salt of a cationic oxidizing agent and a noncoordinating, compatible anion represented by the formula:

$$(OX^{e+})_d(A^{d-})_e \qquad (XII)$$

wherein $OX^{e+}$ is a cationic oxidizing agent having a charge of e+; e is an integer from 1 to 3; and $A^-$, and d are as previously defined above. Non-limiting examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

Any of the polymerization catalysts described above can be combined one or more activators or activation methods described above in some embodiments of the invention. For example, a combination of activators have been described in U.S. Pat. Nos. 5,153,157 and 5,453,410, European publication EP-B1 0 573 120, and PCT publications WO 94/07928 and WO 95/14044. These documents all discuss the use of an alumoxane and an ionizing activator with a bulky ligand metallocene catalyst compound.

Supported Activators

Many supported activators are useful in combination with one or more of the polymerization catalysts, especially the bulky ligand metallocene-type catalysts described above. A supported activator is where any one or more of the activators described above is supported on any one or more of the support materials described below. Non-limiting supported activators and methods for making them are described in various patents and publications which include: U.S. Pat. Nos. 4,871,705, 4,912,075, 4,935,397, 4,937,217, 4,937,301, 5,008,228, 5,015,749, 5,026,797, 5,057,475, 5,086,025, 5,147,949, 5,212,232, 5,229,478, 5,288,677, 5,332,706, 5,420,220, 5,427,991, 5,446,001, 5,468,702, 5,473,028, 5,534,474, 5,602,067, 5,602,217, 5,643,847, 5,728,855, 5,731,451, 5,739,368, 5,756,416, 5,777,143, 5,831,109, 5,856,255, 5,902,766, 5,910,463, 5,968,864 and 6,028,151, 6,147,173; PCT Publications Nos. WO 94/26793, WO 96/16092, WO 98/02246 and WO 99/03580; and European Publication Nos. EP-B1-0 662 979, EP 0 747 430 A1, EP 0 969 019 A1, EP-B2-0 170 059, EP-A1-0 819 706 and EP-A1-0 953 581.

Method for Supporting

The above described bulky ligand metallocene-type catalyst compounds and catalyst systems and conventional-type transition metal catalyst compounds and catalyst systems, may be combined with one or more support materials or carriers using one of the support methods well known in the art or as described below. In the preferred embodiment, the polymerization catalyst is in a supported form. For example, in a preferred embodiment, a bulky ligand metallocene-type catalyst compound or catalyst system is in a supported form, for example deposited on, contacted with, or incorporated within, adsorbed or absorbed in a support or carrier.

The terms "support" or "carrier" are used interchangeably and are any porous or non-porous support material, preferably a porous support material, for example, talc, inorganic oxides and inorganic chlorides. Other carriers include resinous support materials such as polystyrene, a functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports includes silica, alumina, silica-alumina, magnesium chloride, and mixtures thereof. Other useful supports include magnesia, titania, zirconia, montmorillonite and the like. Also, combinations of these support materials may be used, for example, silica-chromium and silica-titania.

It is preferred that the carrier, preferably an inorganic oxide, has a surface area in the range of from about 10 to about 700 $m^2/g$, pore volume in the range of from about 0.1 to about 4.0 cc/g and average particle size in the range of from about 10 to about 500 µm. More preferably, the surface area of the carrier is in the range of from about 50 to about 500 $m^2/g$, pore volume of from about 0.5 to about 3.5 cc/g and average particle size of from about 20 to about 200 µm. Most preferably the surface area of the carrier is in the range of from about 100 to about 400 $m^2/g$, pore volume from about 0.8 to about 3.0 cc/g and average particle size is from about 20 to about 100 µm. The average pore size of a carrier used in some embodiments of the invention is typically in the range of from about 10 Å to 1000 Å, preferably 50 Å to about 500 Å, and most preferably 75 Å to about 350 Å.

In some embodiments, support materials are treated chemically, for example with a fluoride compound as described in PCT Publication No. WO 00/12565, which is herein incorporated by reference. Other supported activators are described in for example PCT Publication No. WO 00/13792 that refers to supported boron containing solid acid complex.

In some embodiments of the invention, olefin(s), preferably $C_2$ to $C_{30}$ olefin(s) or alpha-olefin(s), preferably ethylene or propylene or combinations thereof are prepolymerized in the presence of the bulky ligand metallocene-type catalyst system and/or a conventional-type transition metal catalysts prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,467,080, 4,748,221, 4,789,359, 4,921,825, 5,204,303, 5,283,278, 5,322,830, 5,705,578, 6,391,987, 6,531,553, and 6,610,799, European Publication EP-B-0279 863 and PCT Publication No. WO 97/44371, all of which are herein fully incorporated by reference. In a gas phase prepolymerization process it is preferred to use a fluorinated hydrocarbon as a diluent, alone or in combination with other liquids. A prepolymerized catalyst system for purposes of this patent specification and appended claim is a supported catalyst system.

In some embodiments a polymerization catalyst is used in an unsupported form, e.g., in a liquid form such as described in U.S. Pat. Nos. 5,317,036 and 5,693,727, PCT publication WO 97/46599 and European publication EP-A-0 593 083, all of which are herein incorporated by reference.

Polymerization Process

The polymerization catalysts and catalyst systems described above are suitable for use in various embodiments of the inventive gas phase polymerization process, including fluidized bed or stirred bed processes. Particularly preferred is a gas phase polymerization process in which one or more condensable fluids as described below is utilized.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. In a preferred process, a condensable fluid as described below, is introduced to the process for purposes of increasing the cooling capacity of the recycle stream. The purposeful introduction of a condensable fluid into a gas phase process is a condensed mode process. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352, 749, 5,405,922, 5,436,304, 5,453,471, 5,462,999, 5,616,661 and 5,668,228 all of which are fully incorporated herein by reference.)

Condensable Fluids

There are generally two types of condensable materials employed in gas phase reactor systems, comonomers and Induced Condensing Agents (ICAs). The comonomers are typically used to control the resin product density. Common comonomers employed in gas phase reactors are 1-butene, 1-hexene, and 4-methyl-1-pentene. These comonomers are considered condensable gases because (depending on concentration) they are relatively easily condensed at the typical inlet gas temperatures of 30 to 35° C. In contrast, ethylene, nitrogen and hydrogen in the reaction system are not typically condensable at these temperatures.

The second class of condensable gases in the reactor are the ICAs. The most common type of ICA is pentane, but isobutane, n-hexane, or other hydrocarbons (or HFCs) of similar boiling points may also be used. The role of the ICAs is to raise the dew point temperature of the reactor gas, so as to induce more condensing at the cooler reactor inlet gas conditions. The enhanced condensing that this provides gives additional reactor cooling capacity and enables higher production rates from the reactor. The use of ICAs is further explained U.S. Pat. Nos. 5,352,749, 5,405,922, and 5,436,304.

Condensable fluids useful in some embodiments of the invention are preferably inert to the catalyst, reactants and the polymer product produced; it may also include comonomers. The condensable fluids can be introduced into the reaction/recycle system or at any other point in the system. Herein, the term condensable fluids is used in a broad sense that include saturated or unsaturated hydrocarbons and saturated or unsaturated fluorinated hydrocarbons, including perfluorocarbons and hydrofluorocarbons. Examples of suitable inert condensable fluids are readily volatile liquid hydrocarbons, which may be selected from saturated hydrocarbons containing from 2 to 10 carbon atoms, preferably 3 to 10 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons or mixtures thereof. A class of preferred inert condensable hydrocarbons are $C_5$ and $C_6$ saturated hydrocarbons. Another class of preferred hydrocarbons are $C_4$ to $C_6$ saturated hydrocarbons. Preferred hydrocarbons for use as condensable fluids include pentanes, such as isopentane. The condensable fluids may also include polymerizable condensable comonomers such as olefins, diolefins or mixtures thereof including some of the monomers mentioned herein which may be partially or entirely incorporated in the polymer product. Preferably, the feed or recycle stream contains from about 5 to about 60 mole percent of a condensable fluid, preferably with the condensable fluid having one carbon atom less than the comonomer or at least one carbon atom less than the comonomer.

Another class of condensable fluids useful herein include fluorinated hydrocarbons, preferably having little to no solvent power regarding the reaction components such as the monomer and polymer products. In some embodiments of the invention, one or more fluorinated hydrocarbons or perfluorinated carbons are utilized as condensable fluids.

Fluorinated hydrocarbons are defined to be compounds consisting essentially of at least one carbon atom and at least one fluorine atom, and optionally at least one hydrogen atom. A perfluorinated carbon is a compound consisting essentially of carbon atom(s) and fluorine atom(s), and includes for example linear branched or cyclic, $C_1$ to $C_{40}$ perfluoroalkanes, preferably $C_{11}$ to $C_{40}$ perfluoroalkanes. In one embodiment, the condensable fluids, preferably the perfluorinated carbons exclude perfluorinated $C_{4-10}$ alkanes.

In some embodiments, the fluorinated hydrocarbons are represented by the formula:

$$C_xH_yF_z \qquad (XII)$$

wherein x is an integer from 1 to 40, preferably from 1 to 30, more preferably from 1 to 20, even more preferably from 1 to 10, and still even more preferably from 1 to 6, alternatively x is an integer from 2 to 20, preferably from 3 to 10, more preferably from 3 to 6, and most preferably from 1 to 3, and wherein y is greater than or equal 0 and z is an integer and at least one, more preferably, y and z are integers and at least one. In a preferred embodiment, z is 2 or more.

In some embodiments, condensable fluids are or include a mixture of fluorinated hydrocarbons, preferably a mixture of a perfluorinated carbon and a fluorinated hydrocarbon, and more preferably a mixture of fluorinated hydrocarbons. In other embodiments, the fluorinated hydrocarbon is balanced or unbalanced in the number of fluorine atoms in the fluorinated hydrocarbon compound.

Non-limiting examples of fluorinated hydrocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4- octafluorobutane; 1,1,1,2,2,3,4,4-octafluorobutane; 1,1,1,2, 3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl) propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,1,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. Particularly preferred fluorinated hydrocarbons include difluoromethane, trifluoromethane, 1,1-difluoroethane, 1,1,1-trifluoroethane, fluoromethane, and 1,1,1,2-tetrafluoroethane. In addition to those fluorinated hydrocarbons described herein, those fluorinated hydrocarbons described in Raymond Will, et. al., CEH Marketing Report, Fluorocarbons, Pages 1-133, by the Chemical Economics Handbook-SRI International, April 2001, which is fully incorporated herein by reference, is included.

In another embodiment the condensable fluids, such as fluorinated hydrocarbons, are used in combination with one or more inert gases such as carbon dioxide, nitrogen, hydrogen, argon, neon, helium, krypton, zenon, and the like. In the preferred embodiment, the inert gas is nitrogen.

In another preferred embodiment, the fluorinated hydrocarbon used in the process of the invention are selected from the group consisting of difluoromethane, trifluoromethane, 1,1-difluoroethane, 1,1,1-trifluoroethane, and 1,1,1,2-tetrafluoroethane and mixtures thereof.

In one particularly preferred embodiment, the commercially available fluorinated hydrocarbons useful to implement the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane and/or HFC-365mfc, all of these are commercially available fluorinated hydrocarbons. In another embodiment, the condensable fluid is not a perfluorinated C4 to C10 alkane. In another embodiment, the condensable fluid is not a perfluorinated hydrocarbon. In another embodiment, the condensable fluid is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons. In a particularly preferred embodiment, the condensable fluid consists essentially of hydrofluorocarbons.

In another embodiment the fluorocarbon is present at more than 1 weight %, based upon the weight of the condensable fluid (fluorocarbon and any hydrocarbon solvent) present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon, monomers and any hydrocarbon solvent present in the reactor, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In another embodiment, fluorinated hydrocarbons useful herein have a molecular weight (MW) greater than 90 a.m.u., preferably greater than 95 a.m.u, and more preferably greater than 100 a.m.u. In another embodiment, the fluorinated hydrocarbons useful herein have a MW greater than 120 a.m.u, preferably greater than 125 a.m.u, even more preferably greater than 130 a.m.u, and most preferably greater than 140 a.m.u. In still another embodiment, the fluorinated hydrocarbons useful herein have a MW greater than 125 a.m.u, preferably greater than 130 a.m.u, even more preferably greater than 135 a.m.u, and most preferably greater than 150 a.m.u. In another embodiment, the fluorinated hydrocarbons useful herein have a MW greater than 140 a.m.u, preferably greater than 150 a.m.u, more preferably greater than 180 a.m.u, even more preferably greater than 200 a.m.u, and most preferably greater than 225 a.m.u. In an embodiment, the fluorinated hydrocarbons useful herein have a MW in the range of from 90 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorinated hydrocarbons useful herein have normal boiling points in the range of from about −50° C. up to the polymerization temperature, preferably a polymerization temperature of about 85° C., preferably the normal boiling points of the fluorinated hydrocarbons are in the range of from −40° C. to about 70° C., more preferably from about −30° C. to about 60° C., and most preferably from about −30° C. to about 55° C. In an embodiment, the fluorinated hydrocarbons useful herein have normal boiling points greater than −30° C., preferably greater than −30° C. to less than −10° C. In a further embodiment, the fluorinated hydrocarbons useful herein have normal boiling points greater than −5° C., preferably greater than −5° C. to less than −20° C. In one embodiment, the fluorinated hydrocarbons useful herein have normal boiling points greater than 30° C., preferably greater than 30° C. to about 60° C.

In another embodiment, the fluorinated hydrocarbons useful herein have a liquid density at 20° C. (g/cc) greater than 1 g/cc, preferably greater than 1.10, and most preferably greater than 1.20 g/cc. In one embodiment, the fluorinated hydrocarbons useful herein have a liquid density at 20° C. (g/cc) greater than 1.20 g/cc, preferably greater than 1.25, and most preferably greater than 1.30 g/cc. In an embodiment, the fluorinated hydrocarbons useful herein have a liquid density at 20° C. (g/cc) greater than 1.30 g/cc, preferably greater than 1.40, and most preferably greater than 1.50 g/cc.

In one embodiment, the fluorinated hydrocarbons useful herein have a Heat of Vaporization (ΔH Vaporization) as measured by standard calorimetry techniques in the range between 100 kJ/kg to less than 300 kJ/kg, preferably in the range of from 110 kJ/kg to less than 300 kJ/kg, and most preferably in the range of from 120 kJ/kg to less than 300 kJ/kg.

Other preferred embodiments use fluorinated hydrocarbons having any combination of two or more of the aforementioned MW, normal boiling point, ΔH Vaporization, and liquid density values and ranges. Some embodiments use fluorinated hydrocarbons having a MW greater than 90 a.m.u, preferably greater than 100 a.m.u, and a liquid density greater than 1.00 g/cc, preferably greater than 1.20 g/cc. Other embodiments use fluorinated hydrocarbons having a liquid density greater than 1.10 g/cc, preferably greater than 1.20 g/cc, and a normal boiling point greater than −50° C., preferably greater than −30° C. up to the polymerization temperature of the process, which is as high as 100° C., preferably less than 85° C., and more preferably less than 75° C., and most preferably less than 60° C. In one embodiment, the fluorinated hydrocarbons have a MW greater than 90 a.m.u, preferably greater than 100 a.m.u, and a ΔH Vaporization in the range of from 100 kj/kg to less than 300 kj/kg, and optionally a liquid density greater than 1.00 g/cc, preferably greater than 1.20 g/cc. In another embodiment, the fluorinated hydrocarbons have a liquid density greater than 1.10 g/cc, preferably greater than 1.20 g/cc, and a normal boiling point greater than −50° C., preferably greater than −30° C. up to the polymerization temperature of the process, which is as high as 100° C., preferably less than 85° C., and more preferably less than 75° C., and most preferably less than 60° C., and optionally a ΔH Vaporization in the range of from 120 kj/kg to less than 250 kj/kg.

Other embodiments use one or more fluorinated hydrocarbon(s), alone or in combination, with one or more inert, readily volatile liquid hydrocarbons, which include, for example, saturated hydrocarbons containing from 3 to 8 carbon atoms, such as propane, n-butane, isobutane (MW of 58.12 a.m.u, a liquid density of 0.55 g/cc, and normal boiling point as above described of −11.75), n-pentane, isopentane (MW of 72.15 a.m.u, a liquid density of 0.62 g/cc, and normal boiling point of 27.85), neopentane, n-hexane, isohexane, and other saturated $C_6$ to $C_8$ hydrocarbons.

In another embodiment, the fluorinated hydrocarbon(s) is selected based upon its solubility or lack thereof in a particular polymer being produced. Preferred fluorinated hydrocarbon(s) have little to no solubility in the polymer. Solubility in the polymer is measured by forming the polymer into a film of thickness between 50 and 100 microns, then soaking it in diluent (enough to cover the film) for 4 hours at the relevant desired temperature in a sealed container or vessel. The film is removed from the fluorinated hydrocarbon(s), exposed for 90 seconds to evaporate excess condensable fluid from the surface of the film, and weighed. The mass uptake is defined as the percentage increase in the film weight after soaking. The fluorinated hydrocarbon or fluorinated hydrocarbon mixture is selected so that the polymer has a mass uptake of less than 4 wt %, preferably less than 3 wt %, more preferably less than 2 wt %, even more preferably less than 1 wt %, and most preferably less than 0.5 wt %.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an FC's does not influence the polymerization reactions, in fact, it may do so to some extent, such as affecting activity rates. However, it is meant to say that the FC's are not present as part of the catalyst system.)

In a preferred embodiment, the fluorinated hydrocarbon(s) or mixtures thereof, are selected such that the polymer melting temperature Tm is reduced (or depressed) by not more than 15° C. by the presence of the condensable fluid. The depression of the polymer melting temperature ΔTm is determined by first measuring the melting temperature of a pure polymer (Tm) by differential scanning calorimetry (DSC), and then comparing this to a similar measurement on a sample of the same polymer that has been soaked with the condensable fluid. In general, the melting temperature of the soaked polymer will be lower than or equal to that of the dry polymer. The difference in these measurements is taken as the melting point depression ΔTm. It is well known to those in the art that higher concentrations of dissolved materials in the polymer cause larger depressions in the polymer melting temperature (i.e. higher values of ΔTm). A suitable DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the condensable fluid to be evaluated). As described in the reference above, it is important to ensure that the second part of the test, conducted in the presence of the liquid, is done in a sealed container so that the liquid is not flashed during the test, which could introduce experimental error.

In one embodiment, the ΔTm of polymers in the presence of the condensable fluid, especially the polymers made in the presence of fluorinated hydrocarbon, is less than 12° C., preferably less than 10° C., preferably less than 8° C., more preferably less than 6° C., and most preferably less than 4° C. below the pure polymer Tm, as defined above. In another embodiment, the measured ΔTm is less than 5° C., preferably less than 4° C., more preferably less than 3° C., even more preferably less than 2° C., and most preferably less than 1° C. than the pure polymer Tm as measured above.

Monomers

Polymers produced according to some embodiments of the invention are olefin polymers or "polyolefins". By olefin polymers is meant that at least 75 mole % of the polymer is made of hydrocarbon monomers, preferably at least 80 mole %, preferably at least 85 mole %, preferably at least 90 mole %, preferably at least 95 mole %, preferably at least 99 mole %. In a particularly preferred embodiment, the polymers are 100 mole % hydrocarbon monomer. Hydrocarbon monomers are monomers made up of only carbon and hydrogen. In another embodiment of the invention up to 25 mol % of the polyolefin is derived from heteroatom containing monomers. Heteroatom containing monomers are hydrocarbon monomers where one or more hydrogen atoms have been replaced by a heteroatom. In a preferred embodiment, the heteroatom is selected from the group consisting of chlorine, bromine, oxygen, nitrogen, silicon and sulfur, preferably the heteroatom is selected from the group consisting of oxygen, nitrogen, silicon and sulfur, preferably the heteroatom is selected from the group consisting of oxygen and nitrogen, preferably oxygen. In a preferred embodiment, the heteroatom is not fluorine. In other embodiments, the monomers to be polymerized are not fluoromonomers. Fluoromonomers are defined to be hydrocarbon monomers where at least one hydrogen atom has been replaced by a fluorine atom. In other embodiments, the monomers to be polymerized are not halomonomers. (By halomonomer is meant a hydrocarbon monomer where at least one hydrogen atom is replaced by a halogen.) In other embodiments, the monomers to be polymerized are not vinyl aromatic hydrocarbons. In other embodiments, the monomers to be polymerized are preferably aliphatic or alicyclic hydrocarbons. (as defined under "Hydrocarbon" in Hawley's Condensed Chemical Dictionary, 13th edition, R. J. Lewis ed., John Wiley and Sons, New York, 1997. In other embodiments, the monomers to be polymerized are preferably linear or branched alpha-olefins, preferably C2 to C40 linear or branched alpha-olefins, preferably C2 to C20 linear or branched alpha-olefins, preferably ethylene, propylene, butene, pentene, hexene, heptene, octene, nonene, decene, undecene, dodecene, or mixtures thereof, more preferably ethylene, propylene, butene hexene and octene. In some embodiments, the inventive process is directed toward a gas phase polymerization process of one or more olefin monomers having from 2 to 30 carbon atoms, preferably 2 to 12 carbon atoms, and more preferably 2 to 8 carbon atoms. Some embodiments of the invention are well suited to the polymerization of two or more olefin monomers of ethylene, propylene, butene-1, pentene-1, 4-methyl-pentene-1, hexene-1, octene-1 and decene-1.

Other monomers useful in some embodiments include ethylenically unsaturated monomers, diolefins having 4 to 18 carbon atoms, conjugated or nonconjugated dienes, polyenes, vinyl monomers and cyclic olefins, and non-limiting monomers including butadiene, norbornene, norbornadiene, isobutylene, vinylbenzocyclobutane, ethylidene norbornene, isoprene, dicyclopentadiene and cyclopentene.

In some embodiments, a copolymer of ethylene is produced, and the ethylene and a comonomer having at least one alpha-olefin having from 3 to 15 carbon atoms, preferably from 4 to 12 carbon atoms, and most preferably from 4 to 8 carbon atoms, are polymerized in a gas phase process.

In other embodiments, ethylene or propylene is polymerized with at least two different comonomers, optionally one of which may be a diene, to form a terpolymer.

Condensed Mode Process

In a preferred gas phase process of the invention, the gas phase process is operated in a condensed mode, where an inert condensable fluid as described above, especially a $C_2$ to $C_{10}$ saturated hydrocarbon and/or a fluorinated hydrocarbon, is introduced to the process to increase the cooling capacity of the recycle stream. These inert condensable fluids are referred to as induced condensing agents or ICA's. In another embodiment the invention relates to a gas phase process for polymerizing one or more olefin(s), preferably at least one of which is ethylene or propylene, in a fluidized bed reactor, the process operating in a condensed mode in which a liquid and a gas are introduced to the fluidized bed reactor having a fluidizing medium or a stirred bed reactor having a medium, wherein the level of condensable fluid is greater than 5 weight percent, preferably greater than 10 weight percent, or greater than 15 weight percent or greater than 20 weight percent, more preferably greater than 25 weight percent, even more preferably greater than 30 weight percent, still even more preferably greater than 35 weight percent, and most preferably greater than 30 weight percent up to 60 weight percent, preferably 50 weight percent, based on the total weight of the liquid and gas entering the reactor. For further details of a condensed mode process see U.S. Pat. Nos. 5,342,749 and 5,436,304 both of which are herein fully incorporated herein by reference.

To achieve higher cooling capacities, and enable higher reactor production rates, it is desirable to raise the dew point temperature of the recycle stream to permit a higher level of condensing at the inlet to the gas phase reactor. The dew point temperature of the recycle stream is typically raised by increasing the operating pressure of the reaction/recycle system and/or increasing the percentage of condensable fluids (ICA's and/or comonomers) and decreasing the percentage of non-condensable gases in the recycle stream. The advantages of a process operating in condensed mode generally increase directly with the nearness of the dew point temperature of the recycle steam to the reaction temperature within the interior of the fluidized bed. The advantages of the process may increase directly with the percentage of liquid in the recycle stream returned to the reactor. For a given inlet gas temperature, higher dew point temperatures cause an increased level of condensing (higher weight percent condensed). The higher condensing levels provide additional cooling and hence higher production rate capability in the reactor.

In one preferred embodiment of the invention, the invention is directed to a process, preferably a continuous process, for polymerizing monomer(s) in a reactor, said process comprising the steps of: (a) introducing a recycle stream into the reactor (optionally an insulated reactor), the recycle stream comprising one or more monomer(s); (b) introducing a polymerization catalyst and a condensable fluid, preferably a C2 to C10 saturated hydrocarbon and/or a fluorinated hydrocarbon, into the reactor where the reactor temperature is below the Critical Temperature, optionally for more than 12 hours; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer(s) to replace the monomer(s) polymerized; and (g) withdrawing a polymer product from the reactor. In a most preferred embodiment, the condensable fluid is introduced in amount greater than 5 weight percent or greater than 10 weight percent or greater than 15 weight percent or greater than 20 weight percent, preferably greater than 25 weight percent, more preferably greater than 30 weight percent, and most preferably greater than 40 weight percent based on the total weight of fluidizing medium being reintroduced into the reactor.

In another preferred embodiment of the invention, the invention is directed to a process, preferably a continuous process, for polymerizing monomer(s) in a reactor, said process comprising the steps of: (a) introducing a recycle stream into the reactor (optionally an insulated reactor), the recycle stream comprising one or more monomer(s); (b) introducing a polymerization catalyst and a condensable fluid, preferably a C2 to C10 hydrocarbon and/or a fluorinated hydrocarbon, into the reactor where the reactor bed temperature is below the Critical Temperature and preferably the dew point temperature is within 25° C. of the bed temperature, optionally for more than 12 hours; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer(s) to replace the monomer(s) polymerized; and (g) withdrawing a polymer product from the reactor. In this embodiment, the condensable fluid is introduced in a concentration greater than 0.5 mole percent, preferably greater than 1 mole percent, preferably greater than 2 mole percent, more preferably greater than 3 mole percent, even more preferably greater than 4 mole percent, still even more preferably greater than 5 mole percent, and most preferably greater than 7 mole percent, based on the total moles of gas in the reactor.

Other gas phase processes in which can be practiced below the Critical temperature with or without an insulated reactor include those described in U.S. Pat. Nos. 5,627,242, 5,665, 818 and 5,677,375, and European publications EP-A-0 794 200, EP-A-0 802 202, EP-A2 0 891 990 and EP-B-634 421, all of which are herein fully incorporated by reference.

Reactor Conditions

The reactor pressure in any of the gas phase processes described in the above embodiments vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor bed temperature in any of the gas phase processes described in the above embodiments may vary from about 30° C. to about 120° C., preferably from about 60° C. to about 115° C., more preferably in the range of from about 70° C. to 110° C., and most preferably in the range of from about 70° C. to about 100° C. In another embodiment, the bed temperature is above room temperature (23° C.), preferably above 30° C., preferably above 50° C., preferably above 70° C.

In a preferred embodiment, in any of the gas phase processes described in the above embodiments, the process is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr), and most preferably greater than 65,000 lbs/hr (29,000 Kg/hr) to greater than 100,000 lbs/hr (45,500 Kg/hr)

In a preferred embodiment of the process of invention in any of the embodiments described herein, the condensable fluid is used in an amount such that the molar ratio of the condensable fluid(s) to the metal of one or more of the polymerization catalyst(s) or catalyst system(s), especially where the metal is from a Group 3 though 12 metal, preferably a Group 3 through 8 metal, and most preferably a Group 4 through 6 metal, is in the molar ratio of from 500:1 to 20,000: 1, preferably from 500:1 to 10,000:1, preferably from 900:1 to 8000:1, even more preferably from 2000:1 to 5000:1, and most preferably from to 2000:1 to 3500:1. In another preferred embodiment of the process of invention in any of the embodiments described herein, the fluorinated hydrocarbon is used in an amount such that the molar ratio of the one or more fluorinated hydrocarbon(s) to the metal of one or more of the polymerization catalyst(s) or catalyst system(s), especially where the metal is from a Group 3 though 12 metal, preferably a Group 3 through 8 metal, and most preferably a Group 4 through 6 metal, is in the molar ratio greater than 500:1, preferably greater than from 900:1, even more preferably greater than 1000:1, still even more preferably greater than 2000:1, still even more preferably greater than 3000:1, still even more preferably greater than 10,000:1, and most preferably greater than 20,000:1. In the above embodiments, the most preferable metals are the transition metals, preferably Group 4 through 6 transition metals including titanium, hafnium, zirconium, chromium and vanadium.

In other embodiments of the inventive process, the amount of one or more condensable fluids is determined by the partial pressure of the one or more fluorinated hydrocarbon(s) being introduced to the process, particularly into the reactor. In one such embodiment, the partial pressure of the condensable fluid (preferably a C2 to C10 saturated hydrocarbon and/or one or more fluorinated hydrocarbons) is in the range of from 1 psia (6.9 kPa) to 500 psia (3448 kPa), preferably is in the range from about 2 psig (13.8 kPa) to about 250 psia (1724 kPa), more preferably is in the range from 2 psia (13.8 kPa) to 100 psia (690 kPa), still more preferably in the range from about 5 psia (34.5 kPa) to 90 psia (621 kPa), and most preferably in the range of from 5 psia (34.5 kPa) to about 80 psia (552 kPa).

In any of the embodiments described herein, the fluorinated hydrocarbon is present at 5 mole % or more, based upon the moles of fluorinated hydrocarbon, hydrocarbon solvent and monomers present in the reactor, alternately at 10 mole % or more, alternately at 15 mole % or more, alternately at 20 mole % or more, alternately at 25 mole % or more, alternately at 30 mole % or more, alternately at 35 mole % or more, alternately at 40 mole % or more, alternately at 45 mole % or more, alternately at 50 mole % or more, alternately at 55 mole % or more, alternately at 60 mole % or more, alternately at 65 mole % or more.

Polymer Product

Polymers produced by typical embodiments of the invention are useful in making a wide variety of products and useful in many end-use applications. Such polymers include linear low density polyethylenes, elastomers, plastomers, high density polyethylenes, low density polyethylenes, polypropylene and polypropylene copolymers.

The polymers produced, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc.

In one embodiment, the produced polymers have a molecular weight distribution, a weight average molecular weight to number average molecular weight ($M_w/M_n$) of greater than 1.5 to about 30, particularly greater than 2 to about 15, more preferably greater than 2 to about 10, even more preferably greater than about 2.2 to less than about 8, and most preferably from 2.5 to 8. The ratio of $M_w/M_n$ is measured by gel permeation chromatography techniques well known in the art.

In another embodiment, the ethylene-based polymers produced by the process of the invention typically have a narrow or broad composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. Typically when a bulky ligand metallocene-type polymerization catalyst is utilized in the process of the invention producing an ethylene copolymer, terpolymer and the like, the CDBI's are generally in the range of greater than 50% to 99%, preferably in the range of 55% to 85%, and more preferably 60% to 80%, even more preferably greater than 60%, still even more preferably greater than 65%. Typically when a conventional-type transition metal polymerization catalyst is utilized in the process of the invention producing an ethylene copolymer, terpolymer and the like, the CDBI's are generally less than 50%, more preferably less than 40%, and most preferably less than 30%. Also, whether a bulky ligand metallocene-type polymerization catalyst or a conventional-type transition metal polymerization catalyst is being used and the process is making an ethylene homopolymer, the CDBI is 100%.

Generally, the polymers produced by the process of the invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min. Also, generally, the polymers of the invention in an embodiment have a melt index ratio ($I_{21}/I_2$) ($I_{21}$ is measured by ASTM-D-1238-F) of from 10 to less than 25, more preferably from about 15 to less than 25. Further, in another embodiment, the polymers have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In yet another embodiment, the polymers, particularly polymers produced in the process of the invention using a Ziegler-Natta-type polymerization catalyst, have a melt index ratio ($I_{21}/I_2$) ($I_{21}$ is measured by ASTM-D-1238-F) in the range of from 15 to 40, preferably in the range of from about 20 to about 35, more preferably in the range of from about 22 to about 30, and most preferably in the range of from 24 to 27.

In other embodiments, propylene based polymers are produced. These polymers include atactic polypropylene, isotactic polypropylene, and syndiotactic polypropylene. Other propylene polymers include propylene random, block or impact copolymers.

In one embodiment, the invention is directed to a gas phase process for polymerizing one or more monomer(s) producing a polymer product in the presence of a catalyst system and a condensable fluid (preferably a C2 to C10 saturated hydrocarbon and/or a fluorinated hydrocarbon) at a temperature below the Critical Temperature, optionally in an insulated reactor, optionally for a period of 12 hours or more, wherein the catalyst system is a bulky ligand metallocene-type catalyst systems as previously defined, and the polymer product having a density (as measured by ASTM D 1238) in the range of from about 0.915 g/cc to about 0.950 g/cc, preferably in the range of from about 0.915 g/cc to 0.945 g/cc, and more preferably in the range of from about 0.915 g/cc to about 0.940 g/cc, and a polymer production rate greater than 40,000 kg/hour, preferably greater than 55,000 kg/hour and most preferably greater than 70,000 kg/hour. In a preferred embodiment, the gas phase process includes a fluidizing medium that is introduced to a reactor, and the process is operating in a condensed mode wherein the level of condensing or condensed liquid is greater than 15 weight percent, preferably greater than 32 weight percent, and most preferably greater than 50 weight percent based on the total weight of fluidizing medium being introduced into the reactor. In yet another embodiment, the partial pressure of the condensable fluid (preferably a C2 to C10 saturated hydrocarbon and/or a fluorinated hydrocarbon) is in the range of from 30 psia (207 kPa) to about 100 psia (690 kPa), preferably in the range from about 35 psia (241 kPa) to 90 psia (621 kPa), and most preferably in the range of from 40 psia (276 kPa) to about 80 psia (552 kPa).

In one embodiment, the invention is directed to a gas phase process for polymerizing one or more hydrocarbon monomer(s) producing a polymer product in the presence of a catalyst system (at a temperature below the Critical Temperature optionally in an insulated reactor and optionally for a period of 12 hours or more) and a condensable fluid (preferably a C2 to C10 saturated hydrocarbon and/or a fluorinated hydrocarbon), wherein the catalyst system is a bulky ligand metallocene-type catalyst systems as previously defined, and the polymer product having a density in the range of from about 0.87 g/cc to less than 0.915 g/cc, preferably in the range of from about 0.88 g/cc to 0.914 g/cc, and more preferably in the range of from about 0.900 g/cc to 0.913 g/cc, and a polymer production rate greater than 35,000 kg/hour, preferably greater than 50,000 kg/hour and most preferably greater than 65,000 kg/hour. In a preferred embodiment, the gas phase process includes a fluidizing medium that is introduced to a reactor, and the process is operating in a condensed mode wherein the level of condensing or condensed is greater than 15 weight percent, preferably greater than 32 weight percent, and most preferably greater than 50 weight percent based on the total weight of fluidizing medium being introduced into the reactor. In yet another embodiment, the partial pressure of the fluorinated hydrocarbon is in the range of from 10 psia (69 kPa) to about 100 psia (690 kPa), preferably in the range from about 15 psia (103 kPa) to 90 psia (621 kPa), and most preferably in the range of from 20 psia (138 kPa) to about 80 psia (552 kPa).

In another embodiment, the invention is directed to a gas phase process for polymerizing one or more hydrocarbon monomer(s) comprising producing a polymer product in the presence of a catalyst system and a condensing agent at temperature below the Critical Temperature optionally in an insulated reactor and optionally for a period of 12 hours or more, wherein the catalysts system is a conventional-type transition metal catalyst system, preferably a Ziegler-Natta-type catalyst system or Phillips type catalyst system, as previously defined, and the polymer product having a density in the range of from about 0.88 g/cc to about 0.940 g/cc, preferably in the range of from about 0.900 g/cc to 0.940 g/cc, and more preferably in the range of from about 0.910 g/cc to about 0.930 g/cc, and a polymer production rate greater than 40,000 kg/hour, preferably greater than 55,000 kg/hour and most preferably greater than 70,000 kg/hour. In a preferred embodiment, the gas phase process includes a fluidizing medium that is introduced to a reactor, and the process is operating in a condensed mode wherein the level of condensing or condensed is greater than 18 weight percent, preferably greater than 34 weight percent, and most preferably greater than 50 weight percent based on the total weight of fluidizing medium being introduced into the reactor. In yet another embodiment, the partial pressure of the condensable fluid is in the range of from 5 psia (35 kPa) to about 100 psia (690 kPa), preferably in the range from about 10 psia (69 kPa) to 90 psia (621 kPa), more preferably in the range of from 15 psia (103 kPa) to about 80 psia (552 kPa), and most preferably in the range of from 20 psia (138 kPa) to about 60 psia (414 kPa).

Polymers produced in accordance with some embodiments of the invention are useful in such forming operations as film, sheet, and fiber extrusion and co-extrusion as well as blow molding, injection molding and rotary molding. Films include blown or cast films formed by coextrusion or by lamination, shrink film, cling film, stretch film, sealing films, oriented films. The films are useful in snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the invention including representative advantages thereof, the following examples are offered.

In the examples, density was measured in accordance with ASTM-D-1505-98, and Melt Index (MI), I21 and I2 were measured by ASTM D 1238-01.

DSC Peak melting point was measured as follows: 3 to 9 milligrams of granular polymer sample was charged into a 30 microliter, aluminum, hermetically sealed capsule (Perkin Elmer part Number B0182901), weighed, and placed on the test stage of a DSC instrument. As is standard practice in the DSC technique, a blank capsule was also placed on the reference stage. (If the test was to be done in the presence of liquid, the test capsule was also charged with the liquid prior to closing, or sealing, the capsule.) The DSC instrument was programmed to start each test by first ramping down the temperature (of both capsules) at a rate of 5° C./min until reaching 0° C., and holding at this temperature for 2 minutes. The temperature was then ramped up at a rate of 5° C./min. until reaching a final temperature of 150° C. During the ramp-up in temperature, the differential heat flow required to heat the polymer containing capsule was recorded. The polymer peak melting temperature was taken as the temperature at which the differential heat flow was at its highest value during the ramp-up.

The isopentane used in the examples was purified by passing it through a bed of oxygen-removal catalyst (BASF R3-11) and then through a stacked bed of 3A molecular sieves and Selexsorb CD.

The 1-hexene comonomer was purified by passing it through 3A molecular sieves and then a bed of Selexsorb CD.

The ethylene was purified by passing it through a column containing oxygen removal catalyst (BASF R3-16), followed by a stacked column containing 3A molecular sieves and Selexsorb CD.

The HFC-245fa was obtained from Honeywell, commercially available under their trade name Enovate 3000. The HFC-245fa was purified by passing it through a stacked column of 3A molecular sieves, oxygen removal catalyst (BASF R3-16), and Selexsorb CD.

Examples 1-3

A series of tests were performed on polymer samples to determine the Critical Temperatures for selected polymer solvent combinations.

In the following examples, the dry sticking temperature was measured by one or both of two methods. The first method involved fluidizing the polymer sample in a medium scale fluidized bed reactor system. (This method is referred to as the medium scale fluidization test). Tests conducted by this method were performed in a fluidized bed reactor equipped with a temperature control system, a differential pressure cell to monitor the polymer bed weight and quality of fluidization, and a GC analyzer for monitoring the gas composition. The reactor consisted of a cylindrical bed section of 15.2 cm diameter and 117 cm height, with a conical expanded section increasing to 25.4 cm diameter at the top of the reactor. Gas entered the fluidized bed through a perforated distributor plate. For each test, the unit was charged with approximately 2500 grams of polymer and fluidized using nitrogen gas at a reactor pressure of 2172 kPa, a fluidization velocity of 0.49 m/sec., and a temperature of 79° C. With the reactor stabilized at these conditions, a test was initiated by slowly increasing the temperature at a steady rate (of 4 to 5° C./hr) until fluidization was lost or the maximum unit operating temperature of 104° C. was reached. (The heating system was limited to a maximum of 104° C.) When the test was completed, the reactor was cooled and the polymer was removed from the reactor. If the polymer was free flowing and polymer material did not aggregate on the reactor walls, it was concluded that the polymer dry sticking temperature had not been reached (i.e. that the dry sticking temperature was greater than 104° C.). If the inspection of the reactor revealed that the polymer had aggregated on the reactor wall, it was concluded that the dry polymer sticking temperature had been reached; in which case the bed differential pressure readings were reviewed to determine the temperature at which quality fluidization was lost as indicated by a reduction in the noise (or bandwidth) in the readings from the differential pressure sensor. In the event that the differential pressure cell did not indicate a loss in quality fluidization during the temperature ramp up, but that the polymer had aggregated to the reactor walls (as determined during the post run inspection), it was concluded that the dry sticking temperature was approximately equal to the maximum temperature achieved in the test (104° C.).

The second method used to determine polymer dry sticking temperature involved a lab scale fluidization apparatus. (This method is referred to as the lab scale fluidization test.) The apparatus consisted of a glass column of 5.1 cm diameter operated under atmospheric pressure and equipped with a glass frit to ensure even distribution of the fluidization gas. The column was surrounded by a an electrical heating jacket with an integral temperature regulator. Approximately 40 to 50 grams of granular polymer was added to the column for each test. The polymer bed was fluidized using heated nitrogen gas. The polymer bed temperature was measured using a thermocouple located approximately 0.5-1.0 cm above the glass frit. The polymer in the column was initially heated to a starting temperature of 85 to 90° C. When the internal temperature stabilized, the flow of nitrogen fluidizing gas was shut off for 30 seconds and then restarted. The polymer bed was then inspected for signs of agglomeration or loss of fluidization (channeling). If no agglomeration or channeling was observed, the temperature was raised by approximately 1-2° C. After the temperature stabilized at the new (higher) value, the nitrogen flow was again interrupted for 30 seconds, and then restarted. The polymer bed was again inspected for signs of agglomeration or channeling. The test continued in this manner until the fluidization gas was observed to channel through the polymer bed or when polymer agglomeration was observed. The dry sticking temperature was taken as the lowest temperature at which channeling or agglomeration first occurred.

Table 1 shows the I2, I21, and molded density values for the three examples along with a brief description of the polymer samples. Table 2 shows the measured peak melting points for each sample. There are four peak melting points shown for each polymer sample, including the dry polymer peak melting point, the isobutane saturated polymer peak melting point, the isopentane saturated polymer peak melting point, and the HFC-245fa saturated polymer peak melting point. Also included in Table 2 is the dry polymer sticking temperature as determined by the medium scale fluidization test (referred to as "Medium Scale" in the table) and as determined by the lab scale fluidization test (referred to as "Lab Scale" in the table). Table 3 shows the calculated melting point depressions for the polymer samples saturated with isobutane, isopentane, and HFC-245fa. Also shown in Table 3 are the calculated critical temperatures for a polymer/isobutane system, a polymer/isopentane system, and a polymer/HFC-245fa system.

Example 1

In this example the critical temperature was determined for a commercial grade linear low density polyethylene sample produced from a conventional-type transition metal catalyst as described in Example A (below) with a hexene comonomer. The polymer I2 was 0.768 dg/min and the molded density was 0.9173 g/cc. The peak DSC melting point for the dry polymer was 125° C. and the melting point depression was measured as 18° C., 21° C., and 2° C. for isobutane, isopentane, and HFC-245fa, respectively. The polymer dry sticking temperature was determined to be 104° C. in both the medium scale fluidization test and lab scale fluidization test. In the medium scale fluidization test there was no indication from the differential bed pressure cell that quality fluidization was lost anytime during the temperature ramp-up; however, visual inspection of the reactor internals following the test showed polymer aggregates caked on the reactor walls approximately 0.5 cm thick. As calculated from the melting point depression and the dry polymer sticking temperature and shown in Table 3, the critical temperature was determined to be 86° C. for a polymer/isobutane system, 83° C. for a polymer/isopentane system, and 102° C. for a polymer/HFC-245fa system.

Example 2

In this example the critical temperature was determined for a bimodal polyethylene resin sample produced from a metallocene-type transition metal catalyst as described in U.S. Pat. Nos. 6,242,545, 6,248,845 and 6,528,597. The polymer I2 was 0.919 dg/min and the molded density was 0.9184 g/cc. The peak DSC melting point for the dry polymer was 125° C. and the melting point depression was measured as 18° C., 23° C., and 3° C. for isobutane, isopentane, and HFC-245fa, respectively. The polymer dry sticking temperature was determined to be 107° C. in the lab scale fluidization test. (In this case the medium scale fluidization test produced an inconclusive result with no indication of sticky resin, reduced DP bandwidth, or reactor fouling indicated at the highest available temperature of 104° C.) Taking the lab scale value of 107° C. as the dry sticking temperature, the critical temperature was determined to be 89° C. for a polymer/isobutane system, 84° C. for a polymer/isopentane system, and 104° C. for a polymer/HFC-245fa system.

Example 3

In this example the critical temperature was determined for a commercial grade polyethylene sample produced from a conventional-type transition metal catalyst as described in Example A with a butene comonomer. The polymer I2 was 1.16 dg/min and the molded density was 0.9188 g/cc. The peak DSC melting point for the dry polymer was 123° C. and the melting point depression was measured as 19° C., 21° C., and 2° C. for isobutane, isopentane, and HFC-245fa, respectively. The polymer dry sticking temperature was determined to be 104° C. in the medium scale fluidization test. In this test there was no indication from the differential bed pressure cell that quality fluidization was lost anytime during the temperature ramp-up; however, visual inspection of the reactor internals following the test showed polymer aggregates caked on the reactor walls approximately 0.5 cm thick. As calculated from the melting point depression and the dry polymer sticking temperature and shown in Table 3, the critical temperature was determined to be 85° C. for a polymer/isobutane system, 83° C. for a polymer/isopentane system, and 102° C. for a polymer/HFC-245fa system.

TABLE 1

| Example No. | Description | I2 (ASTM D1238-01) [dg/min.] | I21 (ASTM D1238-01) [dg/min.] | Density (molded) (ASTM D1505-98) [g/cc] |
|---|---|---|---|---|
| 1 | Z/N Hexene Film (granules) | 0.768 | 31.41 | 0.9173 |
| 2 | Bimodal Metallocene (granules) | 0.919 | 29.72 | 0.9184 |
| 3 | Z/N Butene Film (granules) | 1.160 | 29.05 | 0.9188 |

TABLE 2

| Example No. | Dry Polymer Melting Point DSC peak melt [° C.] | Isobutane Polymer Melting Point DSC peak melt [° C.] | Isopentane Polymer Melting Point DSC peak melt [° C.] | HFC-245fa Polymer Melting Point DSC peak melt [° C.] | Dry Sticking Temp. Medium Scale [° C.] | Dry Sticking Temp. Lab Scale [° C.] |
|---|---|---|---|---|---|---|
| 1 | 125 | 108 | 104 | 123 | 104 | 104 |
| 2 | 125 | 107 | 102 | 122 | >104 | 107 |
| 3 | 123 | 103 | 102 | 121 | 104 | N/A |

TABLE 3

| Example No. | Melting point depression Isobutane [° C.] | Melting point depression Isopentane [° C.] | Melting point depression HFC-245fa [° C.] | Crititcal Temp. Isobutane [° C.] | Crititcal Temp. Isopentane [° C.] | Crititcal Temp. HFC-245fa [° C.] |
|---|---|---|---|---|---|---|
| 1 | 18 | 21 | 2 | 86 | 83 | 102 |
| 2 | 18 | 23 | 3 | 89 | 84 | 104 |
| 3 | 19 | 21 | 2 | 85 | 83 | 102 |

Example A

Preparation of a Conventional-Type Transition Metal Catalyst

A conventional-type transition metal catalyst was prepared from a mixture of a magnesium compound, for example $MgCl_2$, a titanium compound, for example $TiCl_3 \cdot 1/3AlCl_3$, and an electron donor, for example tetrahydrofuran (THF), and was supported on silica that was dehydrated at 600° C. A detailed description of the preparation procedure can be found in U.S. Pat. No. 4,710,538, which is herein incorporated by reference. The specific catalyst formulation used had a TNHAL/THF mole ratio of 0.27 and a DEAC/THF mole ratio of 0.50 where TNHAL is tri-n-hexyl aluminum and DEAC is diethyl aluminum chloride.

Example B

Preparation of a Metallocene-Type Transition Metal Catalyst

A bulky ligand metallocene-type catalyst system was prepared with dimethylsilyl-bis(tetrahydroindenyl)zirconium dichloride $(Me_2Si(H_4Ind)_2ZrCl_2)$ available from Albemarle Corporation, Baton Rouge, La. and methylalumoxane, available from Albemarle, Baton Rouge, La. The $(Me_2Si(H_4Ind)_2ZrCl_2)$ catalyst compound was combined with a 30 weight percent methylaluminoxane (MAO) in toluene and was supported on Crosfield ES-70 grade silica dehydrated at 600° C. having approximately 1.0 weight percent water Loss on Ignition (LOI). LOI is measured by determining the weight loss of the support material which has been heated and held at a temperature of about 1000° C. for about 22 hours. The Crosfield ES-70 grade silica has an average particle size of 40 microns and is available from Crosfield Limited, Warrington, England.

Examples C, D, E and F

A series of tests were performed in a gas phase reactor to determine the maximum sustainable Induced Condensing Agent (ICA) concentration that could be achieved while maintaining stable fluidization. The tests were carried out with two different ICA materials, isopentane and HFC-245fa. The total reactor pressure was maintained at 2169 kPa and an operating temperature of 85° C. Each test was started with no ICA in the reactor. Once operations stabilized and the unit was operating in steady state conditions, the ICA was introduced into the reactor. The ICA concentration was then ramped up to a target set-point or until the polymer became sticky and it was no longer possible to remove polymer product from the reactor using standard operating procedures.

All of the medium scale tests of Examples C-F were done in a gas phase fluidized bed reactor equipped with devices for temperature control, catalyst feeding or injection equipment, GC analyzer for monitoring and controlling monomer and gas feeds and equipment for polymer sampling and collecting. The reactor consisted of a 6" (15.2 cm) diameter bed section increasing to 10" (25.4 cm) at the reactor top. Gas entered the fluidized bed through a perforated distributor plate. The reactor was also equipped with a product discharge system for removing polymer product from the reactor. A description of the operating conditions for the tests is given in Table A.

Example C

In this example, the reactor was operated with the Ziegler Natta catalyst of Example A with no ICA. The gas phase reactor reached steady state producing a polymer product with a 0.917 g/cc density and a melt index (I2) of 1.21 dg/min. Quality fluidization was maintained throughout the run and no problems were encountered with discharging polymer product from the reactor.

Example D

Similar reactor conditions were employed as in Example C except that isopentane was used to as a conventional ICA. The isopentane concentration was first ramped up to 1.5 mole % and held for 24 hours. Following the 24 hour hold period, the isopentane was further ramped up to between 6 and 7 mole % over a 7 hour period. Above this ICA concentration it was not possible to remove polymer product from the reactor using normal operating procedures. At ICA concentrations lower than 6 to 7 mole %, polymer product could be removed from the reactor using normal operating procedures.

Example E

HFC-245fa was used as the ICA with the Ziegler Natta catalyst of Example A. Other reactor conditions were similar to those in Example C and D. The HFC-245fa concentration was ramped up from 0 mole % to 20.7 mole % over a 48 hour period. The initial ramp up to 4 mole % was carried out over 24 hours and the ramp up from 4 mole % to 20.7 mole % was carried out over the remaining 24 hours. The maximum ICA concentration obtained was measured at 20.7 mole %. This was the highest concentration attempted for this example. At the time an ICA concentration of 20.7 mole % was reached, unrelated technically difficulties forced a shut-down of the unit. At ICA concentrations as high as 20.7 mole %, polymer product could be removed from the reactor using normal operating procedures and no polymer stickiness was observed.

Example F

HFC-245fa was used as the ICA with the metallocene catalyst of Example B. The HFC-245fa concentration was ramped up to 17.8 mole % over a 30 hour period. The HFC-245fa concentration was first ramped up to between 1 mole % and 2 mole % and held for 14 hours. Following the 14 hour hold period, the HFC-245fa concentration was further ramped up to 17.8 mole % over a 16 hour period. This concentration was then held for over 2 hours and was the maximum ICA concentration measured for this example. Throughout this entire test polymer product could be removed from the reactor using normal operating procedures and no polymer stickiness was observed.

a direct comparison with the same resin grade (the Ziegler-Natta hexene film grade) provided by Examples D and E. In Example D (operation above the Critical Temperature) the limiting ICA concentration was 6-7 mole % (130-152 kPa). In Example E (operation below the Critical Temperature) the limiting ICA concentration was not reached, even with ICA concentrations as high as 20.7 mole % (449 kPa). Such higher concentrations of ICA allow higher dew point temperatures in the reactor and correspondingly higher condensed mode production rates.

TABLE A

| | Example | | | |
|---|---|---|---|---|
| | Example C | Example D | Example E | Example F |
| Catalyst | A | A | A | B |
| ICA | None | Isopentane | HFC-245fa | HFC-245fa |
| Reactor Bed Temperature (° C.)* | 85 | 85 | 85 | 79 |
| Reactor Pressure (kPa)* | 2169 | 2169 | 2169 | 2169 |
| Ethylene Partial Pressure (kPa)* | 456 | 453 | 464 | 764 |
| Hexene/Ethylene gas ratio (mole %/mole %)* | 0.116 | 0.071 | 0.101 | 0.034 |
| Hydrogen/Ethylene gas ratio (mole %/mole %)* | 0.191 | 0.196 | 0.193 | 2.9E-04 |
| Triethylaluminum Feed (g/hr)* | 11.8 | 11.9 | 13.5 | 10.0 |
| Production Rate (g/hr)* | 421 | 645 | 380 | 287 |
| Bed Weight (g)* | 1938 | 1933 | 1849 | 1933 |
| Residence Time (hr)* | 4.6 | 3.0 | 4.9 | 6.7 |
| Superficial Gas Velocity (m/s)* | 0.48 | 0.50 | 0.50 | 0.50 |
| Product Density (g/cc) | 0.917 | 0.916 | 0.922 | 0.922 |
| Product Melt Index - I2 (dg/min) | 1.21 | 1.23 | 0.92 | 1.48 |
| Maximum ICA Concentration Achieved under Stable Fluid Bed Operations (mole %) | N/A | 6 to 7 | 20.7 | 17.8 |

*Four hour average,

Discussion of Examples C, D, E and F

Examples C and D illustrate the conventional practice of operating gas phase fluid bed polymerization reactors at reactor temperatures greater than the Critical Temperature. In both Examples C and D the reactor temperature was operated at 85° C., whereas the Critical Temperature was approximately 83° C. This value was taken from the results of Example 1 with isopentane (as shown in Table 3), since the product properties (density and I2) of the resin sample used in Example 1 were similar to those of the resin produced in Examples C and D. Such conventional operation above the critical temperature may lead to resin sticking and/or agglomeration as illustrated by Example D. In that case, relatively high concentrations of isopentane (in combination with the hexene comonomer) induced stickiness in the produce as evidenced by the inability to discharge polymer product from the reactor at isopentane concentrations greater than 6-7 mole % (130-152 kPa).

Examples E and F are examples of the present invention with operation below the Critical Temperature. In Example E, the reactor temperature was 85° C., and the Critical Temperature (with HFC-245fa) was approximately 102° C. In Example F, the reactor temperature was 79° C., and the Critical Temperature was approximately 102° C. (Table 3). These values of Critical Temperature was taken from the results of Examples 1 and 3 with HFC-245fa (shown in Table 3), since the product properties (density and I2) of the resin samples used in Examples 1 and 3 were similar to those produced in Examples E and F. The results from these examples (E and F) show that operation below the Critical Temperature allows much higher concentrations of ICA without inducing stickiness or agglomeration in the resin product. This is best seen in In another class of embodiments, the invention is a method including the steps of:

(a) monitoring a polymerization reaction which produces a polymer resin in a fluid bed reactor, wherein the polymer resin has a dry melt reference temperature (a temperature, sometimes referred to herein as a "dry MRT," characteristic of melting behavior of a dry version of the polymer resin); and (b) in response to data indicative of at least one monitored parameter of the reaction, determining a reduced melt reference temperature (sometimes referred to herein as "$MRT_R$") characteristic of the melting behavior of the polymer resin as it exists in the reactor.

The reduced melt reference temperature ("$MRT_R$") is a temperature characteristic of melting behavior of the polymer resin the presence of diluent (e.g., condensable diluent gas or gases) with the resin in the reactor, and is at least substantially equal to the difference between the dry MRT and a melt reference temperature depression value, "D," where D is a temperature by which the dry MRT is depressed by the presence of diluent (e.g., condensable diluent gas or gases) with the resin in the reactor. In some embodiments, the method also includes the step of determining a stickiness control parameter from the reduced melt reference temperature. Typically, the stickiness control parameter is a temperature (sometimes referred to herein as a "$\Delta MRT$" value) at least substantially equal to $MRT_R$–Trx (or Trx–$MRT_R$), where Trx is current reactor temperature.

In some embodiments, step (b) includes the step of determining the reduced melt reference temperature in on-line fashion.

Optionally, the method also includes the step of controlling the reaction in response to the reduced melt reference temperature or stickiness control parameter (e.g., in response to a ΔMRT value), for example by maintaining bed temperature in a predetermined relation with (e.g., below) the reduced melt reference temperature or a temperature (or temperature range) related to the reduced melt reference temperature.

The dry MRT is a distinct and measurable temperature that is characteristic of melting behavior of a dry version of the polymer resin, and can be defined or determined in any of a variety of different ways, including as:

a peak melt temperature as determined from a first or second melt DSC ("differential scanning calorimetry") measurement on a dry sample of the polymer resin;

a polymer Seal Initiation Temperature measured on a resin film sample;

a resin Hot Tack Initiation Temperature;

a dry sticking temperature of granular polymer in a fluid bed;

a dry Melt Initiation Temperature (MIT) determined graphically as the onset of rapid melting in a first or second melt DSC curve determined from a DSC measurement on a dry sample of the polymer. Such a dry MIT is preferably determined from a first melt DSC measurement on a sample of a dry version of the polymer (a sample of the polymer resin with no significant amount of diluent hydrocarbon present therewith); or a temperature at which the polymer resin is expected to melt or begin to melt in the reactor vessel with the reactor operating at normal pressure and gas velocity but in the presence of substantially pure nitrogen rather than the gas components actually present with the resin in the reactor during the reaction.

In typical embodiments, reference temperature data (indicative of the reduced melt reference temperature) are generated in on-line fashion in accordance with the invention by processing data indicative of a combination of process variables measured during the reaction (e.g., current values of bed temperature, density and melt index of the polymer resin, and concentration (e.g., partial pressure) of ICA, comonomer, and isomer gas, and optionally also at least one other diluent present in the reactor) in accordance with a predetermined model. The processing can be performed in any of a variety of ways, including by accessing at least one database or look-up table prepared in accordance with the model. Typically, a dry melt reference temperature is determined from the measured process data (e.g., using a predetermined correlation with melt index and/or density of the resin), and appropriate correlations (provided by the model) are employed to estimate a degree of reduction of the dry melt reference temperature due the effects of diluent components present in the reactor with the polymer resin during the reaction.

In typical embodiments, to implement a model of the type mentioned in the previous paragraph, data indicative of a dry melt reference temperature of each of a representative set of different types or grades of polymer resin that may be produced in the reactor are measured. Preferably, the density and melt index of the polymers in the set span a full range of polymer density and melt index values that may be produced using each catalyst type that may be used in the process. The measured data are typically then analyzed (and regressed) to provide a mathematical correlation of dry melt reference temperature as a function of polymer density and melt index, and also catalyst type (if required). Measured data indicative of the density and melt index of the polymer being produced, and also data indicative of the type of catalyst being used to produce the polymer (if required), can then be processed in on-line fashion using the correlation to determine a dry melt reference temperature for the polymer resin. Alternatively, dry melt reference temperature data, provided in the form of a predetermined database (a "Melt Reference Database") or look-up table, are accessed to identify a dry melt reference temperature for the polymer resin being produced. The database or look-up table would preferably contain dry melt reference temperature data for each grade of polymer to be produced in the reactor, so that the data can be conveniently accessed in on-line fashion by specifying density and melt index of the polymer being produced (and the catalyst being used in the polymerization reaction if required).

Typically, a model of the type mentioned in the two previous paragraphs predicts the amount by which the dry melt reference temperature (of a dry version of the polymer resin being produced in the reactor) is reduced by the presence with the resin of condensable diluent gas (e.g., ICA, comonomer, and isomer(s) of at least one comonomer) used in the reaction. At least one parameter monitored in step (a) is processed in accordance with the model to generate reference temperature data, which in turn determine the reduced melt reference temperature.

Reference temperature data generated in on-line fashion in accordance with the invention can be provided to and processed by (i.e., integrated with) a plant process control system to provide an on-line monitor of the approach to at least one condition of undesirable resin stickiness in the reactor. Such an on-line monitor can provide a quantitative basis for control of process conditions to avoid continuity problems that would otherwise occur due to excessive stickiness of resin in the reactor, and can allow a plant operator to operate the process safely at conditions closer to the stickiness limits for higher reactor heat transfer capabilities and higher production rates.

During reaction transitions, conditions in fluid bed reactor are adjusted (e.g., to cause production of polymer of a different grade, such as polymer of different density and/or melt index). In most cases, the adjustments in process conditions can be made fairly quickly, but some time is needed for the fluid bed to change over to the new resin properties. The time required to effect a complete transition is typically three or four bed turnovers. During a reaction transition, the bed-averaged properties (e.g., resin density and melt index) are not equal to the properties of the resin currently being produced (the "instantaneous production"). Therefore, it is possible for reference temperature data generated in accordance with the invention to be indicative of two different stickiness control parameters: one calculated with properties of bed-averaged resin, and one calculated with instantaneous values of the properties of the instantaneous production. In some embodiments, the reference temperature data are indicative of two stickiness control parameters: a "$\Delta MRT_{ave}$" temperature indicative of the difference between the current reactor temperature and a reference temperature above which resin having bed-averaged resin properties in the reactor is predicted to become sticky; and a "$\Delta MRT_{inst}$" temperature indicative of the difference between the current reactor temperature and a reference temperature above which the resin currently being produced in the reactor is predicted to become sticky. For reliable operation (without excessive resin stickiness) the reaction is preferably controlled (at least during the transition) so that neither the "$\Delta MRT_{ave}$" temperature nor the "$\Delta MRT_{inst}$" temperature exceeds a predetermined limit or leaves a predetermined range. The predetermined limit or range for $\Delta MRT_{ave}$ may differ from that for $\Delta MRT_{inst}$.

Preferred embodiments determine stickiness control parameters based on bed-averaged parameters of steady-state polymerization reactions and use them to characterize and preferably also control the steady-state reactions. During transitions of such reactions, preferred embodiments of the invention determine stickiness control parameters based on instantaneous reaction parameters and use them to characterize and preferably also control the reactions during the transitions. For example, a steady-state reaction can be controlled to proceed with an stickiness control parameter relatively close to a critical (or limiting) ΔMRT value (e.g., a critical ΔMRT value at least substantially equal to Trx−$MRT_R$, where Trx is the current reactor temperature and $MRT_R$ is at least substantially equal to MRT−D, where MRT is dry melt reference temperature for a dry version of the polymer resin being produced, and D is an estimated temperature (determined in accordance with the invention) by which MRT is depressed by the presence of condensable diluent gas with the resin during the reaction, so that $MRT_R$ is limiting temperature value beyond which resin stickiness is likely to occur). However, during a transition in such a reaction, the reaction should typically be controlled to proceed with a stickiness control parameter relatively far from the critical ΔMRT value determined in accordance with the invention. For increased safety and more reliable operation without resin stickiness, the reaction should be controlled such that neither a "$ΔMRT_{ave}$" temperature (indicative of the difference between current reactor temperature and a reference temperature above which having bed-averaged resin properties in the reactor is predicted to become sticky) nor a "$ΔMRT_{inst}$" temperature (indicative of the difference between current reactor temperature and a reference temperature above which the resin currently being produced in the reactor is predicted to become sticky) exceeds a predetermined limit or leaves a predetermined range. The predetermined limit or range for $ΔMRT_{ave}$ may differ from that for $ΔMRT_{inst}$.

When controlling a reaction to prevent a stickiness control parameter (generated in accordance with the invention) from exceeding a critical ΔMRT value (or leaving a critical ΔMRT range) the reactor temperature or ICA concentration may be adjusted (typically lowered) to bring the stickiness control parameter back into an acceptable range. Adjustments in the reactor temperature Trx are generally preferred because of the relatively quick response times involved. If, for example the calculated value of the stickiness control parameter were too high by 1° C., a reduction in reaction temperature of 1° C. would bring the stickiness control parameter back within range within a few minutes. Alternatively, an excessively high stickiness control parameter may be corrected by lowering the concentration (or partial pressure) of ICA in the reactor. This may be done, for example, by reducing the rate of ICA feed to the reactor, or by increasing the rate of venting from the reactor. In either case, the rate of change in ICA concentration (or partial pressure) is relatively slow, normally requiring several hours to effect the intended change. For this reason, adjustments in the reactor temperature are generally preferred.

A reactor system whose operation can be monitored and optionally also controlled in accordance with the invention will be described with reference to FIG. 3. The FIG. 3 system includes fluidized bed reactor 110. Reactor 110 has a bottom end 11, a top expanded section 19, a cylindrical (straight) section 14 between bottom end 11, and a distributor plate 12 within section 14. A fluidized bed 15 of granular polymer and catalyst particles is contained within the straight section 14. The bed is fluidized by the steady flow of recycle gas through the distributor plate 12. The flow rate of fluidizing gas is regulated to provide the fluidized bed with relatively good mixing, as illustrated in the figure.

The reactor system also has a catalyst feeder 109 for controlled addition of polymerization catalyst to the fluidized bed reaction zone. Within the reaction zone (i.e. the fluidized bed), the catalyst particles react with the ethylene and comonomer and optionally other reaction gas to produce granular polymer particles. As new polymer particles are produced, other polymer particles are continually withdrawn from the fluidized bed through a product discharge system (not shown). After passing through the product discharge system, the polymer granules are degassed (or "purged") with a flow of inert nitrogen to remove substantially all of the dissolved hydrocarbon materials.

The reactor system of FIG. 3 also has a cooling control loop which includes a recycle gas line 31, a circulating gas cooler 30 and compressor 32, coupled with reactor 110 as shown. During operation, the cooled circulating gas from cooler 30 flows through inlet 34 into reactor 110, then propagates upward through the bed and out from reactor 110 via outlet 33.

The expanded section 19 is also known as the "velocity reduction zone", and is designed to minimize the quantities of particle entrainment from the fluidized bed. Each diameter of each horizontal cross-section of the expanded section 19 is greater than the diameter of straight section 14. The increased diameter causes a reduction in the speed of the fluidizing gas, which allows most of the entrained particles (catalyst and resin particles) to settle back into the fluidized bed, thereby minimizing the quantities of solid particles that are "carried over" from the fluidized bed (at a given value of fluidizing gas velocity) through the recycle gas line 31.

One or more temperature sensors 16 are located in the fluidized bed, and are used with a control system (not shown in FIG. 3 but which can include processor 50 of FIG. 4) and an external cooling loop to control the fluidized bed temperature Trx near the process set-point. Relatively warm reactor gas (whose temperature has increased during its flow through reactor 110) is withdrawn from outlet 33 and is pumped by compressor 32 to cooler 30, wherein the temperature of the gas (the cooling fluid) is reduced. The relatively cool fluid from the cooler (which may contain condensed liquid) flows to the reactor inlet 34, to cool the fluidized bed. Temperature sensors (not shown) near the inlet and outlet of cooler provide feedback to the control system regulate the amount by which cooler 30 reduces the temperature of the fluid entering reactor.

Reactor 110 can be implemented as a mLLDPE (metallocene-catalyzed, linear low-density polyethylene) reactor with straight section 14 having height 47 feet, six inches.

The FIG. 3 system also includes "skin temperature" sensors 8 (typically implemented as thermocouple sensors having fast response design), mounted in positions along straight section 14 of the reactor wall so as to protrude into the bed from the reactor wall by a small amount (e.g., one eighth to one quarter of an inch). Sensors 108 are configured and positioned to sense the temperature $T_w$ of the resin near the wall of reactor 110 during operation.

The one or more temperature sensors 16 in the fluidized bed can include at least one resistance temperature sensor positioned and configured to sense bed temperature during reactor operation at a location within reactor 110 away from the reactor wall. The resistance temperature sensor can be mounted so as to protrude into the bed (e.g., 8 to 18 inches away from the reactor wall) more deeply than do sensors 108.

Other sensors and optionally also other apparatus are employed to measure other reaction parameters during a polymerization reaction. Such other reaction parameters preferably include instantaneous and bed-averaged resin product properties (e.g., melt index and density of the polymer resin product being produced by the FIG. 3 system during a polymerization reaction). Resin product properties are conventionally measured by periodically sampling the resin as it exits the reactor (e.g. once per hour), and performing the appropriate tests in a quality control laboratory.

Other measured reaction parameters preferably include reactor gas composition, e.g., concentrations (and partial pressures) of all reactant gases and induced condensing agents (ICAs), as well as all inert gases (such as nitrogen, hydrocarbon inerts, etc.) that are present in relevant quantities. The reactor gas composition may be measured with a gas chromatograph system 40.

It is well known how to control various process control variables (e.g., to control gas phase composition within reactor 110, the concentration of induced condensing agents (ICAs) and comonomer introduced into reactor 110, partial pressure of at least one reactant (e.g., ethylene) introduced into reactor, and the type and properties of each catalyst introduced into reactor 110, and to use elements 30 and 32 in the manner described above to control temperature) to control various reactions performed by the FIG. 3 system. For example, it is known how to control a polymerization reaction during a transition by controlling process control variables such that the product (granular polymer resin) has properties compliant with an initial specification set at the start of the transition, the product produced during the transition ceases to comply with the initial specification set at a first time, and the product has properties compliant with a final specification set at the end of the transition.

In typical embodiments of the invention, a reaction (e.g., a steady-state reaction and/or a reaction transition) performed by a polymerization reactor is controlled by adjusting (or regulating) controlling process variables in response to at least one new control variable determined in accordance with the invention. One or more new control variables of the invention (e.g., $MRT_R$ and $\Delta MRT$ values as defined herein) are determined based on the output of sensors (and optionally also other apparatus) that measure reaction parameters. Processor 50 of FIG. 4 is an example of a processor programmed to generate such new control variables in accordance with any embodiment of the invention in response to reaction parameters (e.g., parameters determined by the output of temperature sensor 16, resin properties measurements (density and MI), and the process gas chromatograph 40) measured during a reaction, and to control the reaction in response to these temperature values. Processor 50 may be a separate, stand alone processor, or it may be integral with other process control computers that are conventionally used to monitor and control the reactor system.

In a class of embodiments, the invention is a method including the steps of:

(a) monitoring a polymerization reaction which produces a polymer resin in a fluid bed reactor (e.g., reactor 110), wherein the polymer resin has a dry melt reference temperature, and the dry melt reference temperature (sometimes referred to herein as a "dry MRT") is a temperature characteristic of melting behavior of a dry version of the polymer resin; and (b) in response to data indicative of at least one monitored parameter of the reaction, determining a reduced melt reference temperature (sometimes referred to herein as "$MRT_R$") characteristic of the melting behavior of the polymer resin as it exists in the reactor. The reduced melt reference temperature ("$MRT_R$") is a temperature characteristic of melting behavior of the polymer resin the presence of diluent (e.g., condensable diluent gas or gases) with the resin in the reactor, and is at least substantially equal to the difference between the dry MRT and a melt reference temperature depression value, "D," where D is a temperature by which the dry MRT is depressed by the presence of diluent with the resin in the reactor.

In some embodiments, the method also includes the step of determining a stickiness control parameter from the reduced melt reference temperature. Typically, the stickiness control parameter is a temperature (sometimes referred to herein as a "$\Delta MRT$" value) at least substantially equal to $MRT_R$–Trx (or Trx–$MRT_R$), where Trx is current reactor temperature.

Optionally, the method also includes the step of controlling the reaction in response to the reduced melt reference temperature or stickiness control parameter (e.g., in response to a $\Delta MRT$ value), for example by maintaining bed temperature in a predetermined relation with (e.g., below) the reduced melt reference temperature or a temperature (or temperature range) related to the reduced melt reference temperature.

The dry MRT is a distinct and measurable temperature that is characteristic of melting behavior of a dry version of the polymer resin, and can be defined or determined in any of a variety of different ways, including as:

a peak melt temperature as determined from a first or second melt DSC ("differential scanning calorimetry") measurement on a dry sample of the polymer resin;

a polymer Seal Initiation Temperature measured on a resin film sample;

a resin Hot Tack Initiation Temperature;

a dry sticking temperature of granular polymer in a fluid bed;

a temperature at which the polymer resin is expected to melt or begin to melt in the reactor vessel with the reactor operating at normal pressure and gas velocity but in the presence of substantially pure nitrogen rather than the gas components actually present with the resin in the reactor during the reaction; or a dry Melt Initiation Temperature (MIT) determined graphically as the onset of rapid melting in a first or second melt DSC curve determined from a DSC measurement on a dry sample of the polymer. Such a dry MIT is preferably determined from a first melt DSC measurement on a sample of a dry version of the polymer (a sample of the polymer resin with no significant amount of diluent hydrocarbon present therewith).

Below (with reference to FIGS. 5-7 and Equations 1-15), we shall describe exemplary embodiments of the invention in which the dry MRT is a dry melt initiation temperature ("dry MIT") determined graphically as the onset of rapid melting in a first or second melt DSC curve determined from a DSC measurement on a dry sample of polymer resin of the type being produced. In these exemplary embodiments, the reduced melt reference temperature is a reduced melt initiation temperature ("$MIT_R$") that is at least substantially equal to the difference between the dry MIT and a melt reference temperature depression value, "D," where D is a temperature by which the dry MIT is depressed by the presence of diluent (e.g., condensable diluent gas or gases) with the resin in the reactor. The exemplary embodiments also include the step of determining a stickiness control parameter (sometimes referred to herein as "$\Delta MIT$" or a "$\Delta MIT$" value) at least substantially equal to $MIT_R$–Trx (or Trx–$MIT_R$), where Trx is current reactor temperature. In the exemplary embodiments, reference temperature data generated in on-line fashion in accordance with the invention are generated by processing data indicative of a combination of process variables measured during the reaction (e.g., current values of bed temperature, density and melt index of the polymer resin, and concentration (e.g., partial pressure) of ICA, comonomer, and isomer gas, and optionally also at least one other diluent present in the reactor) in accordance with a predetermined model (e.g., a MIT depression model that implements the Flory equation). The processing can be performed in any of a variety of ways, including by accessing at least one database or look-up table prepared in accordance with the model. In the exemplary embodiments, a dry melt reference temperature is determined from measured process data (using a predetermined correlation with melt index and/or density of the resin), and appropriate correlations (provided by the model) are employed to estimate a degree of reduction of the dry melt reference temperature due the effects of diluent components present in the reactor with the polymer resin during the reaction.

Reference temperature data generated in on-line fashion in accordance with some embodiments of the invention (e.g., in accordance with the exemplary embodiments) can be provided to and processed by (i.e., integrated with) a plant process control system to provide an on-line monitor of the approach to at least one condition of undesirable resin stickiness in the reactor. Such an on-line monitor can provide a quantitative basis for control of process conditions to avoid continuity problems that would otherwise occur due to excessive stickiness of resin in the reactor, and can allow a plant operator to operate the process safely at conditions closer to the stickiness limits for higher reactor heat transfer capabilities and higher production rates.

FIG. 6 illustrates the effect of dissolved hydrocarbons in shifting (or "displacing" or "depressing") a polymer melt curve. The effect of these dissolved components, principally dissolved comonomer and ICA, is assumed in the present work to displace the entire melt curve (shown in FIG. 5 and also shown as a dashed curve in FIG. 6) towards lower temperatures, resulting in the displaced curve indicated in FIG. 6. The polymer peak melting temperature is displaced downwards, along with the MIT. The amount of displacement is denoted as D (in units of temperature, ° C.), and in the exemplary embodiments to be described below is calculated using the Flory equation and appropriate data (or correlations) for the solubility of condensable hydrocarbons in the polymer. The displaced (reduced) value of MIT is denoted as $MIT_R$.

FIG. 7 illustrates a calculation of the stickiness control parameter $\Delta MIT$ in accordance with the exemplary embodiments to be described below. This parameter is computed as $\Delta MIT = Trx - MIT_R$, and represents the extent by which the reactor bed temperature exceeds (or "overlaps") the displaced (reduced) value of the MIT. The physical units of $\Delta MIT$ are temperature, in degrees C. The $\Delta MIT$ incorporates all known process variables that affect resin stickiness (e.g., resin density and MI, reactor temperature Trx, and hydrocarbon concentrations and solubilities) into a single variable that can be monitored on-line (during a reaction) and used as the basis for control of the reactor to prevent problems associated with excessive stickiness, and/or to maximize reactor production rates. Limiting values of $\Delta MIT$ correspond to limiting values of stickiness, and may be different for different catalyst systems. For polymers produced with Catalyst A (a metallocene catalyst described below) the limiting value of $\Delta MIT$ was determined to be in the range of 6 to 7° C.

The exemplary embodiments of the present invention determine an estimated degree of depression of a dry melt initiation temperature for a polymer resin due to presence of at least one diluent (e.g., ICA, comonomer, and at least one isomer of the comonomer) with the resin in a reactor during a polymerization reaction, from at least one parameter of the reaction monitored on an on-line basis and using a predetermined melt initiation temperature depression model (e.g., one based on and implementing the Flory equation). As discussed above, the presence of condensable diluent (e.g., comonomer and condensing agents, and isomers of comonomers) depresses the dry melt initiation temperature of polymer resin (e.g., polyethylene) in a gas phase polymerization reactor. The magnitude of the depression of the dry melt initiation temperature may be sufficient to bring the reduced melt initiation temperature near the reaction temperature. The model employed in the noted embodiments relates the dry melt initiation temperature of a dry version of the polymer resin (which itself is typically determined by a predetermined correlation with resin melt index and density) and the reduced melt initiation temperature of the polymer resin in the presence of significant amounts of the diluent components (typically soluble hydrocarbons) that are present with the resin while the resin is produced. By processing data indicative of the reactor temperature, and the concentration, solubility, and liquid densities of the diluent components in accordance with the model, the reduced melt initiation temperature can be determined in accordance with the invention from the dry melt initiation temperature. Such a model (sometimes referred to herein as a melt initiation temperature depression model or MIT depression model) can be readily programmed into a stand-alone computer or a conventional plant DCS system to provide an on-line monitor of combinations of process conditions that lead to resin stickiness. This allows operations to adjust reactor conditions to avoid stickiness and reduce the likelihood of sheeting incidents.

The noted embodiments include the steps of: determining a dry melt initiation temperature for polymer resin being produced, preferably by characterizing a DSC (differential scanning calorimetry) melting curve for a dry version of the resin being produced; and estimating the amount by which the dry melt initiation temperature is depressed due to the presence of the condensable diluent component(s) actually present with the resin being produced in the reactor. In characterizing such a DSC melting curve, an inflection point in the DSC melting curve is typically identified as the dry melt initiation temperature (MIT). Using the Flory equation, these embodiments determine a reduced melt initiation temperature ($MIT_R$) at which the resin in the reactor will begin to melt in the presence of the condensable diluent gases (e.g., soluble hydrocarbons) that are present with the resin during the reaction. The reduced melt initiation temperature, $MIT_R$, is at least substantially equal to MIT−D, where MIT is the dry melt initiation temperature, and D is an estimated degree of MIT depression, caused by the highly soluble diluent gas components in the reactor.

The methodology for estimating the depression "D" of the dry melt initiation temperature is based on the Flory equation and existing models for vapor solubility in the polymer resin. The noted embodiments typically determine a single calculated parameter, $\Delta MIT$, which is the difference between the reactor temperature, Trx, and $MIT_R$, to quantify the degree to which the reactor temperature overlaps the (depressed) melting curve and thus quantify the degree of resin stickiness.

The expression "DSC melting curve" for dry version of polymer resin herein denotes an experimentally determined relationship between the rate at which heat is absorbed by a sample of the dry resin (e.g., in units of mcal/sec) versus temperature of the sample, as determined from DSC melting curve data resulting from differential scanning calorimetry measurements on the sample. Two types of DSC melting curves are "first melt" and "second melt" curves. A first melt curve is determined by measurements on a sample that has not previously been melted. A second melt curve is determined by measurements on a sample that has previously been melted, in the sense that the sampled is melted in a first scan through the DSC, then cooled back to ambient temperature, and then slowly reheated for the second DSC test. DSC melting curves employed in preferred embodiments of the invention are first melt curves, since first melt data are believed to reflect the true melt curve of polymer resin as it exists in a polymerization reactor more accurately than second melt data.

Some embodiments of the inventive method implementing a melt initiation temperature depression model include the steps of:

(a) during a polymerization reaction in a fluid bed reactor that produces a polymer resin, measuring current values of parameters of the reaction including reactor temperature, at least one resin property (e.g., density and melt index) of the polymer resin, and concentration (e.g., partial pressure) of at least one condensable diluent gas in the reactor (e.g., partial pressures of ICA, comonomer, and at least one isomer of the comonomer in the reactor);

(b) determining, from at least one of the current values of the at least one resin property based on a predetermined correlation between resin melting temperature and said at least one resin property, a dry melt initiation temperature value ("dry MIT value" or "MIT") indicative of a temperature at which a dry version of the polymer resin is expected to begin to melt (e.g., a temperature at which the polymer resin in the reactor is expected to begin to melt in the absence of any significant amount of condensable diluent gas that is actually present in the reactor during the reaction). Typically, the dry MIT value is determined using a database including previously measured MIT values (determined from DSC measurements) as a function of resin properties (density, MI, etc.);

(c) during the reaction, using a melt initiation temperature (MIT) depression model to determine (preferably, in on-line fashion) a reduced melt initiation temperature at which the polymer resin is expected to begin to melt in the presence of the at least one condensable diluent gas in the reactor, said model identifying an estimated degree of depression of the dry MIT value due to presence of at least one diluent with the polymer resin (e.g., the presence of the condensable diluent gas actually present with the polymer resin in the reactor during the reaction). Preferably, the MIT depression model implements the Flory equation; and (d) determining (preferably, in on-line fashion) a temperature value indicative of resin stickiness in the reactor, from the reduced melt initiation temperature determined in step (c) and a current value of the reactor temperature.

Steps (b) and (c) can be performed in any of a variety of ways, including by accessing one or more look-up tables prepared in accordance with the predetermined correlation or the model.

Typically, the reduced melt initiation temperature determined in step (c) is a temperature ($MIT_R$) above which resin in the reactor (in the presence of condensable diluent gas) is predicted to begin to melt. In some embodiments, the temperature value generated in step (d) is a temperature value, $\Delta MIT$, which is at least substantially equal to $Trx-MIT_R$, where Trx is the current reactor temperature, and $MIT_R$ is the reduced melt initiation temperature determined in step (c). Typically, $MIT_R$ is at least substantially equal to MIT–D, where MIT ("melt initiation temperature") is the dry MIT value determined in step (b), D is an estimated degree of MIT depression due to the presence of the at least one condensable diluent gas with the resin in the reactor. In other embodiments, the temperature value generated in step (d) is a temperature value otherwise indicative of the degree of resin stickiness in the fluid bed.

Preferably, steps (a)-(d) are performed repeatedly (e.g., on an ongoing basis) during the reaction to generate a sequence of temperature values indicative of resin stickiness in the reactor (e.g., a sequence of values of $\Delta MIT$ or data indicative of a time-varying value of $\Delta MIT$), and the method also includes the step of:

(e) controlling the reaction to in an effort to prevent unacceptable resin stickiness in the reactor (e.g., to maintain a current value of $\Delta MIT$ in a predetermined relationship with a predetermined limiting temperature value or range of values).

For some embodiments in which the reaction controlled in step (e) is a polyethylene polymerization reaction using a metallocene catalyst to be referred to as Catalyst A (described below), and the temperature value generated in step (d) is a temperature value $\Delta MIT$ which is at least substantially equal to $Trx-MIT_R$. Such a temperature value $\Delta MIT$ has been correlated with measured data characterizing the same type of polyethylene polymerization reaction (performed using Catalyst A) at ExxonMobil Corporation's Mont Belvieu Plastics Plant. The data characterized several wall and dome sheeting incidents that occurred during the reaction, as well as normal operation that occurred without sheeting. The correlation determined that when the $\Delta MIT$ value exceeded a critical value (determined to be in the range 6° C. to 7° C.), the likelihood of sheeting increased significantly. The correlation also determined that maintaining the $\Delta MIT$ value below this critical value is critical to avoid both wall and dome sheeting during a reaction of the type analyzed. Thus, in the noted embodiments, step (e) preferably maintains (or attempts to maintain) the reaction parameters so that $\Delta MIT$ is in a predetermined limiting range from 5° C. to 6° C. (or less than a predetermined limiting value from 6° C. to 7° C.).

For some other polyethylene polymerization reactions using a catalyst other than above-noted Catalyst A, the temperature value generated in step (d) is a temperature value $\Delta MIT$ which is at least substantially equal to $Trx-MIT_R$), and step (e) maintains (or attempts to maintain) the reaction parameters so that $\Delta MIT$ is in a predetermined limiting range which is found (in commercial experience) to be appropriate for that catalyst. With these other catalyst systems the range of $\Delta MIT$ values required to avoid excessive resin stickiness may be different than 5° C. to 6° C. The limiting $\Delta MIT$ values (or range of values) for these catalysts are taken as those that are found to correlate with discontinuity events (sheeting, chunking and/or rapid fouling of the distributor plate) with the particular catalyst in a commercial reactor system.

We next describe an example of performance of step (c), assuming that a dry melt initiation temperature value has been determined in step (b).

From thermodynamic considerations, the presence of a soluble, condensable substance (e.g., a hydrocarbon) reduces the melting temperature of a polymer. A relationship, known as the Flory equation, for the melting point depression of a high molecular weight polymer by a diluent is given in Fried, J. R., *Polymer Science and Technology*, Prentice Hall, Upper Saddle River, N.J., 1995, as:

$$\frac{1}{T_m} - \frac{1}{T_m^0} = \left(\frac{R}{\Delta Hu}\right)\left(\frac{Vu}{Vs}\right)(\phi_1 - \chi\phi_1^2) \quad (1)$$

where:
R is the gas constant,
Vu is the molar volume of the polymer repeat unit,
Vs is the molar volume of the diluent,
$T_m$ is the peak melting temperature of the polymer with diluent (° C.), $T_m^0$ is the peak melting temperature of the polymer without diluent (° C.), $\Delta Hu$ is the enthalpy of fusion for the polymer repeat unit (850.6 cal/mol), $\phi_1$ is the volume fraction of diluent (single or multi-component), and $\chi$ is a binary interaction parameter.

The parameter $\chi$ is defined by the above reference as:

$$\chi = \chi_S + \chi_H = \chi_S + \frac{V_1}{RT}(\delta_1 - \delta_2)^2 \approx 0.34 + \frac{V_1}{RT}(\delta_1 - \delta_2)^2 \quad (2)$$

where:

$\delta_1$ is the solubility parameter of the diluent, and
$\delta_2$ is the solubility parameter of the polymer.

For a diluent that is a mixture of gases:

$$\delta_1 = \delta_{mix} = \sum \delta_i \cdot f_i \quad (3)$$

where $f_i$ is the volume fraction of diluent component i, and $\delta_i$ is the solubility parameter of component i, and where the sum of volume fractions for all diluent components equals 1. Equation 3 is substituted into Equation 2 to calculate $\chi$ for mixtures.

Solving for Tm in Equation 1, the following expression is obtained:

$$Tm = \frac{1}{\frac{1}{Tm^0 + 273.15} + \left[\frac{R}{\Delta Hu} \cdot \frac{Vu}{Vs}(\phi_1 - \chi \cdot \phi_1^2)\right]} - 273.15 \quad (4)$$

This equation predicts the peak melting temperature of a polymer as a function of soluble components. In the example, $T_m^0$ is the peak melt temperature determined from a first melt DSC curve for the polymer, and $T_m^0$ is the peak melt temperature expected for the polymer in the presence of the diluent. From thermodynamic considerations, the effect of the soluble diluents is to reduce (or "depress") the peak melting temperature, hence $T_m$ is always less than $T_m^0$ in the presence of one or more soluble diluents, and the difference $T_m^0 - T_m$ is always positive.

In the present example, it is necessary to estimate the degree of depression of the melt initiation temperature, MIT. The required depression of the MIT is taken as equal to the depression of the peak melting temperature, as determined above from the Flory equation. Defining the parameter D as the depression (or displacement) of the melt initiation temperature, $$D = T_m - T_m^0 \quad (5)$$

The reduced melt initiation temperature is determined in step (c) from the melt initiation temperature (determined in step (b)) as $$MIT_R = MIT - D \quad (6)$$

In the example, the temperature value generated in step (d) is a temperature value $\Delta MIT = Trx - MIT_R$, where Trx is the current reactor temperature, and $MIT_R$ is given by Equation 6. The value $\Delta MIT$ is the difference between the reactor temperature (Trx) and the melt initiation temperature of the polymer, accounting for the depression in melting point for soluble hydrocarbons. A positive value of $\Delta MIT$ indicates the extent to which the reactor temperature exceeds the depressed melt initiation temperature.

In order to use Equation 4, relationships for the solubility of diluent components in the polymer are required. One such generalized relationship, described in Stiel, L. I., et al., *J. Appl. Poly. Sci.*, v. 30, 1145-1165, 1985, provides an estimate of a Henry's Law constant as:

$$\ln\left(\frac{1}{Kp}\right) = -1.561 + (2.057 + 1.438\omega)\left(\frac{Tc}{T}\right)^2 \quad (7)$$

where:

Kp is the Henry's Law constant,
$\omega$ is an acentric factor,
Tc is the critical temperature of the diluent (° K), and
T is the temperature (° K).

To calculate the vapor solubility, the following equation was presented by Stiel, et al, (cited above):

$$Py_1 = Kp \cdot V_1^0 \quad (8)$$

where:

P is the reactor total pressure (atm),
$y_1$ is vapor phase mole fraction, and
$V_1^0$ is vapor solubility in cm³ diluent/g polymer at 273.2° K and 1 atmosphere pressure.

By combining Equations 7 and 8, the vapor solubility of diluent (in units of weight fraction) can be expressed as:

$$S = P \cdot Mw \cdot \frac{\exp\left(-1.561 + (2.057 + 1.438\omega)\left(\frac{Tc}{T}\right)^2\right)}{R \cdot Ta} \quad (9)$$

where:

Ta is 273.15 (° K),
R is the gas constant (82.06 cm³·atm/mol·° K), and
Mw is the molecular weight of the diluent, or:

$$S = P \cdot Mw \cdot \frac{\exp\left(-1.561 + (2.057 + 1.438\omega)\left(\frac{Tc}{T}\right)^2\right)}{22414.7} \quad (10)$$

If P is in units of bars (rather than atmospheres), the constant in the denominator of Equation 10 is 22710.9.

Component properties, such as Tc, $\omega$ and Mw may be found in Reid, R. C., et al., *The Properties of Gases and Liquids*, 4th ed., McGraw-Hill, New York, 1987.

To calculate the melting point depression by Equation 4, the volume fraction of diluent $\phi$ in the polymer must be estimated. Assuming additive volumes, the following relationship applies:

$$\phi_{mix} = \frac{\frac{Ms}{\rho s}}{\frac{Ms}{\rho s} + \frac{1-Ms}{\rho_p}} \quad (11)$$

where:
Ms is the mass fraction of diluent,
$\rho_s$ is the density of the diluent (in g/cm$^3$), and
$\rho_p$ is the density of the polymer (in g/cm$^3$)

Other vapor solubility equations can be used as alternatives to Equation 10. For example, for polymerization reactions in which ethylene is present and isopentane is used as a diluent, the following relationship for vapor solubility S (in units of weight fraction) can be used:

$$S = a(1-\rho)^{b1} MI^c e^{d/trx} P^e \quad (12)$$

where MI is the polymer melt index, $I_2$ (g/10 min), $\rho$ is the polymer density (g/cm$^3$), Trx is the reactor temperature (in °K), P is the hydrocarbon partial pressure at the resin conditions (in psia), and a, b1, c, d, and e are predetermined parameters.

As another example, for polymerization reactions in which 1-butene and 1-hexene are diluents, the following relationship for vapor solubility S (in units of weight fraction) can be used:

$$S = aPe^{\left(\left(b1+\frac{b2}{T}-b3\right)P\right)} e^{c/Trx}(1-\rho)^d MI^e \quad (13)$$

where (again) MI is the polymer melt index ($I_2$, g/10 min), $\rho$ is the polymer density (g/cm$^3$), Trx is the reactor temperature (in °K), P is the hydrocarbon partial pressure at the resin conditions (in psia), and a, b1, c, d, and e are predetermined parameters.

In the example, diluent mixture molar volumes are required. Well known methods such as the Rackett method using the Chueh-Prauxnitz mixing rules or the Hankinson-Brobst-Thomson method for mixtures may be used. Molar volumes used herein were calculated using the modified Rackett method using the Chueh-Prausnitz mixing rules (as described in Reid, R. C., et al., *The Properties of Gases and Liquids*, 4$^{th}$ ed., McGraw-Hill, New York, 1987):

To estimate $\chi$ in Equation 4, the volume fraction of each soluble component is also required. In the example, the $\chi$ parameter was computed by modifying Equation 2 as follows:

$$\chi = 0.34 + \frac{V_1}{RT_{rx}}\left(\sum_i \delta_i \frac{S_i}{\sum_i S_i} - \delta_P\right) \quad (14)$$

where:
$\delta_p$ is polymer solubility parameter,
$\delta_i$ is the solubility parameter of diluent component i,
$S_i$ is defined by Equation 10, and
The temperature T is taken as Trx.

In the example, melt DSC measurements were made for a series of polymers (produced with a variety of catalysts) before step (b) was performed. Table 1 shows the melt index (MI) and density ($\rho$) of each polymer, the catalyst employed to produce the polymer (and included with the polymer sample measured), and the melt initiation temperature and peak melt temperature determined for the polymer. The density of the polymers ranged from 0.909 to 0.966 g/cm$^3$ and their melt indices ranged from 0.81 to 19.0 g/10 min.

In Table 1 and elsewhere herein polymer density refers to density measured in accordance with ASTM 1505 and ASTM D-1928. A plaque is made and conditioned for one hour at 100° C. to approach equilibrium crystallinity; measurement for density is then made in a density gradient column. The melt index (MI) is measured in accordance with ASTM D 1238-E (190° C., 2.16 kg).

In Table 1 and elsewhere herein, "Catalyst A" is a metallocene catalyst described in PCT Application Publication Number WO9961486A1 (published on Dec. 2, 1999), wherein it is also designated as "Catalyst A." PCT Application Publication No. WO9961486A1 teaches (on page 29) the following method for preparing this catalyst: "Davison grade 948 silica (available from W. R. Grace, Davison Chemical Division, Baltimore, Md.) was dehydrated to 600° C. and used as the support. The dehydrated silica (850 g) was charged into a 2 gal. reactor and 1060 ml of 30 wt % methylaluminoxane (MAO) (available from Albemarle Corporation, Baton Rouge, La.) was added with slow agitation. Toluene (2000 ml) was then charged to the reactor and the mixture was allowed to stir at 150° F. (66° C.) for 4 hours. Following the MAO reaction time, 23 grams of bis-(1,3-methyl-n-butyl cyclopentadienyl)zirconium dichloride was added as a 10 wt % solution in toluene. Reaction time for the bulky ligand metallocene-type catalyst compound was 1 hour after which the catalyst system was dried with N2 under a vacuum. Drying time was 3 hours at 150° F. (66° C.) and at a reduced agitator speed of 30 rpm. A total of 1200 grams of dried free flowing catalyst was isolated."

In Table 1 and elsewhere herein, "Catalyst B" is a metallocene catalyst described in PCT Application Publication Number WO9961486A1 (published Dec. 2, 1999). The catalyst is identified as "Catalyst D" in the publication, and is based on a "bulky ligand metallocene-type catalyst compound", dimethylsilyl-bis(tetrahydroindenyl)zirconium dichloride (Me$_2$Si(H$_4$Ind)$_2$ZrCl$_2$), which is available from Albemarle Corporation, Baton Rouge, La." PCT Application Publication No. WO9961486A1 teaches (page 32, line 11, to page 33, line 11) the following method for preparing this catalyst: "The (Me$_2$Si(H$_4$Ind)$_2$ZrCl$_2$) catalyst compound was prepared on Crosfield ES-70 grade silica which is dehydrated at 600° C. having an approximately a 1.0 weight percent water content. The Crosfield ES-70 grade silica having an Average Particle Size of 40 microns is available from Crosfield, Manchester, England. The first step in the manufacture of the supported metallocene-type catalyst above involves forming a precursor solution. 460 lbs (209 kg) of sparged and dried toluene is added to an agitated reactor after which 1060 lbs (482 kg) of a weight percent methylaluminoxane (Albemarle Corp., Baton Rouge, La.) is added. 947 lbs (430 kg) of a 2 weight percent toluene solution of a dimethyl silylbis (tetrahydroindenyl)zirconium dichloride catalyst compound and 600 lbs (272 kg) of additional toluene are introduced into the reactor. The precursor solution is then stirred at 80° F. to 100° F. (26.7 to 37.8° C.) for one hour. While stirring the precursor solution above, 850 lbs (386 kg) of 600° C. dehydrated silica as described above is added slowly to the precursor solution and the mixture agitated for 30 min. at 80° F. to 100° F. (26.7 to 37.8° C.). At the end of the 30 min. agitation of the mixture, 240 lbs (109 kg) of a 10 weight percent toluene solution of AS-990 (N,N-bis(2-hydroxylethyl)octadecylamine (Cl$_{18}$H$_{37}$N(CH$_2$CH$_{20}$H)$_2$) available as Kernamine AS-990 (from) Witco Corporation, Memphis, Tenn., is added together with an additional 110 lbs (50 kg) of a toluene rinse and the reactor contents then mixed for 30 min. while heating to 175° F. (79° C.). After 30 min. vacuum is applied and the catalyst mixture dried at 175° F. (79° C.) for about 15 hours to a free flowing powder. The final catalyst weight was 1200 lbs (544 kg) and had a Zr wt % of 0.35 and an Al wt % of 12.0."

In Table 1 and elsewhere herein, "Catalyst C" is a supported Ziegler-Natta catalyst prepared according to U.S. Pat. No. 4,302,566. This catalyst is prepared in three steps. In the first step, W.R. Grace & Co. 955 silica dehydrated at 600° C. is reacted with triethylaluminum (AlEt3) at 60° C. in isopentane, solvent is removed and the resulting product is dried. In the second step, a solution of MgCl2 and TiCl3.1/3AlCl3 dissolved in THF is mixed at 60° C. with the product formed in the first step, solvent is removed and the resulting product is dried to reduce the THF concentration in the product to the range of 0.13 to 0.15. In the third step, the product formed in the second step is reacted with Et2AlCl and Al(n-hexyl)3 at 60° C. in isopentane, the solvent is removed and the product is dried. The quantity of Et2AlCl used in the third step is such that the molar ratio of Et2AlCl/THF is 0.50. The quantity of Al(n-hexyl)3 used in the third step is such that the molar ratio of Al(n-hexyl)3/THF is 0.30.

For each polymer evaluated, only the first melt DSC was used because this is believed to be more representative of the polymer as it exists in the reactor than the more conventional second melt DSC curves. The second melt DSC curves may be significantly different than first melt DSC curves, typically showing lower peak melting temperatures and a sharper melt peak. In the data of Table 2 below, the DSC curves were generated with a temperature ramp rate of 10° C./minute, and with a typical sample quantity of 4.5 mg.

TABLE 1

| Catalyst | Melt Init. Temp (° C.) | Peak Melt Temp (° C.) | Melt Index (dg/min, ASTM) | Density (g/cc, ASTM) |
|---|---|---|---|---|
| A | 87.1 | 114.2 | 0.97 | 0.909 |
| A | 86.0 | 110.1 | 7.83 | 0.912 |
| A | 85.1 | 113.3 | 1.03 | 0.913 |
| A | 85.5 | 108.4 | 11.7 | 0.912 |
| A | 86.0 | 110.2 | 5.11 | 0.912 |
| A | 97.4 | 116.1 | 1.04 | 0.917 |
| A | 96.4 | 122.2 | 0.81 | 0.924 |
| A | 95.5 | 113.3 | 3.37 | 0.917 |
| C | 111.2 | 127.5 | 1.9 | 0.942 |
| C | 125.8 | 135.5 | 8.2 | 0.966 |
| C | 97.0 | 121.8 | 1.0 | 0.918 |
| C | 97.7 | 119.5 | 2.0 | 0.918 |
| C | 95.0 | 122.6 | 22 | 0.925 |
| C | 108.7 | 127.0 | 3.3 | 0.935 |
| C | 116.0 | 128.1 | 19 | 0.953 |
| B | 96.9 | 113.8 | 1.06 | 0.921 |
| B | 85.4 | 110.6 | 4.55 | 0.912 |

The peak melt temperature for each polymer sample was determined from the DSC measurements. A melt initiation temperature (i.e., the dry MIT) for each polymer was determined as the initial point of inflection of a DSC curve (preferably a first melt DSC curve) for the polymer, as illustrated in FIG. 5.

It is contemplated that in alternative embodiments, a dry MIT (or other dry MRT) for each polymer could be determined in other ways. An inflection point of a DSC curve (generated from measurements on a sample of a dry version of the polymer with no significant amount of diluent hydrocarbon present therewith) is a point of rapid onset of melting as indicated by the DSC curve, and thus the temperature at which the inflection point occurs can determine a dry melt initiation temperature.

An inflection point in a DSC melting curve (occurring at a temperature to be considered the melt initiation temperature) can be identified graphically from the DSC curve. For example, such an inflection point can be identified by locating the peak melt temperature indicated by the DSC curve (the temperature at which heat is absorbed most rapidly by the sample) and determining a line segment of a linear approximation of each of a sequence of different portions of the DSC curve (and the slope of each such line segment), where the end points of each such curve portion span the same predetermined range of temperatures but each curve portion is centered at a different temperature below the peak melt temperature. Then, for consecutive pairs of the line segments having decreasing center temperatures (i.e., for center temperatures that decrease from the peak melt temperature), identifying the difference between the slopes of each such pair, identifying the first pair of line segments (for two consecutive portions of the curve portions) for which the line segment slope difference is indicative of an inflection point of the DSC curve, and identifying (as the inflection point of the DSC curve) the temperature at which the line segments of this pair intersect. In the exemplary embodiments, the inflection point of the DSC curve for each polymer is considered to be the dry melt initiation temperature (dry MIT) value for the polymer.

The melt initiation temperatures listed in Table 1 are the dry melt initiation temperatures (MIT values) for the relevant polymers. The melt initiation temperatures listed in Table 1 were regressed to determine a "best fit" by least squares using the density and natural logarithm of the melt index (ln(MI)) for the relevant polymers. The regression line was:

$$MIT = 763.4\rho - 1.7524 \ln(MI) - 606.09 \tag{15}$$

where $\rho$ represents the density of the polymer (in units of g/cc, ASTM), and MI represents the melt index, $I_2$, of the polymer (in units of dg/min, ASTM).

In some embodiments, Equation 15 is used to determine the dry melt initiation temperature (MIT) for polymers other than those specifically listed in Table 1. In Equation 15, no term is employed to account for the specific catalyst type used to produce the polymer. This is appropriate since all combinations of polymer and catalyst type for which DSC measurements were performed were found to fit the correlation of Equation 15. However, it is anticipated that polymers produced by other catalyst systems (i.e. other than Catalysts A, B or C) may have MIT values that do not fit the regression curve defined by Equation 15.

The inventors have coded into an Excel spreadsheet the above-described melt initiation temperature depression model which uses Equations 4, 9, 10, and 11, for application to polymerization of polyethylene with typical condensable gas components (C4 olefins, C4 saturates, C6 olefins, C6 saturates and isopentane). Solubility parameters for these gases were obtained from the *Chemical Properties Handbook*© 1999, and are listed in Table 2 below. A value for the of solubility parameter of polyethylene was obtained from an average of several values that are listed for polyethylene in the *Polymer Handbook,* 4th ed.

TABLE 2

| Solubility Parameters $((cal/cm^3)^{1/2})$ | |
|---|---|
| 1-Butene | 6.717 |
| n-Butane | 7.062 |
| Isopentane | 6.771 |
| 1-Hexene | 7.352 |
| n-Hexane | 7.323 |
| Polyethylene | 7.95 |

Table 3 shows an exemplary calculation, performed using the coded melt initiation temperature depression model for a polymer of the type produced by Catalyst A, with a melt index (MI) of 1.0 dg/min (ASTM), and a density of 0.918 g/cc (ASTM), being produced in a fluid bed reactor. The calculation was based on assumed values of condensable diluent gas concentrations, temperature, and pressure (as provided in the table) that are believed to be representative of Catalyst A in commercial operation.

TABLE 3

| 1-Hexene partial pressure (bar) | 0.217 |
|---|---|
| Isopentane partial pressure (bar) | 3.45 |
| Reactor temperature, Trx (° C.) | 85 |
| Reactor pressure (bar) | 21.7 |
| Polymer peak melting temp., $T_m^0$ (° C.) | 115.86 |
| Melt point depression, D (° C.) | 13.00 |
| Reduced peak melting temp., $T_m$ (° C.) | 102.86 |
| Melt initiation temp., MIT (° C.) | 94.71 |
| Reduced MIT, $MIT_R$ (° C.) | 81.71 |
| $\Delta MIT$, at Trx = 85° C., (° C.) | 3.38 |

In the exemplary calculation, the dry melt initiation temperature (MIT) for the polymer was determined from the correlation of Equation 15. The melting point depression D was determined from Equations 4, 9, 10, and 11, (using the indicted values of temperature and diluent gas concentrations), and the resulting calculated value was 13° C. A value of reduced melt initiation temperature $MIT_R$. was determined as the difference MIT−D, which produced an estimated value of 81.71° C. Since this was lower than the reactor temperature (Trx) of 85° C., the calculation thus determined that (this example) system was operating with a positive value of $\Delta MIT$ equal to 3.38° C. Since this was less than the limiting range of $\Delta MIT$ values that apply for Catalyst A (5 to 6° C.), the reactor system would be expected to operate at the conditions above without excessive resin stickiness in the fluidized bed and, consequently, without an increased tendency for discontinuity events such as sheeting, chunking or distributor plate fouling caused by excessive stickiness.

Embodiments of the inventive method which use the above-described MIT depression model allow linkage of resin properties and reactor operating conditions to predict operating conditions under which discontinuity events due to resin stickiness can be avoided during start-ups as well as steady-state operation. These embodiments also allow reactor production rates to be safely maximized while minimizing the potential for discontinuity events, and allow production rates to be maximized (i.e., to proceed with maximum combinations of reactor temperature and ICA) while avoiding the conditions in the reactor (or combinations of conditions) that would lead to excessive stickiness and discontinuity events. These embodiments use only readily available process and resin property data, and can be readily implemented at plant sites either on-line through process control systems (i.e., by processing the relevant data in a processor that has been programmed to implement the inventive method and calculations; or may be implemented off-line using available spreadsheets.

Several variations (or improvements) of the described examples of the inventive method are contemplated:

other solubility correlations for condensing and comonomers can be employed;

other methods to predict (possibly more accurately) mutual solubilities in multi-component systems can be employed;

improved enthalpy of fusion values ($\Delta Hu$) can be employed to account for variation of $\Delta Hu$ with polymer density. (It has been reported in the literature that $\Delta Hu$ is a function of the polymer density.); and dilatometry data can be used to predict (possibly more accurately) the polymer and diluent volume fractions.

The inventors have appreciated the importance of isomeric compounds (isomers of comonomers) present in fluid bed polymerization reactors, in monitoring and optionally also controlling polymerization reactions occurring in the reactors (e.g., polyethylene polymerization reactions under metallocene catalyst polymerization conditions). Such isomeric compounds are relatively inert and accumulate significantly in commercial reactors fitted with recovery systems. (Isomers of the comonomer are rarely observed in any substantial amount in pilot plants which do not operate with recovery systems.) Because these isomers can be present in substantial amounts in commercial reaction systems, they can have a substantial impact of the melting point depression D and the reduced melt reference temperature $MRT_R$. Preferred embodiments of the invention recognize and account for the impact of accumulated isomers on the melting point depression D, and the resulting values of $MRT_R$ and $\Delta MRT$. Procedures to remedy the effects of accumulated isomers (such as controlled venting of the reactor as described below) are preferably also implemented.

The inventors have considered gas chromatograph composition data for isomers in at least one commercial, gas phase, polyethylene polymerization reactor operating with a catalyst substantially equivalent to Catalyst A. The data was analyzed to characterize separately the 1-hexene comonomer and the C6 and C6+ isomers of the comonomer in samples of cycle gas from the reactor. The data indicated that isomer concentrations as high as 2.5 mole percent (of the total reactor gas) were obtained in the reactor system, which was substantially higher than the approximately 1 to 1.5 mole percent concentration of 1-hexene alone. Further, at these levels, the isomers themselves (excluding the comonomer) were produced an increased depression of the MIT equal to 4° C., which represents a very significant impact on commercial operations, including the tendency for sheeting. The inventors expect that an isomer concentrations greater than 2.5 mole percent would have a correspondingly greater impact on estimated degree of MIT depression and thus on likelihood of sheeting, if isomer accumulation were allowed to continue until such a concentrations were reached.

Whatever method is employed to determine a dry melt reference temperature and reduced melt reference temperature in accordance with the invention, it is important to ensure that a consistent method is used throughout the calculations, and that appropriate limits for $\Delta MRT$ or $\Delta MIT$ (limits that apply for the particular method of determining melt reference temperature that is employed) are established, preferably through actual operating experience. In practice, limiting values of $\Delta MIT$ or $\Delta MRT$ are typically those values that correlate with an increased tendency for sheeting, chunking, and/or distributor plate fouling.

Specific methods and systems for inferring polymer stickiness by calculating the melting curve depression have been described herein. However, it is also contemplated that the melting curve depression D can be can be determined or estimated in any of a number of different ways; for example, in ways that do not make use of the Flory equation, or that use other correlations for the solubility of diluent gas components in the resin (i.e. other than those presented in the examples). The inventors contemplate that other such methods may be constructively employed, as long as they provide reasonable, engineering estimates of the diluent gas solubilities and the resulting depression of the polymer melting curve.

In preferred embodiments of the invention, all condensable components that are present in significant amounts in the cycle gas stream (including comonomer isomers) are measured and the step of determining an estimated degree of depression of dry melt reference temperature (for a dry version of the resin being produced) correctly accounts for all such significant condensable components. The significant components should include isomer(s) of each comonomer present (e.g., each comonomer that is a C6 isomer, or each comonomer that is a C3-C10 alpha olefin). It is expected that some embodiments of the invention will use a lumped isomer concentration value for determining an estimated degree of dry melt reference temperature depression that accounts (with acceptable accuracy) for the contributions of all isomers present in significant concentrations.

Accurate accounting for isomers in determination of estimated degree of dry melt reference temperature (e.g., dry melt initiation temperature) depression is expected to provide direct benefits in many if not all embodiments of the invention, including those which generate a reference temperature based on bed-averaged parameters of steady-state reactions and use them to characterize and control the steady-state reactions, and those which generate a reference temperature based on instantaneous reaction parameters and use them to characterize and control the reactions during reaction transitions.

A specific control action to remedy the impact of isomers (of comonomers) on $\Delta$MRT is to vent isomers from the reactor/recycle system. Vented isomers may go to flare or to a recovery system separate from the reactor/recycle system of the reactor (which may be operating with a metallocene catalyst). As is well known to those skilled in the art, direct venting of the cycle gas to flare is possible, but is likely to be far from optimal due to the relatively high concentration that would also be vented in the process. A preferred point for extracting a vent is from the gas stream exiting the resin purging system. A gas vent from this location contains a relatively high concentration of isomers (up to 50 percent by weight), and a relatively low concentration of ethylene. Depending on specific designs, other reactor systems with other configurations of product discharge, purging and recovery systems may have different preferred vent points.

We next describe examples of commercial-scale reactions (e.g., commercial-scale, gas-phase fluidized-bed polymerization reactions) that can be monitored and optionally also controlled in accordance with the invention. Some such reactions can occur in a reactor having the geometry of reactor 110 of FIG. 3. In different embodiments of the invention, performance of any of a variety of different reactors is monitored and optionally also controlled in accordance with the invention.

In some embodiments, a continuous gas phase fluidized bed reactor is monitored and optionally also controlled in accordance with the invention while it operates to perform polymerization as follows: The fluidized bed is made up of polymer granules. Gaseous feed streams of the primary monomer and hydrogen together with liquid or gaseous comonomer are mixed together in a mixing tee arrangement and introduced below the reactor bed into the recycle gas line. For example, the primary monomer is ethylene and the comonomer is 1-hexene. The individual flow rates of ethylene, hydrogen and comonomer are controlled to maintain fixed gas composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio (or alternatively, the flow rates of comonomer and ethylene are held at a fixed ratio). The concentration of all gases is measured by an on-line gas chromatograph to ensure relatively constant composition in the recycle gas stream. A solid or liquid catalyst is injected directly into the fluidized bed using purified nitrogen as a carrier. The feed rate of catalyst is adjusted to maintain a constant production rate. The reacting bed of growing polymer particles is maintained in a fluidized state by the continuous flow of make up feed and recycle gas through the reaction zone (i.e. the fluidized bed). In some implementations, a superficial gas velocity of 1 to 3 ft/sec is used to achieve this, and the reactor is operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

In other embodiments, a reactor is monitored and optionally also controlled in accordance with the invention while it operates to perform polymerization using any of a variety of different processes (e.g., slurry, or gas phase processes). For example, the reactor can be a fluidized bed reactor operating to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction that is a continuous gas phase process (e.g., a fluid bed process) is monitored and optionally also controlled in accordance with the invention. A fluidized bed reactor for performing such a process typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. This method of operation is referred to as "condensed mode". A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is compressed in a compressor and passed through a heat exchanger wherein the heat of polymerization is removed, and then returned to the reaction zone.

The reactor temperature (Trx) of the fluid bed process is normally operated at the highest temperature that is feasible, given the stickiness or sintering characteristics of the polymer in the fluid bed. Although there is no generally recognized method for establishing the upper limit of reactor temperature, the upper limit is believed to be related to the sintering temperature of the polymer product. Typical embodiments of the inventive method provide a quantitative means for setting the temperature limits based on the $MRT_R$ (the reduced melt reference temperature, which is typically a temperature at which the onset of melting is expected to occur in the reactor). The upper limit of reactor temperature is preferably set by a limiting value of ΔMRT, defined above, or a limiting value of another ΔMRT parameter. The limiting value of ΔMRT, in preferred embodiments, is the maximum amount by which the reactor temperature can exceed the $MRT_R$ without inducing excessive stickiness in the product.

In other embodiments, a reactor whose operation is monitored and optionally also controlled in accordance with the invention effects polymerization by a slurry polymerization process. A slurry polymerization process generally uses pressures in the range of from 1 to 50 atmospheres, and temperatures in the range of 0° C. to 120° C., and more particularly from 30° C. to 100° C. In a slurry polymerization, a suspension of solid, particulate polymer is formed in a liquid polymerization diluent medium to which monomer and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

In other embodiments, a reaction monitored and optionally also controlled in accordance with the invention is or includes particle form polymerization, or a slurry process in which the temperature is kept below the temperature at which the polymer goes into solution. In other embodiments, a reaction monitored and optionally also controlled in accordance with the invention is a loop reactor or one of a plurality of stirred reactors in series, parallel, or combinations thereof. Non-limiting examples of slurry processes include continuous loop or stirred tank processes.

A reaction monitored and optionally also controlled in accordance with some embodiments of the invention can produce homopolymers of olefins (e.g., homopolymers of ethylene), and/or copolymers, terpolymers, and the like, of olefins, particularly ethylene, and at least one other olefin. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. A reaction monitored and optionally also controlled in accordance with the invention can produce polyethylenes. Such polyethylenes can be homopolymers of ethylene and interpolymers of ethylene and at least one α-olefin wherein the ethylene content is at least about 50% by weight of the total monomers involved. Exemplary olefins that may be utilized in embodiments of the invention are ethylene, propylene, 1-butene, 1-pentene, 1-hexene, 1-heptene, 1-octene, 4-methylpent-l-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-l-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range in the gas phase of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 100 atmospheres pressure in yet another embodiment, and up to 50 atmospheres in yet another embodiment, and up to 10 atmospheres in yet another embodiment.

Hydrogen gas is often used in olefin polymerization to control the final properties of the polyolefin. For some types of catalyst systems, it is known that increasing concentrations (or partial pressures) of hydrogen increase the molecular weight or melt index (MI) of the polyolefin generated. The MI can thus be influenced by the hydrogen concentration. The amount of hydrogen in the polymerization can be expressed as a mole ratio relative to the total polymerizable monomer, for example, ethylene, or a blend of ethylene and hexane or propylene. The amount of hydrogen used in some polymerization processes is an amount necessary to achieve the desired MI (or molecular weight) of the final polyolefin resin. In one embodiment, the mole ratio in the gas phase of hydrogen to total monomer ($H_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 500 ppm and 2000 ppm in another embodiment.

A reactor monitored and optionally also controlled in accordance with some embodiments of the invention can be an element of a staged reactor employing two or more reactors in series, wherein one reactor may produce, for example, a high molecular weight component and another reactor may produce a low molecular weight component.

A reactor monitored and optionally also controlled in accordance with the invention can implement a slurry or gas phase process in the presence of a bulky ligand metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

A reactor monitored and optionally also controlled in accordance with the invention can employ one or more catalysts combined with up to 10 wt % of a metal-fatty acid compound, such as, for example, an aluminum stearate, based upon the weight of the catalyst system (or its components). Other metals that may be suitable include other Group 2 and Group 5-13 metals. In other embodiments, a solution of the metal-fatty acid compound is fed into the reactor. In other embodiments, the metal-fatty acid compound is mixed with the catalyst and fed into the reactor separately. These agents may be mixed with the catalyst or may be fed into the reactor in a solution, a slurry, or as a solid (preferably as a powder) with or without the catalyst system or its components.

In a reactor monitored and optionally also controlled in accordance with some embodiments of the invention, supported catalyst(s) can be combined with activators and can be combined by tumbling and/or other suitable means, with up to 2.5 wt % (by weight of the catalyst composition) of an antistatic agent, such as an ethoxylated or methoxylated amine, an example of which is Kemamine AS-990 (ICI Specialties, Bloomington Del.). Other antistatic compositions include the Octastat family of compounds, more specifically Octastat 2000, 3000, and 5000.

Metal fatty acids and antistatic agents can be added as either solid slurries, solutions, or solids (preferably as powders) as separate feeds into the reactor. One advantage of this method of addition is that it permits on-line adjustment of the level of the additive.

Examples of polymers that can be produced in accordance with the invention include the following: homopolymers and copolymers of C2-C18 alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more C2-C18 alpha olefin; terpolymers of one or more C2-C18 alpha olefins with a diene.

Monomers that can be present in a reactor monitored and optionally also controlled in accordance with the invention include one or more of: C2-C18 alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbornadiene, and ethylidene norbornene; and readily condensable monomers, for example, isoprene, styrene, butadiene, isobutylene, chloroprene, acrylonitrile, cyclic olefins such as norbornenes.

Fluidized bed polymerization can be monitored and optionally also controlled in accordance with some embodiments of the invention. The reaction can be any type of fluidized polymerization reaction and can be carried out in a single reactor or multiple reactors such as two or more reactors in series.

In various embodiments, any of many different types of polymerization catalysts can be used in a polymerization process monitored and optionally also controlled in accordance with the present invention. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts are used with cocatalysts and promoters well known in the art. Typically these are alkylaluminums, alkylaluminum halides, alkylaluminum hydrides, as well as aluminoxanes. For illustrative purposes only, examples of suitable catalysts include Ziegler-Natta catalysts, Chromium based catalysts, Vanadium based catalysts (e.g., vanadium oxychloride and vanadium acetylacetonate), Metallocene catalysts and other single-site or single-site-like catalysts, Cationic forms of metal halides (e.g., aluminum trihalides), anionic initiators (e.g., butyl lithiums), Cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction monitored and optionally also controlled in accordance with the invention can employ other additives, such as (for example) inert particulate particles.

While the present invention has been described and illustrated by reference to particular embodiments, those of ordinary skill in the art will appreciate that the invention lends itself to variations not necessarily illustrated herein. For example, it is contemplated that other halogenated fluorocarbons alone or in combination with a fluorinated hydrocarbon as herein described would be useful in the process of the invention. It is also within the scope of this invention that the gas phase process of the invention can be operated in series, with two or more reactors, each reactor operating in a gas phase or one of the reactors operating in a slurry phase. Reference should be made solely to the appended claims for purposes of determining the true scope of the present invention.

What is claimed is:

1. A method, including the steps of:
   (a) monitoring a polymerization reaction which produces a polymer resin in a fluid bed reactor, wherein a dry melt reference temperature is characteristic of melting behavior of a dry version of the polymer resin; and
   (b) in response to data indicative of at least one monitored parameter of the reaction, determining a reduced melt reference temperature characteristic of the melting behavior of the polymer resin as it exists in the reactor, wherein the reduced melt reference temperature is at least substantially equal to the difference between the dry melt reference temperature and a melt reference temperature depression value, "D," where D is a temperature by which the dry melt reference temperature is depressed by the presence of diluent with the resin in the reactor.

2. The method of claim 1, also including the step of determining a stickiness control parameter from the reduced melt reference temperature.

3. The method of claim 2, also including the step of controlling the reaction in response to the stickiness control parameter.

4. The method of claim 3, wherein the step of controlling the reaction includes the step of maintaining bed temperature in the reactor in a predetermined relation with the reduced melt reference temperature.

5. The method of claim 1, also including the step of controlling the reaction in response to the reduced melt reference temperature.

6. The method of claim 5, wherein the step of controlling the reaction includes the step of maintaining bed temperature in the reactor in a predetermined relation with the reduced melt reference temperature.

7. The method of claim 5, wherein the step of controlling the reaction includes the step of maintaining bed temperature in the reactor in a predetermined relation with a temperature range related to the reduced melt reference temperature.

8. The method of claim 1, also including the step of determining a stickiness control parameter having absolute value at least substantially equal to $\Delta MRT = MRT_R - Trx$, where Trx is current reactor temperature and $MRT_R$ is the reduced melt reference temperature.

9. The method of claim 8, also including the step of controlling the reaction in response to the stickiness control parameter.

10. The method of claim 9, wherein the step of controlling the reaction includes the step of maintaining bed temperature in the reactor in a predetermined relation with the reduced melt reference temperature.

11. The method of claim 1, wherein the dry melt reference temperature is a peak melt temperature determined from data generated by performing at least one differential scanning calorimetry measurement on a dry resin sample.

12. The method of claim 1, wherein the dry melt reference temperature is a temperature indicative of onset of rapid melting of a dry resin sample, determined from data generated by performing at least one differential scanning calorimetry measurement on the dry resin sample.

13. The method of claim 1, wherein the dry melt reference temperature is a polymer seal initiation temperature determined from at least one measurement on a resin film sample.

14. The method of claim 1, wherein the dry melt reference temperature is a resin hot tack initiation temperature.

15. The method of claim 1, wherein the reduced melt reference temperature is a temperature above which the resin in the reactor is predicted to begin to melt.

16. The method of claim 1, wherein each of the dry melt reference temperature and the reduced melt reference temperature is a melt initiation temperature.

17. The method of claim 1, wherein step (a) includes the step of monitoring at least one of density and melt index of the polymer resin, and step (b) includes the steps of:
determining said dry melt reference temperature in response to data indicative of at least one of density and melt index of the polymer resin; and
determining said temperature depression D by processing data indicative of at least one monitored parameter of the reaction, and said dry melt reference temperature, in accordance with a predetermined model.

18. The method of claim 1, wherein step (a) includes the step of monitoring reactor temperature, at least one of density and melt index of the polymer resin, and concentration of at least one diluent present with the resin in the reactor, and step (b) includes the steps of:
determining said dry melt reference temperature in response to data indicative of at least one of density and melt index of the polymer resin; and
determining said temperature depression D by processing data, including data indicative of reactor temperature, concentration of each said diluent present with the resin in the reactor, and said dry melt reference temperature, in accordance with a predetermined model.

19. The method of claim 18, wherein the concentration of each said diluent monitored in step (a) includes at least one of a concentration of at least one induced condensing agent, a concentration of at least one comonomer, and a concentration of at least one isomer of the comonomer.

20. The method of claim 18, wherein the concentration of each said diluent monitored in step (a) includes a concentration of at least one induced condensing agent, at least one comonomer, and at least one isomer of the comonomer.

21. The method of claim 20, wherein the reaction polymerizes ethylene and said at least one comonomer in the presence of a catalyst selected from a group consisting of Ziegler-Natta, chromium, chromium oxide, $AlCl_3$, cobalt, iron, palladium, and metallocene catalyst.

22. The method of claim 21, wherein the polymer resin is polyethylene and each said comonomer is a C3-C10 alpha olefin.

23. The method of claim 1, wherein the polymer resin is a polyolefin.

24. The method of claim 1, wherein the polymer resin is polyethylene.

* * * * *